(12) United States Patent
Han et al.

(10) Patent No.: US 11,968,260 B2
(45) Date of Patent: Apr. 23, 2024

(54) NETWORK INTERFACE CARD, MESSAGE SENDING AND RECEIVING METHOD, AND STORAGE APPARATUS

(71) Applicant: HUAWEI TECHNOLOGIES CO., LTD., Guangdong (CN)

(72) Inventors: Zhaojiao Han, Shenzhen (CN); Jianbo Li, Shenzhen (CN); Xindong Luo, Shenzhen (CN); Dahong Yan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/454,182

(22) Filed: Aug. 23, 2023

(65) Prior Publication Data

US 2023/0403326 A1 Dec. 14, 2023

Related U.S. Application Data

(63) Continuation of application No. PCT/CN2022/076499, filed on Feb. 16, 2022.

(30) Foreign Application Priority Data

Feb. 24, 2021 (CN) .......................... 202110209930.8

(51) Int. Cl.
*H04L 67/1097* (2022.01)
*H04L 67/143* (2022.01)

(52) U.S. Cl.
CPC ........ *H04L 67/1097* (2013.01); *H04L 67/143* (2013.01)

(58) Field of Classification Search
None
See application file for complete search history.

(56) References Cited

U.S. PATENT DOCUMENTS 7,636,772 B1 * 12/2009 Kirby .................. G06F 13/4022
370/278
7,962,562 B1 * 6/2011 Budhia .................. G06F 3/067
709/212

(Continued)

OTHER PUBLICATIONS

Ko et al., "Out of User Space Storage and RDMA", Sep. 1, 2006, IEEE, 2006 IEEE International Conference on Cluster Computing (pp. 1-10) (Year: 2006).*

*Primary Examiner* — Davoud A Zand

(57) ABSTRACT

The technology of this application relates to a network interface card. The network interface card includes a parser and at least one shared connector. The parser receives a first SEND message that is from a host client and that corresponds to a first QP connection, and distributes the first SEND message to a first shared connector in the at least one shared connector. The first SEND message includes an RDMA operation command. The first shared connector obtains NVME information that is sent to a first controller and that corresponds to the first QP connection. The first shared connector interacts with a second controller when a disconnection event of a link between the first shared connector and the first controller is detected. The first shared connector obtains a WQE from the second controller. The first shared connector sends a first RDMA message corresponding to the first QP connection to the host client based on the WQE.

20 Claims, 37 Drawing Sheets

(56) References Cited

U.S. PATENT DOCUMENTS 8,458,280 B2 * 6/2013 Hausauer ............ H04L 67/1097
709/212
2017/0187621 A1 * 6/2017 Shalev .................. H04L 45/745

* cited by examiner

NETWORK INTERFACE CARD, MESSAGE SENDING AND RECEIVING METHOD, AND STORAGE APPARATUS

CROSS-REFERENCE TO RELATED APPLICATIONS

This application is a continuation of International Application No. PCT/CN2022/076499, filed on Feb. 16, 2022, which claims priority to Chinese Patent Application No. 202110209930.8, filed on Feb. 24, 2021. The disclosures of the aforementioned applications are hereby incorporated by reference in their entireties.

TECHNICAL FIELD

This application relates to the storage field, and in particular, to a network interface card, a message sending and receiving method, and a storage apparatus.

BACKGROUND

Currently, much data is not stored locally, but stored in a remote storage apparatus. As shown in FIG. 1, an embodiment of this application provides a storage system, including a storage apparatus 11 and a host client 12. The storage apparatus 11 is connected to the host client 12 via a front-end fabric, and may provide data storage services for a plurality of host clients 12. With the rise of solid-state drives (SSD) based on the non-volatile memory express (NVMe), an increasing number of front-end fabrics use an NVMe over fabrics (NoF) network. Remote direct memory access (RDMA) is a standard in the NoF network, and can reduce latency of accessing data by the storage apparatus.

As shown in FIG. 1, the storage apparatus 11 includes a plurality of controllers 111, at least one network interface card (NIC) 112, and a memory array 113. When the front-end fabric uses an RDMA network, the host client may establish a one-to-one queue pair (QP) connection to the controller 111. Such a manner has low reliability. To be specific, when a controller is faulty, a QP connection (or referred to as an input/output (IO) connection) between the host client and the controller is disconnected, and the storage apparatus cannot continue to provide a storage service for the host client, affecting reliability of the storage system.

SUMMARY

Embodiments of this application provide a network interface card, a message sending and receiving method, and a storage apparatus, to ensure that a QP connection is not disconnected when a controller is faulty, thereby improving reliability of the storage apparatus.

To achieve the foregoing objectives, the following technical solutions are used in embodiments of this application.

According to a first aspect, a network interface card is provided, including a parser and at least one shared connector. The parser is configured to: receive a first send (SEND) message that is from a host client and that corresponds to a first queue pair (QP) connection, and distribute the first SEND message to a first shared connector in the at least one shared connector. The first SEND message includes a remote direct memory access (RDMA) operation command, and the first shared connector initiates an RDMA operation according to the RDMA operation command to access an internal memory of the host client. The first shared connector is configured to: obtain, according to the RDMA operation command and a current stage of the RDMA operation, non-volatile memory express (NVME) information that is sent to a first controller and that corresponds to the first QP connection; interact with a second controller when a disconnection event of a link between the first shared connector and the first controller is detected, to enable the second controller to obtain the NVME information; obtain a work queue element (WQE) from the second controller, where the WQE is obtained by the second controller based on the NVME information; and send a first RDMA message corresponding to the first QP connection to the host client based on the WQE.

After the RDMA operation command of the host client is received by using the first QP connection, the network interface card provided in this embodiment of this application obtains, according to the RDMA operation command and the current stage of the RDMA operation, the NVME information that is sent to the first controller and that corresponds to the first QP connection. When the disconnection event of the link between the first shared connector and the first controller is detected, the first shared connector interacts with the second controller to enable the second controller to obtain the NVME information. In this way, the second controller may continue to send the first RDMA message corresponding to the first QP connection to the host client based on the NVME information, to ensure that the first QP connection is not disconnected when the first controller is faulty, thereby improving reliability of the storage apparatus.

In a possible implementation, the RDMA operation command is an IO read command. The disconnection event occurs before the first shared connector sends the NVME information to the first controller or before the first controller sends an RDMA write message by using the first shared connector. The first RDMA message is the RDMA write message. This implementation may be applied to a scenario in which the host client sends the IO read command to the storage apparatus, to trigger the storage apparatus to perform an RDMA write operation. When the first controller of the storage apparatus is faulty during a process of performing a corresponding RDMA write operation, the network interface card of the storage apparatus sends the NVME information to the second controller, so that the second controller can send the RDMA write message and an IO response. The network interface card of the storage apparatus can smoothly switch a current RDMA operation to the second controller that works properly, so that the host client can be unaware of a fault of the controller, thereby ensuring that the RDMA write operation (one type of NoF operation) can be properly completed.

In a possible implementation, the RDMA operation command is an IO read command. The disconnection event occurs during a period when the first controller sends the first packet of an RDMA write message by using the first shared connector. The first RDMA message is the RDMA write message. This implementation may be applied to a scenario in which the host client sends the IO read command to the storage apparatus, to trigger the storage apparatus to perform an RDMA write operation. When the first controller of the storage apparatus is faulty during a process of performing a corresponding RDMA write operation to send the first packet of the RDMA write message, the network interface card of the storage apparatus sends the NVME information to the second controller, so that the second controller can resend the RDMA write message and an IO response. The network interface card of the storage apparatus can smoothly switch a current RDMA operation to the second controller that works properly, so that the host client can be unaware of a fault of the controller, thereby ensuring that the RDMA write operation can be properly completed.

In a possible implementation, the RDMA operation command is an IO read command. The disconnection event occurs during a period when the first controller sends a middle packet or the last packet of an RDMA write message by using the first shared connector. The first RDMA message is a second SEND message including an IO response, and the IO response indicates that a read operation is completed. Before sending the first RDMA message corresponding to the first QP connection to the host client based on the WQE, the first shared connector is further configured to: send a fake last packet of the RDMA write message to the host client, where a payload of the fake last packet is arbitrarily padded, and a packet sequence number PSN of the fake last packet is a PSN of a to-be-sent RDMA packet of the RDMA write message when the disconnection event occurs. This implementation may be applied to a scenario in which the host client sends the IO read command to the storage apparatus, to trigger the storage apparatus to perform an RDMA write operation. When the first controller of the storage apparatus is faulty during a process of performing a corresponding RDMA write operation to send the middle packet or the last packet of the RDMA write message, the network interface card of the storage apparatus sends the fake last packet of the RDMA write message to the host client to end a current RDMA write operation, and sends the NVME information to the second controller, so that the second controller can resend the RDMA write message and the IO response. The network interface card of the storage apparatus can smoothly switch a current RDMA operation to the second controller that works properly, so that the host client can be unaware of a fault of the controller, thereby ensuring that the RDMA write operation can be properly completed.

In a possible implementation, the RDMA operation command is an IO read command. After the first controller sends an RDMA write message by using the first shared connector, the disconnection event occurs before a negative acknowledgment message of the RDMA write message is received or before a retransmission packet of the RDMA write message is sent because a negative acknowledgment message of the RDMA write message is received. The first RDMA message is a second SEND message including an IO response, and the IO response indicates that a read operation is completed. Before sending the first RDMA message corresponding to the first QP connection to the host client based on the WQE, the first shared connector is further configured to: send a fake retransmission packet of the RDMA write message to the host client, where a packet sequence number PSN of the fake retransmission packet is a PSN of the last RDMA packet of the RDMA write message that has been sent before the disconnection event occurs, or a PSN of an initial retransmission packet of the RDMA write message. This implementation may be applied to a scenario in which the host client sends the IO read command to the storage apparatus, to trigger the storage apparatus to perform an RDMA write operation. After the first controller of the storage apparatus performs a corresponding RDMA write operation to send the RDMA write message, the first controller is faulty before the negative acknowledgment message of the RDMA write message is received or before the retransmission packet of the RDMA write message is sent because the negative acknowledgment message of the RDMA write message is received. The network interface card of the storage apparatus sends the fake retransmission packet of the RDMA write message to the host client, and sends the NVME information to the second controller, so that the second controller can resend the RDMA write message and the IO response. The network interface card of the storage apparatus can smoothly switch a current RDMA operation to the second controller that works properly, so that the host client can be unaware of a fault of the controller, thereby ensuring that the RDMA write operation can be properly completed.

In a possible implementation, the RDMA operation command is an IO read command. The disconnection event occurs during a period when the first controller sends, by using the first shared connector, a second SEND message including an IO response, and the IO response indicates that a read operation is completed. The first RDMA message is the second SEND message. This implementation may be applied to a scenario in which the host client sends the IO read command to the storage apparatus, to trigger the storage apparatus to perform an RDMA write operation. After the first controller of the storage apparatus performs a corresponding RDMA write operation to send an RDMA write message, the first controller is faulty during a period when the first controller sends the second SEND message including the IO response by using the first shared connector. The network interface card of the storage apparatus sends the NVME information to the second controller, so that the second controller can resend the second SEND message including the IO response. The network interface card of the storage apparatus can smoothly switch a current RDMA operation (which refers to a SEND operation) to the second controller that works properly, so that the host client can be unaware of a fault of the controller, thereby ensuring that the RDMA write operation can be properly completed.

In a possible implementation, the RDMA operation command is an IO write command. The disconnection event occurs before the first shared connector sends the NVME information to the first controller or before the first controller completes sending an RDMA read request message by using the first shared connector. The first RDMA message is the RDMA read request message. This implementation may be applied to a scenario in which the host client sends the IO write command to the storage apparatus, to trigger the storage apparatus to perform an RDMA read operation. Before the first shared connector sends the NVME information to the first controller or before the first controller completes sending the RDMA read request message by using the first shared connector, the first controller is faulty, and the disconnection event of the link between the network interface card and the first controller occurs. In this case, the network interface card of the storage apparatus sends the NVME information to the second controller, so that the second controller can send the RDMA read request message, receive an RDMA read response message, and send an IO response. The network interface card of the storage apparatus can smoothly switch a current RDMA operation to the second controller that works properly, so that the host client can be unaware of a fault of the controller, thereby ensuring that the RDMA read operation (one type of NoF operation) can be properly completed.

In a possible implementation, the RDMA operation command is an IO write command. The disconnection event occurs during a period when the first controller receives an RDMA read response message by using the first shared connector. The first RDMA message is an RDMA read request message. Before sending the first RDMA message corresponding to the first QP connection to the host client based on the WQE, the first shared connector is further configured to: send a positive acknowledgment message corresponding to the RDMA read response message to the host client, or discard a packet of the RDMA read response message received from the host client. This implementation may be applied to a scenario in which the host client sends the IO write command to the storage apparatus, to trigger the storage apparatus to perform an RDMA read operation. During a period when the first controller receives the RDMA read response message by using the first shared connector, the first controller is faulty, and the disconnection event of the link between the network interface card and the first controller occurs. In this case, the network interface card of the storage apparatus sends the positive acknowledgment message corresponding to the RDMA read response message to the host client, or the network interface card of the storage apparatus discards the packet of the RDMA read response message received from the host client to end the RDMA read operation, and sends the NVME information to the second controller, so that the second controller can resend the RDMA read request message, receive the RDMA read response message, and send an IO response. The network interface card of the storage apparatus can smoothly switch a current RDMA operation to the second controller that works properly, so that the host client can be unaware of a fault of the controller, thereby ensuring that the RDMA read operation can be properly completed.

In a possible implementation, the RDMA operation command is an IO write command including immediate data. The disconnection event occurs during a period when the first controller receives the immediate data by using the first shared connector. The first RDMA message is a second SEND message including an IO response, and the IO response indicates a failure of receiving the immediate data. Before sending the first RDMA message (namely, the second SEND message) corresponding to the first QP connection to the host client based on the WQE, the first shared connector is further configured to: send a positive acknowledgment message of the first SEND message to the host client. This implementation may be applied to a scenario in which the host client sends the IO write command including the immediate data to the storage apparatus (immediate data IO write command), to trigger the storage apparatus to perform an RDMA read operation. During a period when the first controller receives the immediate data by using the first shared connector, the first controller is faulty, and the disconnection event of the link between the network interface card and the first controller occurs. In this case, the network interface card of the storage apparatus sends the positive acknowledgment message of the first SEND message to the host client, and sends the NVME information to the second controller, so that the second controller may send the second SEND message including the IO response, where the IO response indicates the failure of receiving the immediate data. In this way, the host client resends the IO write command including the immediate data (and the immediate data). The network interface card of the storage apparatus can smoothly switch a current RDMA operation to the second controller that works properly, so that the host client can be unaware of a fault of the controller, thereby ensuring that a SEND operation (namely, the immediate data IO write command) of the immediate data can be properly completed, and a host can send an IO command again without being affected.

In a possible implementation, interacting, by the first shared connector, with the second controller, to enable the second controller to obtain the NVME information includes: The first shared connector sends a notification message to the second controller, where the notification message is used to notify the second controller to obtain the NVME information. This implementation provides a manner in which the second controller obtains the NVME information.

In a possible implementation, interacting, by the first shared connector, with the second controller, to enable the second controller to obtain the NVME information includes: The first shared connector sends the NVME information to the second controller. This implementation provides a manner in which the second controller obtains the NVME information.

According to a second aspect, a message sending and receiving method is provided, applied to the network interface card according to any one of the first aspect and the implementations of the first aspect. The method includes: A parser receives a first send (SEND) message that is from a host client and that corresponds to a first queue (QP) connection, and distributes the first SEND message to a first shared connector in at least one shared connector, where the first SEND message includes a remote direct memory access (RDMA) operation command; the first shared connector initiates a corresponding RDMA operation according to the RDMA operation command to access an internal memory of the host client; and the first shared connector obtains, according to the RDMA operation command and a current stage of the RDMA operation, non-volatile memory express (NVME) information that is sent to a first controller and that corresponds to the first QP connection; interacts with a second controller when a disconnection event of a link between the first shared connector and the first controller is detected, to enable the second controller to obtain the NVME information; obtains a work queue element (WQE) from the second controller, where the WQE is obtained by the second controller based on the NVME information; and sends a first RDMA message corresponding to the first QP connection to the host client based on the WQE.

In a possible implementation, the RDMA operation command is an IO read command. The disconnection event occurs before the first shared connector sends the NVME information to the first controller or before the first controller sends an RDMA write message by using the first shared connector. The first RDMA message is the RDMA write message.

In a possible implementation, the RDMA operation command is an IO read command. The disconnection event occurs during a period when the first controller sends the first packet of an RDMA write message by using the first shared connector. The first RDMA message is the RDMA write message.

In a possible implementation, the RDMA operation command is an IO read command. The disconnection event occurs during a period when the first controller sends a middle packet or the last packet of an RDMA write message by using the first shared connector. The first RDMA message is a second SEND message including an IO response, and the IO response indicates that a read operation is completed. The method further includes: Before sending the first RDMA message corresponding to the first QP connection to the host client based on the WQE, the first shared connector sends a fake last packet of the RDMA write message to the host client, where a payload of the fake last packet is arbitrarily padded, and a packet sequence number PSN of the fake last packet is a PSN of a to-be-sent RDMA packet of the RDMA write message when the disconnection event occurs.

In a possible implementation, the RDMA operation command is an IO read command. After the first controller sends an RDMA write message by using the first shared connector, the disconnection event occurs before a negative acknowledgment message of the RDMA write message is received or before a retransmission packet of the RDMA write message is sent because a negative acknowledgment message of the RDMA write message is received. The first RDMA message is a second SEND message including an IO response, and the IO response indicates that a read operation is completed. The method further includes: Before sending the first RDMA message corresponding to the first QP connection to the host client based on the WQE, the first shared connector sends a fake retransmission packet of the RDMA write message to the host client, where a packet sequence number PSN of the fake retransmission packet is a PSN of the last RDMA packet of the RDMA write message that has been sent before the disconnection event occurs, or a PSN of an initial retransmission packet of the RDMA write message.

In a possible implementation, the RDMA operation command is an IO read command. The disconnection event occurs during a period when the first controller sends, by using the first shared connector, a second SEND message including an IO response, and the IO response indicates that a read operation is completed. The first RDMA message is the second SEND message.

In a possible implementation, the RDMA operation command is an IO write command. The disconnection event occurs before the first shared connector sends the NVME information to the first controller or before the first controller completes sending an RDMA read request message by using the first shared connector. The first RDMA message is the RDMA read request message.

In a possible implementation, the RDMA operation command is an IO write command. The disconnection event occurs during a period when the first controller receives an RDMA read response message by using the first shared connector. The first RDMA message is an RDMA read request message. The method further includes: Before sending the first RDMA message corresponding to the first QP connection to the host client based on the WQE, the first shared connector sends a positive acknowledgment message corresponding to the RDMA read response message to the host client, or discards a packet of the RDMA read response message received from the host client.

In a possible implementation, the RDMA operation command is an IO write command including immediate data. The disconnection event occurs during a period when the first controller receives the immediate data by using the first shared connector. The first RDMA message is a second SEND message including an IO response, and the IO response indicates a failure of receiving the immediate data. The method further includes: Before sending the first RDMA message corresponding to the first QP connection to the host client based on the WQE, the first shared connector sends a positive acknowledgment message of the first SEND message to the host client.

In a possible implementation, that the first shared connector interacts with a second controller to enable the second controller to obtain the NVME information includes: The first shared connector sends a notification message to the second controller, where the notification message is used to notify the second controller to obtain the NVME information.

In a possible implementation, that the first shared connector interacts with a second controller to enable the second controller to obtain the NVME information includes: The first shared connector sends the NVME information to the second controller.

According to a third aspect, a storage apparatus is provided, including the network interface card according to any one of the first aspect and the implementations of the first aspect and a plurality of controllers.

According to a fourth aspect, a computer-readable storage medium is provided. The computer-readable storage medium stores instructions. The instructions are run on a network interface card, so that the network interface card can perform the method according to any one of the second aspect and the implementations of the second aspect.

According to a fifth aspect, a computer program product including instructions is provided. The instructions are run on a network interface card, so that the network interface card can perform the method according to any one of the second aspect and the implementations of the second aspect.

For technical effects of the second aspect to the fifth aspect, refer to technical effects of any one of the first aspect and the implementations of the first aspect.

DESCRIPTION OF EMBODIMENTS

Figure 1:
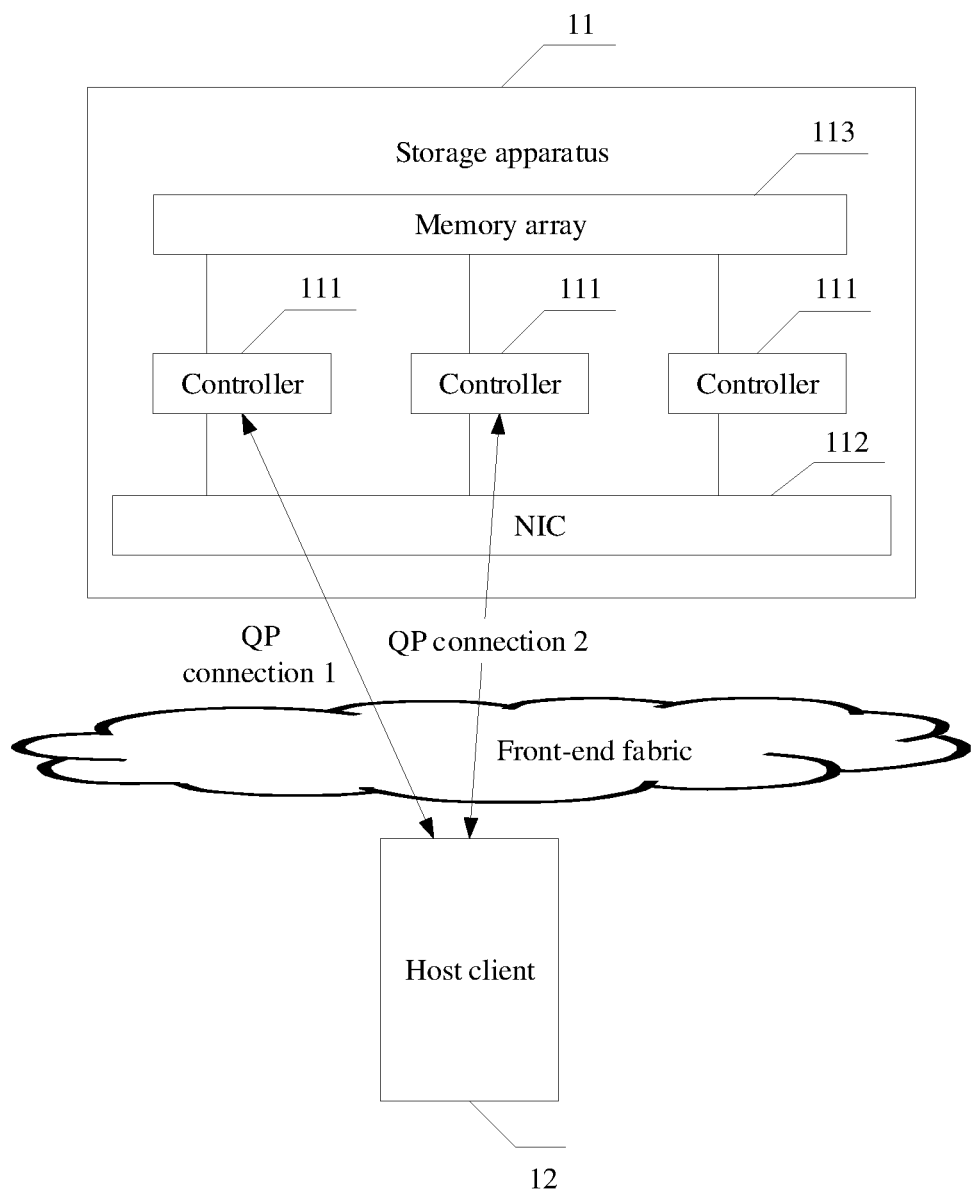
FIG. 1 is an example schematic diagram of an architecture of a storage system according to an embodiment of this application.

Terms such as "component", "module", and "system" used in this application are used to indicate computer-related entities. The computer-related entities may be hardware, firmware, a combination of hardware and software, software, or software in running. For example, a component may be, but is not limited to, a process running on a processor, a processor, an object, an executable file, a thread of execution, a program, and/or a computer. As an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and based on, for example, a signal having one or more data packets (for example, data from one component, where the component interacts with another component in a local system or a distributed system, and/or interacts with other systems via a network such as the Internet by using a signal).

First, concepts in this application are described.

A storage apparatus in this application may be referred to as a storage server, a memory array, a blade server, or the like, and a name is not limited. The storage apparatus may include at least one controller and at least one network interface card (NIC). The controller may include, but is not limited to, a processor and a memory. The processor runs an operating system and an application program.

The processor in the embodiments of this application may be a chip. For example, the processor may be a field programmable gate array (FPGA), an application-specific integrated chip (ASIC), a system on chip (SoC), a central processing unit (CPU), a network processor (NP), a digital signal processing circuit (DSP), a micro controller unit (MCU), a programmable controller (PLD), or another integrated chip.

The memory in the embodiments of this application may be a volatile memory or a nonvolatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which serves as an external cache. By way of example but non-limiting description, RAMs in many forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the system and method described in this specification includes, but is not limited to, these and any other suitable type of memory.

An NIC in the embodiments of this application may also be referred to as a network interface controller, a network adapter, a network interface card, a local area network adapter (LAN adapter), or the like, and is computer hardware designed to allow a computer to communicate on a computer network.

To improve system reliability, the storage apparatus uses a multi-controller architecture solution, allowing a plurality of controllers to provide data storage services for one or more host clients. Mid-range and high-end storage apparatuses use a multi-host NIC to implement a front-end fabric interface, a plurality of controllers share one NIC through different high-speed serial computer expansion bus standard (peripheral component interconnect, PCIe) channels respectively, and each controller serves as an independent network node.

The storage apparatus is connected to the host client via a front-end fabric, and may provide data storage services for a plurality of host clients. With the rise of NVMe SSD, a protocol for the host client to access the storage apparatus has transitioned from a small computer system interface (SCSI) to NVMe. Correspondingly, the front-end fabric also migrates from a fibre channel (FC) network and a transmission control protocol/internet protocol (TCP/IP) network to an NoF network.

An NoF protocol supports a memory type operation and a message type operation. The PCIe supports the memory type operation, the FC supports the message type operation, and RDMA supports the memory type operation and the message type operation.

The RDMA may use data in storage space of the storage apparatus as a message via the front-end fabric and transmit the message to storage space of the host client in a form of an RDMA packet. Alternatively, the RDMA uses data in storage space of the host client as a message via the front-end fabric and transmits the message to storage space of the storage apparatus in a form of an RDMA packet. The transmission and copy tasks are mainly performed by the storage apparatus and the network interface card (for example, an RDMA network interface card (RNIC)) of the host client, and does not need to be performed by a processor. Therefore, performance of the host client is not affected.

Currently, hardware implementation modes of RDMA include InfiniBand (IB), RDMA over converged Ethernet (RoCE) (including RoCEv1 and RoCEv2), an internet wide area RDMA protocol (iWARP), and the like. InfiniBand is a network specially designed for RDMA to ensure reliable transmission at a hardware level. RoCE and iWARP are Ethernet-based RDMA technologies and support corresponding Verbs interfaces. RoCE can also ensure reliable transmission at a hardware level.

Figure 2:
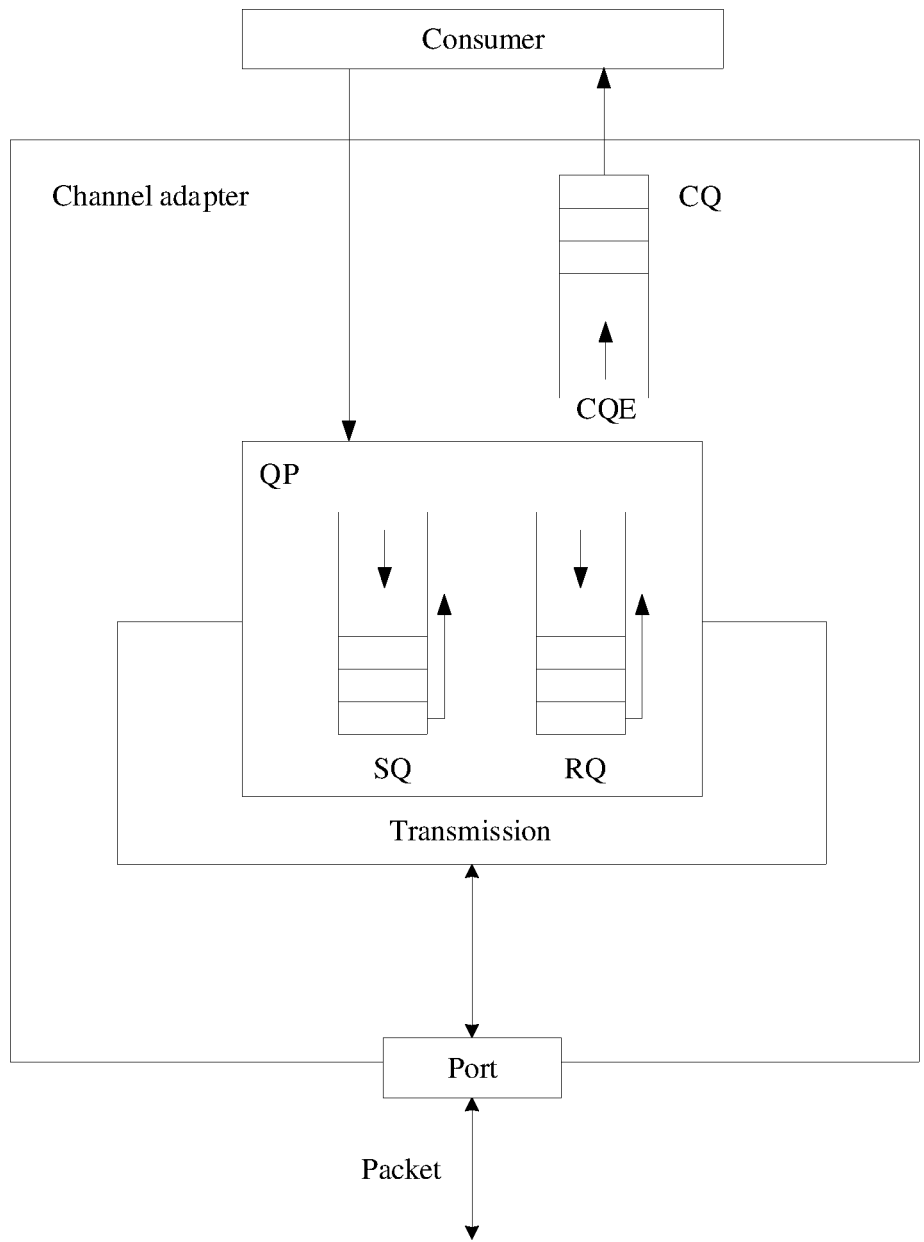
FIG. 2 is an example schematic diagram of a QP according to an embodiment of this application.

As shown in FIG. 2, RDMA is a transport layer network protocol, and a queue pair (QP) is used in a channel adapter (CA) to send and receive data (e.g., as a message) of a consumer. Each QP contains one send queue (SQ) and one receive queue (RQ). The SQ is responsible for sending messages, and the RQ is responsible for receiving messages. The SQ and the RQ of each QP may be associated with completion queues (CQ), respectively. Each QP has its own connection context for maintaining its connection status. The SQ, the RQ, and the CQ have their own queue contexts for maintaining their queue usage statuses.

The consumer in the embodiments of this application refers to a body that uses the QP to receive and send messages, and is usually a software process, such as NoF protocol software.

When sending a message, the consumer posts a work queue element (WQE) to an SQ in a QP of a current node (as a requester). The WQE includes an RDMA operation type, an initial address of storage space pointing to a to-be-transmitted message, and a size of the to-be-transmitted message. Data to be transmitted is used as a message. A length of the message can range from 0 bytes to 2G bytes. The network interface card segments the data to which the WQE points into packets based on a path maximum transmission unit (PMTU) and sends the packets to the network. After the network interface card has transmitted all content of the message to which the WQE points, the network interface card posts a completion queue element (CQE) to a CQ associated with the SQ, to notify the consumer that an RDMA operation indicated by the WQE posted by the consumer is completed.

For reception of a SEND message, before receiving the message, the consumer posts a WQE to an RQ in the QP of the current node (as a responder) in advance. The WQE includes a pointer of storage space capable of storing data, and a size of the storage space capable of storing data. The network interface card receives data from the front-end fabric and writes the data to the storage space to which the WQE of the RQ points. After completing receiving data, the network interface card posts a CQE to a CQ associated with the RQ, to notify the consumer that the consumer has completed receiving an RDMA message. For reception of an RDMA READ response message, the network interface card writes received data to storage space to which a WQE of a corresponding RDMA READ operation points. For reception of the last packet or a single packet of the RDMA READ response message, after completing receiving the data, the network interface card posts a CQE to the CQ associated with the SQ, to notify the consumer that the RDMA READ operation indicated by the WQE posted by the consumer is completed. For reception of an acknowledgment packet of an RDMA WRITE message or an RDMA SEND message, the network interface card posts a CQE to the CQ associated with the SQ, to notify the consumer that an RDMA WRITE operation or an RDMA SEND operation indicated by the WQE posted by the consumer is completed. For details about acknowledgment packets of the SEND message, the RDMA READ response message, and the RDMA WRITE message, refer to the following description.

Figure 3:
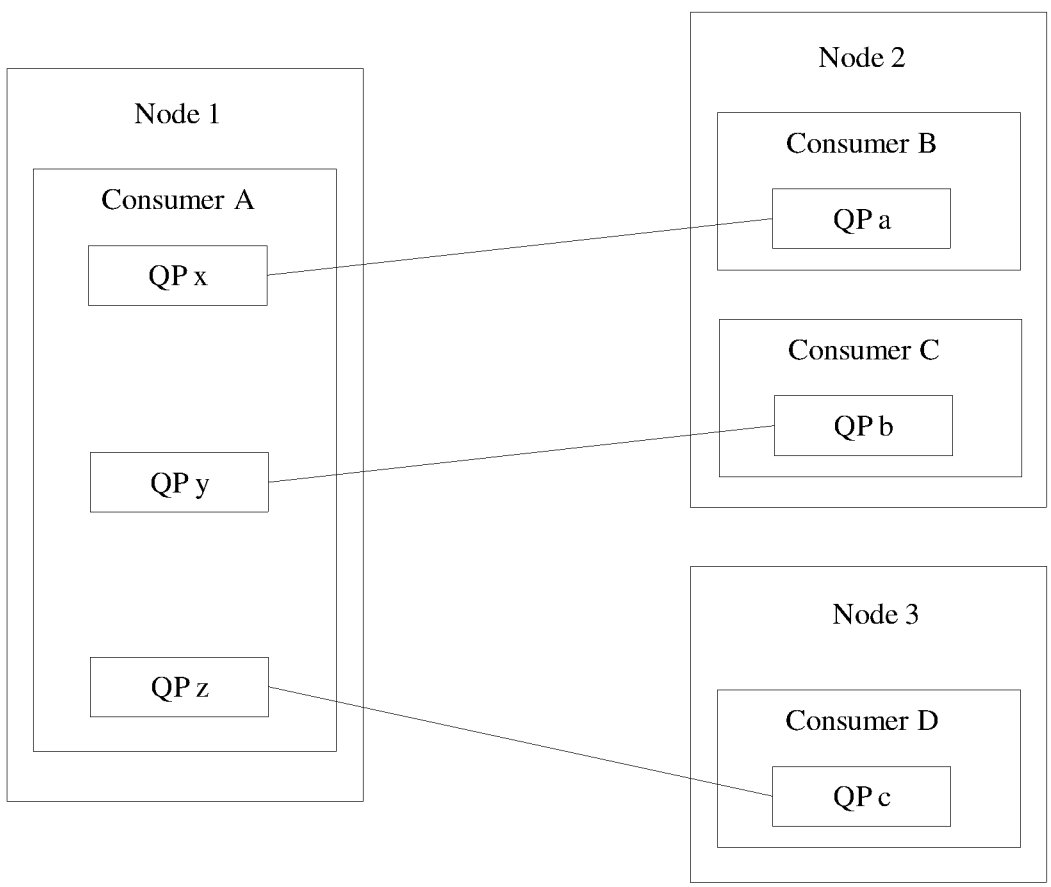
FIG. 3 is an example schematic diagram of QP connections of reliable connections according to an embodiment of this application.

The RDMA supports a QP connection of a reliable connection and a QP connection of an unreliable connection. The QP connection of the reliable connection only supports a one-to-one communication model. In other words, one QP on one node can establish a QP connection to only one QP of another node, and no QP can establish a QP connection to a plurality of QPs of another node at the same time. For example, as shown in FIG. 3, a QP x of a consumer A on a node 1 establishes a QP connection to a QP a of a consumer B on a node 2, and the QP x of the consumer A on the node 1 cannot establish a QP connection to another QP (such as, a QP b or a QP c) at the same time. The NoF communicates by using the RDMA that supports the QP connection of the reliable connection.

Figure 4:
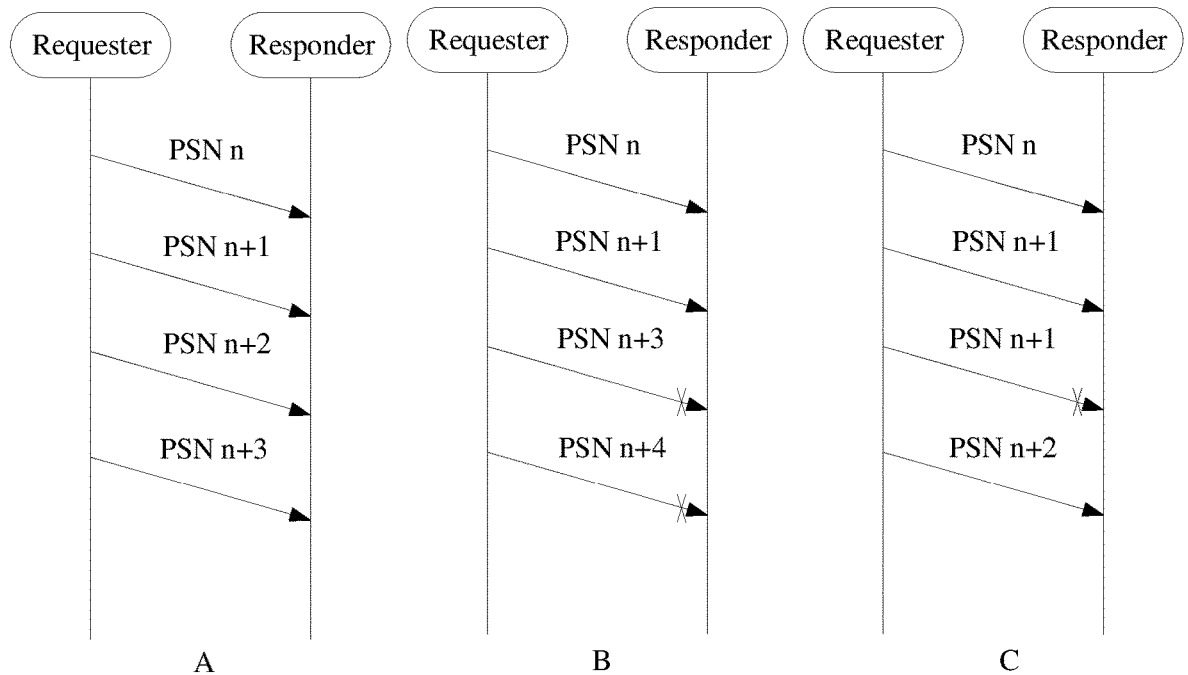
FIG. 4 is an example schematic diagram of PSNs of an RDMA packet that increase in an order-preserving manner according to an embodiment of this application.

Packets of the QP connection of the reliable connection received by the RDMA should follow a strict order-preserving requirement. A responder determines whether to receive the packets based on whether packet sequence numbers (PSN) in the received packets increase in a strict order-preserving manner. As shown in A in FIG. 4, the responder receives packets only when PSNs of the packets increase strictly (for example, the PSNs of the packets are n, n+1, n+2, and n+3 in sequence). As shown in B in FIG. 4, when PSNs of packets jump (for example, n+2 is missing in the PSNs of the packets), the responder discards all subsequent packets of the QP whose PSNs do not strictly increase. As shown in C in FIG. 4, when a PSN of a packet is the same as a PSN of a received packet (for example, a packet whose PSN is n+1 is repeatedly received), the responder discards the repeated packet.

The message type operation supported by the RDMA includes a send operation (SEND operation). The operation involves a processor and is suitable to transmit a control packet (or referred to as a command message).

The memory type operation supported by the RDMA includes an RDMA read operation (RDMA READ operation) and an RDMA write operation (RDMA WRITE operation). These operations do not involve a processor. Reading or writing data is completed by using the network interface card to operate storage space, and are suitable to transmit a data packet (or referred to as a data message).

The following separately describes the send operation, the RDMA read operation, and the RDMA write operation.

Send Operation:

The send operation may also be referred to as a push operation or having channel semantics. The requester pushes the data to the responder without knowing where the data is stored in the responder. A channel adapter of the responder stores the data in next available storage space of a QP of the responder. The storage space is indicated by a WQE in a header of an RQ of the QP.

The requester may send a SEND message to initiate the send operation. The message includes data to be pushed to the responder. A length of the data may range from 0 bytes to 231 (2G) bytes. If the length of the data is greater than a path maximum transmission unit (PMTU), the data is segmented into a plurality of packets based on a PMTU size, and the responder reassembles the packets to obtain the data. For a reliable connection, if the data is a short message (that is, the data does not need to be segmented into a plurality of packets), the responder sends an acknowledgment (ACK) packet to the requester for each packet. If the data is a long message (that is, the data is segmented into a plurality of packets), the responder may send an acknowledgment (ACK) packet to the requester for each packet, or send an acknowledgment packet to the requester for a plurality of consecutive packets of a same message, or send an acknowledgment packet to the requester for the last packet of a message. In addition, regardless of whether the data is a short message or a long message, the responder may send an acknowledgment (ACK) packet for a plurality of previously received packets. For example, an acknowledgment packet of a SEND message whose PSN is X may be used to confirm that a message whose PSN is less than X before the SEND message has been successfully received by the responder.

Each SEND message may include four-byte immediate data (ImmDt). If the immediate data is to be included, the immediate data is included in an additional header field (an immediate data extended transport header or an ImmDt field) of the last packet in the SEND message.

Figure 5A:
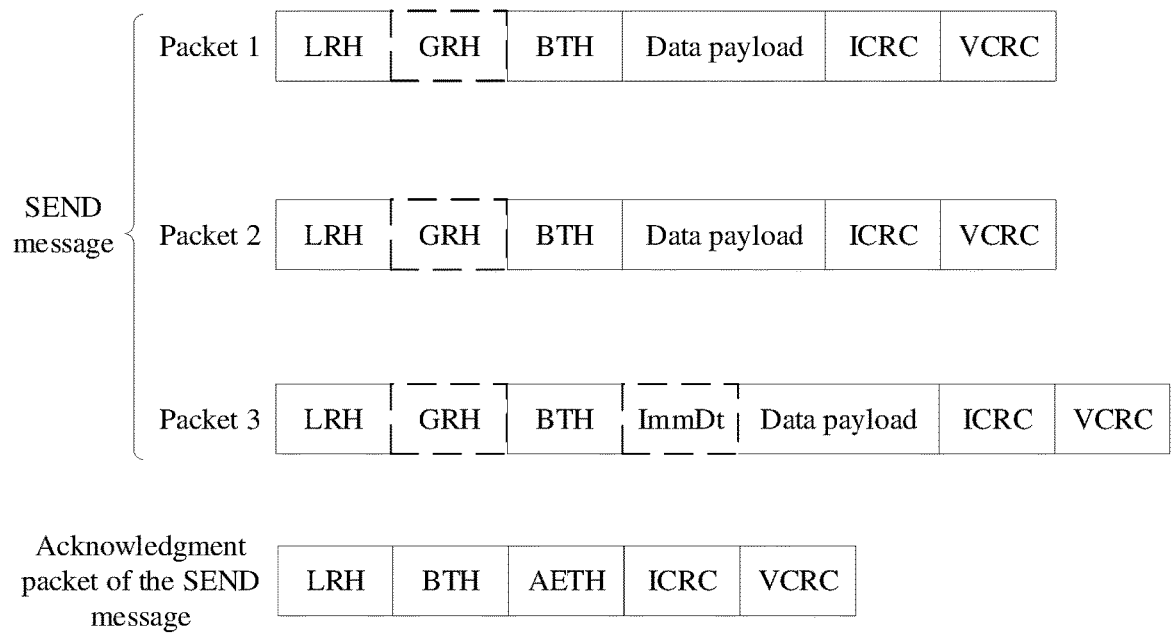
FIG. 5A is an example schematic diagram of structures of a SEND message based on an IB protocol and an acknowledgment packet of the SEND message according to an embodiment of this application.
Figure 5B:
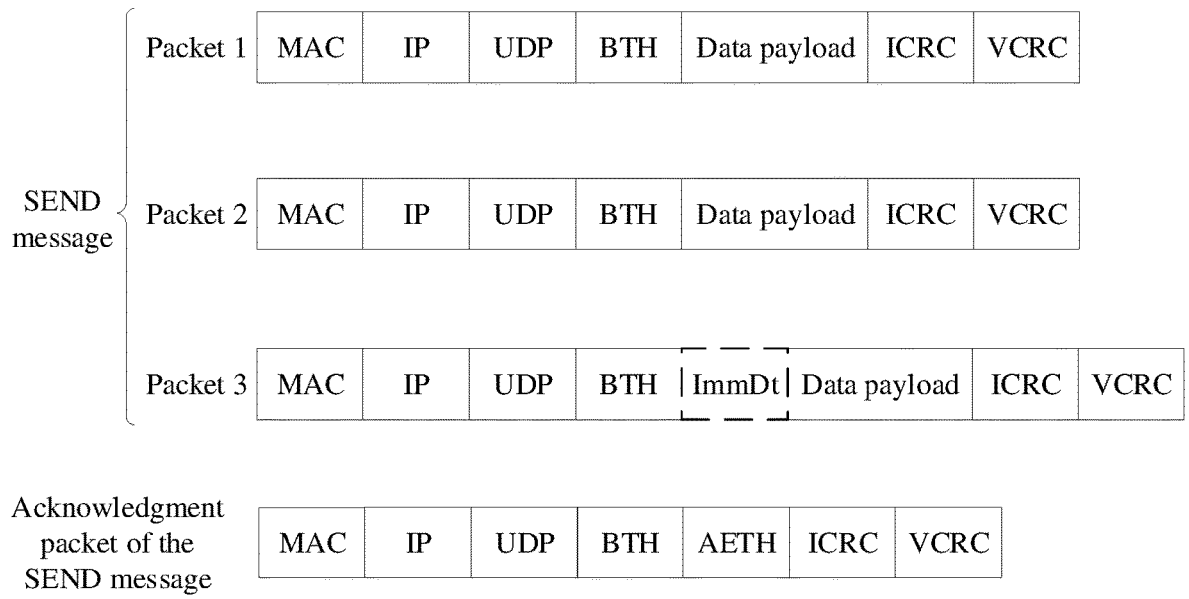
FIG. 5B is an example schematic diagram of structures of a SEND message based on a RoCEv2 protocol and an acknowledgment packet of the SEND message according to an embodiment of this application.
Figure 6:
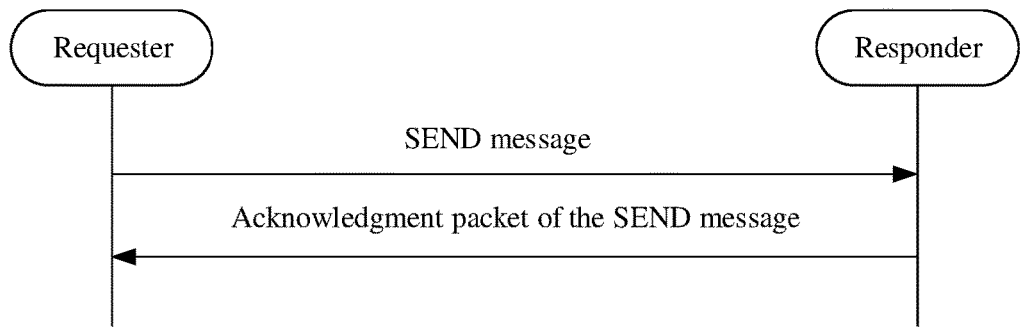
FIG. 6 is an example schematic diagram of an interaction process between a requester and a responder of a reliable connection according to an embodiment of this application.

For example, assuming that the SEND message is segmented into three packets, structures of a SEND message based on an IB protocol and an acknowledgment packet of the SEND message are shown in FIG. 5A, structures of a SEND message based on a RoCEv2 protocol and an acknowledgment packet of the SEND message are shown in FIG. 5B, and a process of interaction between a requester and a responder of a reliable connection is shown in FIG. 6.

A local route header (LRH) field is used to perform routing by using a switch in a subnet.

A global route header (GRH) field is used to route to a destination outside a local subnet of a sender.

An invariant CRC (ICRC) field covers all fields that should not be changed in a packet, and CRC check is performed on these fields.

A variant CRC (VCRC) field covers all fields of a packet and CRC check is performed on these fields.

An acknowledgment extended transport header (AETH) includes an additional transport field of an acknowledgment packet, which is included in each acknowledgment packet of a SEND message.

A media access control (MAC) field is used to perform Layer-2 forwarding by using a switch in an Ethernet subnet.

An internet protocol (IP) field is used to perform Layer-3 forwarding by using a switch.

A user datagram protocol (UDP) field is used to indicate that a payload of a packet is an RDMA message.

A base transport header (BTH) field is used to indicate a destination QP, an operation code, a packet sequence number (PSN), and a partition. An operation code field (OpCode field) in the BTH field determines a start and an end of a SEND message.

For a SEND message, if a length of data is less than or equal to the PMTU, a BTH operation code "SEND Only" or "SEND Only with Immediate" is used, indicating that the message cannot be split (that is, the message is a single packet).

If the length of the data is zero, the BTH operation code "SEND Only" or "SEND Only with Immediate" is used, and a data payload field is not present in the message. For the SEND message whose BTH operation code is "SEND Only", other fields are shown in a packet 1 in FIG. 5A or FIG. 5B. For the SEND message whose BTH operation code is "SEND Only with Immediate", other fields are shown in a packet 3 in FIG. 5A or FIG. 5B.

If the length of the data is greater than the PMTU, a BTH operation code of the first packet is "SEND First", indicating that the packet is the first packet. A BTH operation code of a middle packet is "SEND Middle", indicating that the packet is a middle packet. A BTH operation code of the last packet is "SEND Last" or "SEND Last with Immediate", indicating that the packet is the last packet.

For the acknowledgment packet of the SEND message, a BTH operation code is "Acknowledge".

For a specified QP of the requester, once a multi-packet send operation is started, other SEND messages, RDMA WRITE messages, or RDMA READ request messages cannot be sent before the packet whose operation code is "SEND Last" or "SEND Last with Immediate".

The responder does not know a final length of the data until the last packet with the operation code "SEND Last" or "SEND Last with Immediate" arrives.

It should be noted that, after completing receiving the single packet or the last packet of the SEND message, the responder reports the CQE to the CQ associated with the RQ of the current node; and after completing a sending procedure of a sending operation (receiving an acknowledgment packet corresponding to the single packet or the last packet of the SEND message), the requester posts the CQE to the CQ associated with the SQ of the current node.

RDMA Write Operation:

The RDMA write operation is used by a requester to write data to storage space of a responder.

Before allowing the requester to perform the RDMA write operation, the responder first allocates storage space for a QP (or a QP group) of the responder to access. A channel adapter of the responder associates a 32-bit M_Key key with a virtual address of the storage space. The responder sends the virtual address of the storage space, a length, and the M_Key key to the requester that can access this internal memory area. For example, the foregoing information may be sent to the requester by using the foregoing send operation.

The requester may initiate the RDMA write operation by sending an RDMA WRITE message. The message includes the data to be written to the responder, the virtual address of the storage space of the responder, a length of the data, and the M_Key key. The length of the data may range from 0 bytes to 231 bytes. Similar to the send operation, if the length of the data is greater than the PMTU, the data is segmented into a plurality of packets based on the PMTU size, and the responder reassembles the packets to obtain the data. For a reliable connection, if the data is a short message (that is, the data does not need to be segmented into a plurality of packets), the responder sends an acknowledgment (ACK) packet to the requester for each packet. If the data is a long message (that is, the data is segmented into a plurality of packets), the responder may send an acknowledgment (ACK) packet to the requester for each packet, or send an acknowledgment packet to the requester for a plurality of consecutive packets of same data, or send an acknowledgment packet to the requester for the last packet of a packet. In addition, regardless of whether the data is a short message or a long message, the responder may send an acknowledgment (ACK) packet for a plurality of previously received packets. For example, an acknowledgment packet of an RDMA WRITE message whose PSN is X may be used to confirm that a message whose PSN is less than X before the RDMA WRITE message has been successfully received by the responder.

Figure 7A:
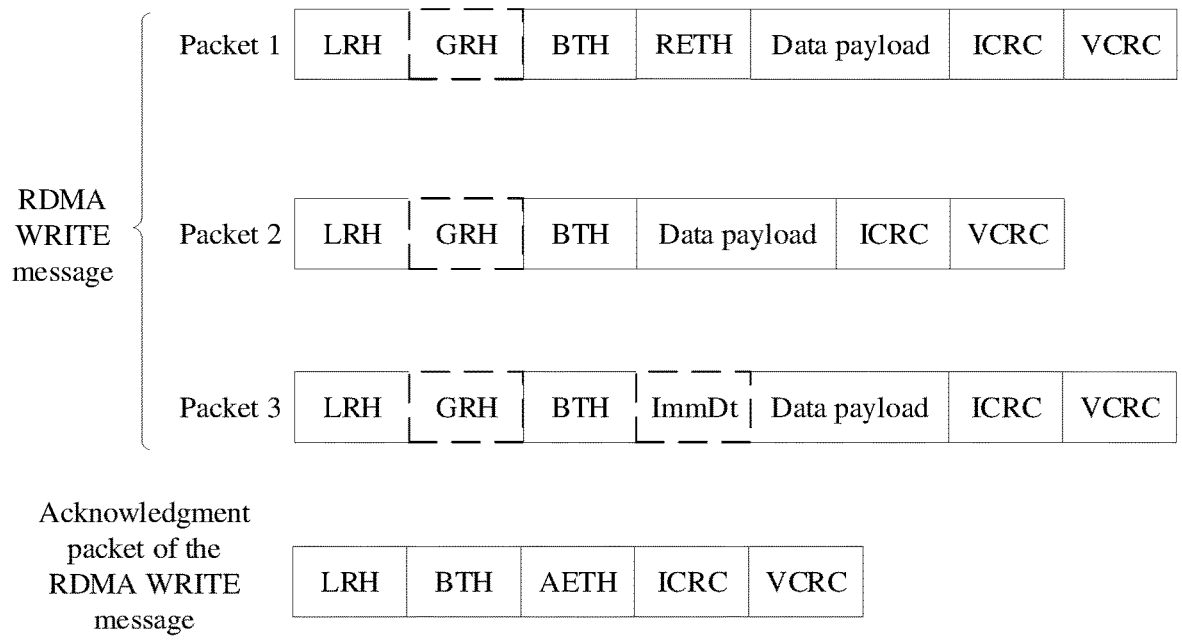
FIG. 7A is an example schematic diagram of structures of an RDMA WRITE message based on an IB protocol and an acknowledgment packet of the RDMA WRITE message according to an embodiment of this application.
Figure 7B:
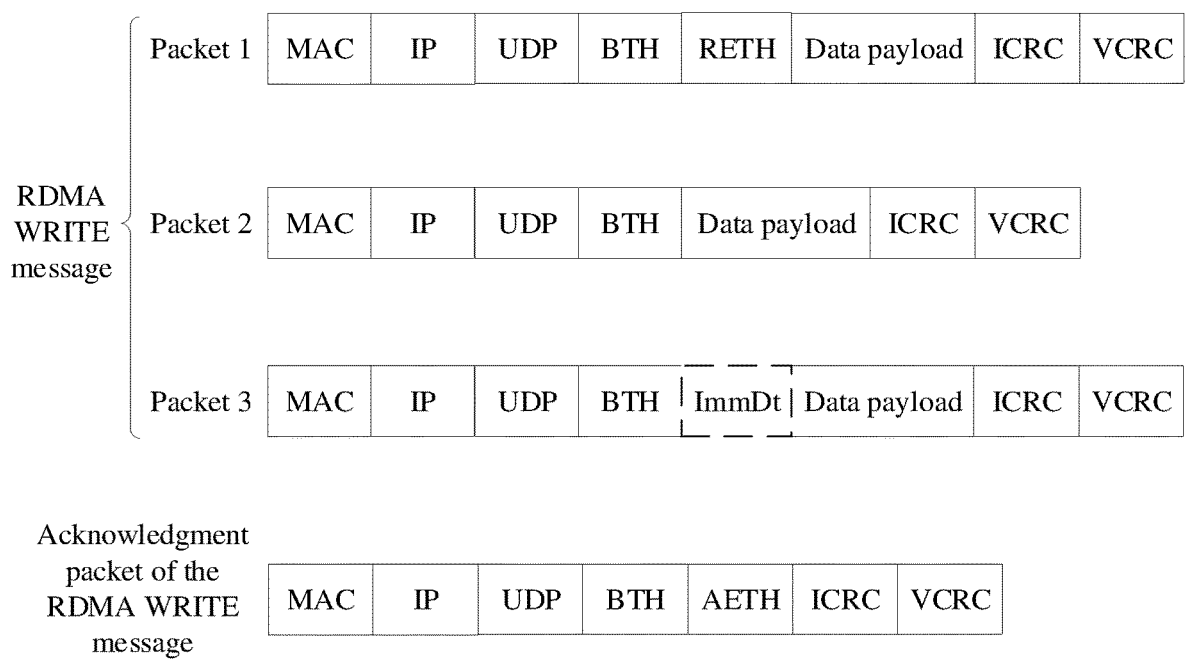
FIG. 7B is an example schematic diagram of structures of an RDMA WRITE message based on a RoCEv2 protocol and an acknowledgment packet of the RDMA WRITE message according to an embodiment of this application.
Figure 8:
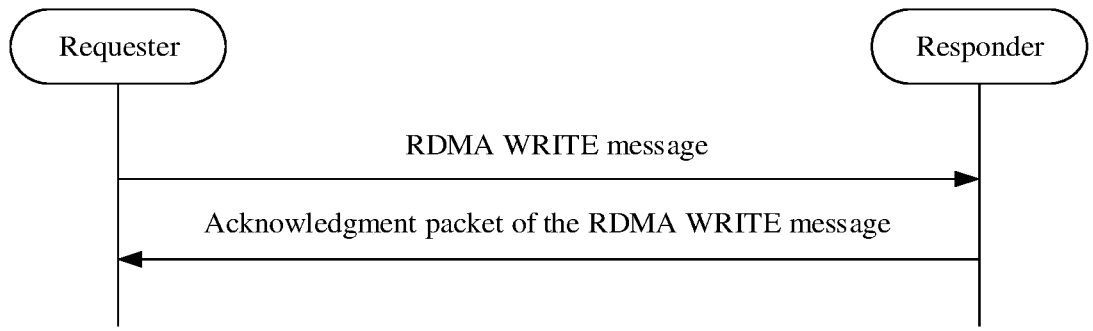
FIG. 8 is an example schematic diagram of an interaction process between a requester and a responder of another reliable connection according to an embodiment of this application.

For example, assuming that the RDMA WRITE message is segmented into three packets, structures of an RDMA WRITE message based on an IB protocol and an acknowledgment packet of the RDMA WRITE message are shown in FIG. 7A, and structures of an RDMA WRITE message based on a RoCEv2 protocol and an acknowledgment packet of the RDMA WRITE message are shown in FIG. 7B. FIG. 8 shows an interaction process between a requester and a responder of a reliable connection.

An RDMA extended transport header (RETH) includes an additional transport field of an RDMA operation. For example, a virtual address of target storage space, a length of data of the RDMA operation, and the M_Key key are included. The responder determines, based on the M_Key key, that the requester has a permission to access a corresponding virtual address, and stores data indicated by the length in storage space to which the virtual address points.

Similar to the SEND operation, an operation code field (OpCode field) in a BTH field determines a start and an end of the RDMA WRITE message.

For the RDMA WRITE message, if a length of data is less than or equal to the PMTU, a BTH operation code "RDMA WRITE Only" or "RDMA WRITE Only with Immediate" is used, indicating that the message is not split (that is, the message is a single packet).

If the length of the data is zero, the BTH operation code "RDMA WRITE Only" or "RDMA WRITE Only with Immediate" is used, and a data payload field is not present in the message. For the RDMA WRITE message whose BTH operation code is "RDMA WRITE Only", other fields are shown in a packet 1 in FIG. 7A or FIG. 7B. For the RDMA WRITE message whose BTH operation code is "RDMA WRITE Only with Immediate", an ImmDt field is added after an RETH field in the packet 1 in FIG. 7A or FIG. 7B, and other fields are shown in the packet 1.

If the length of the data is greater than the PMTU, a BTH operation code of the first packet is "RDMA WRITE first", indicating that the packet is the first packet. A BTH operation code of a middle packet is "RDMA WRITE Middle", indicating that the packet is a middle packet. A BTH operation code of the last packet is "RDMA WRITE Last" or "RDMA WRITE Last with Immediate", indicating that the packet is the last packet.

For the acknowledgment packet of the RDMA WRITE message, a BTH operation code is "Acknowledge".

RDMA Read Operation:

The RDMA read operation is a reverse operation of an RDMA write operation, and is used by a requester to read data in storage space of a responder.

Before allowing the requester to perform the RDMA read operation, the responder first allows the requester to access a virtual address of the responder. In other words, the responder sends a virtual address of data to be read by the RDMA read operation, a length, and an M_Key key to the requester. For example, the foregoing information may be sent to the requester by using the foregoing send operation.

The requester may initiate the RDMA read operation by sending an RDMA READ request (RDMA READ Request) message. The message includes a virtual address of storage space of the responder, a length of data of an RDMA operation, and the M_Key key. The responder sends an RDMA READ Response (RDMA READ Response) message to the requester, and the message includes to-be-read data. A length of the to-be-read data may range from 0 bytes to 231 bytes. If the length is greater than the PMTU, the to-be-read data is segmented into a plurality of packets based on the PMTU size, so that the packets are transmitted by using packets of a plurality of RDMA READ response messages, and the requester reassembles the packets to obtain the data. For a reliable connection, the RDMA READ response message does not have a corresponding acknowledgment packet. If the RDMA READ response message is found to be lost, the requester re-initiates an RDMA read operation.

Figure 9A:
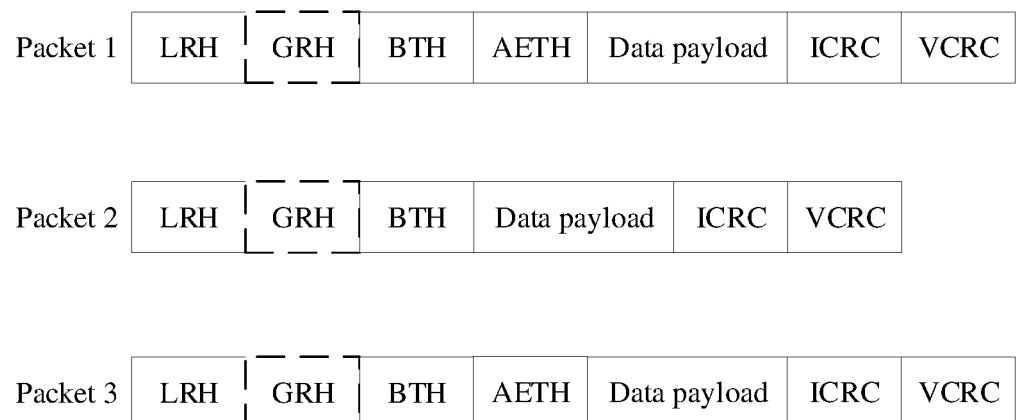
FIG. 9A is an example schematic diagram of structures of an RDMA READ request message based on an IB protocol and an RDMA READ response message according to an embodiment of this application.
Figure 9B:
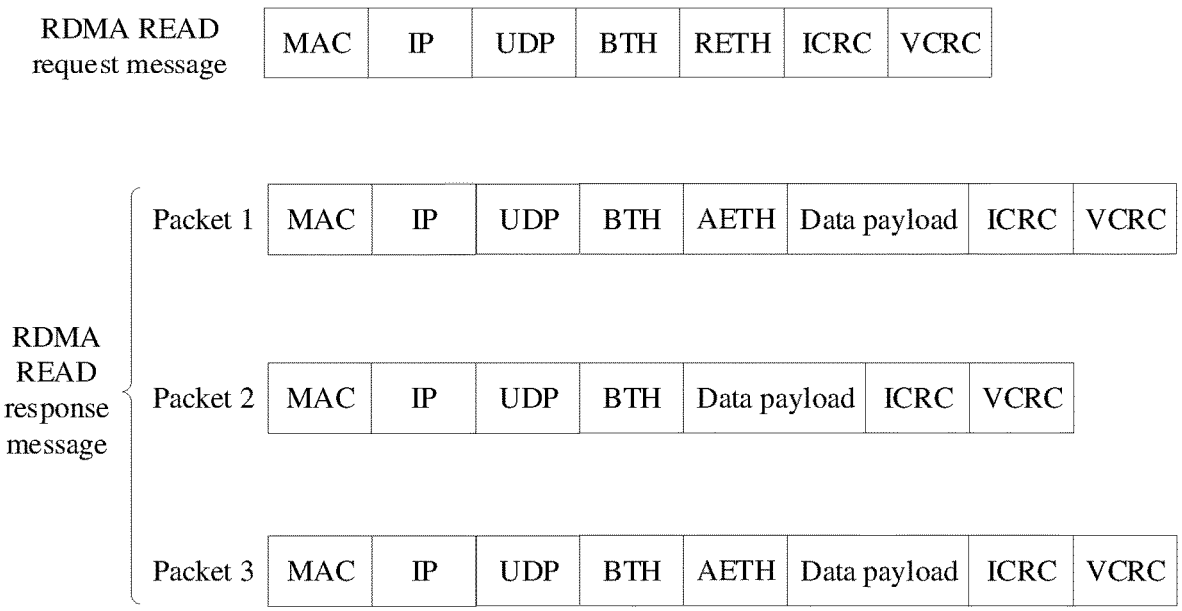
FIG. 9B is an example schematic diagram of structures of an RDMA READ request message based on a RoCEv2 protocol and an RDMA READ response message according to an embodiment of this application.
Figure 10:
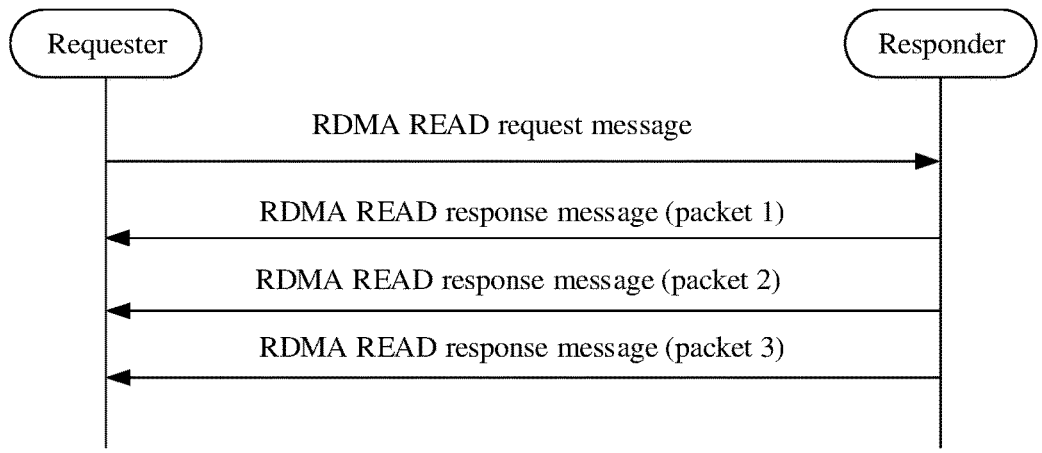
FIG. 10 is an example schematic diagram of an interaction process between a requester and a responder of still another reliable connection according to an embodiment of this application.

For example, assuming that the RDMA READ response message is segmented into three packets, structures of an RDMA READ request message based on an IB protocol and the RDMA READ response message are shown in FIG. 9A, and structures of an RDMA READ request message based on a RoCEv2 protocol and the RDMA READ response message are shown in FIG. 9B. FIG. 10 shows an interaction process between a requester and a responder of a reliable connection.

An operation code field (OpCode field) in a BTH field determines a start and an end of a message (the RDMA READ request message or the RDMA READ response message).

For the RDMA READ request message, a BTH operation code is "RDMA READ Request".

For the RDMA READ response message, if a length of data is less than or equal to the PMTU, a BTH operation code "RDMA READ Response Only" is used, indicating that the message cannot be split (that is, the message is a single packet).

If the length of the data is zero, the BTH operation code "RDMA READ Response Only" is used, and a data payload field is not present in the RDMA read response message, but all other fields are shown in a packet 1 in FIG. 9A or FIG. 9B.

If the length of the data is greater than the PMTU, a BTH operation code of the first packet is "RDMA READ Response first", indicating that the packet is the first packet. A BTH operation code of a middle packet is "RDMA READ Response Middle", indicating that the packet is a middle packet. A BTH operation code of the last packet is "RDMA READ Response Last", indicating that the packet is the last packet.

Figure 11:
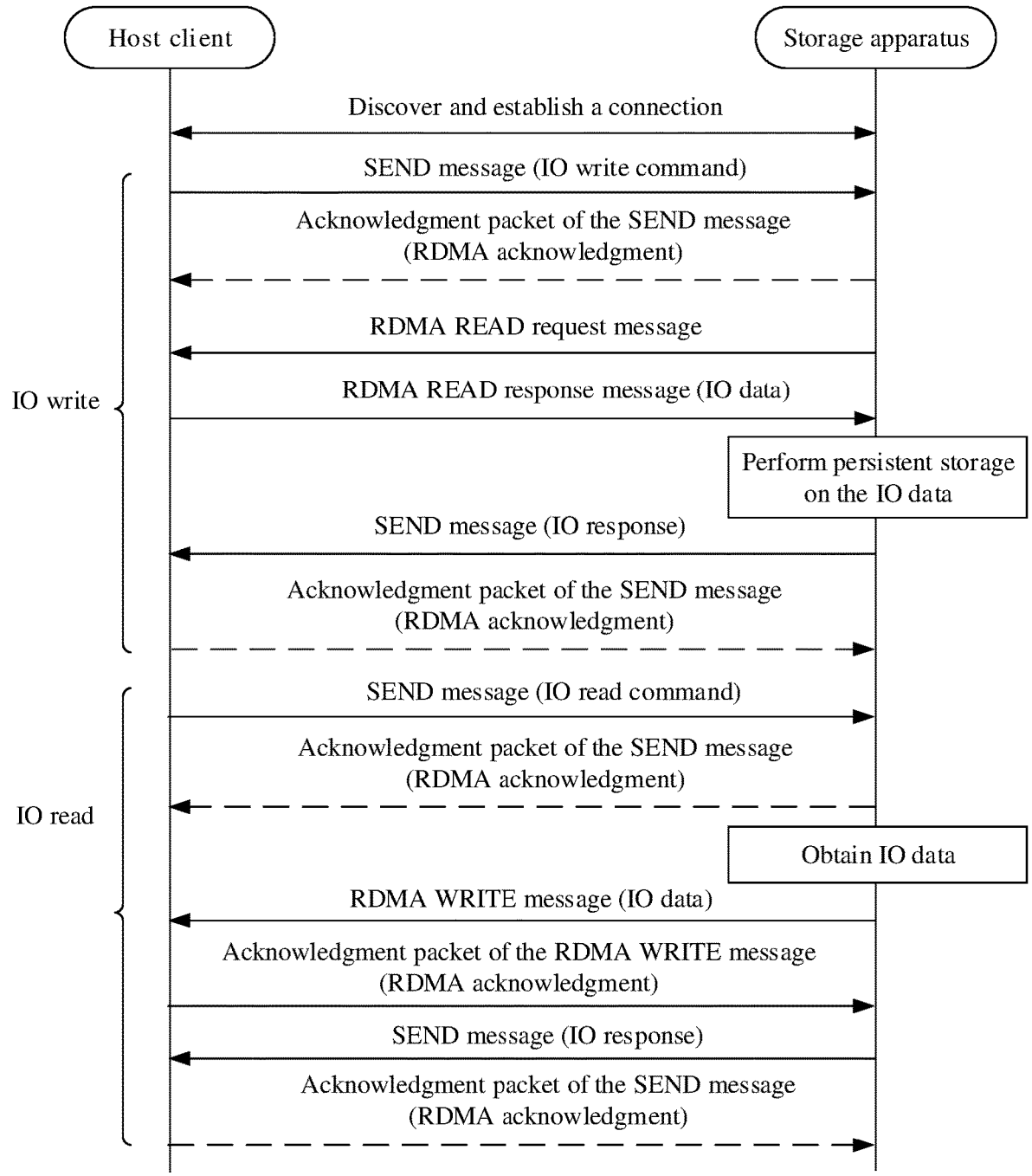
FIG. 11 is an example schematic diagram of a process in which a host client and a storage apparatus complete IO read/write by using an RDMA operation according to an embodiment of this application.

FIG. 11 shows a process in which a host client and a storage apparatus complete IO read/write by using the foregoing RDMA operation.

The host client first discovers the storage apparatus in a network and establishes a connection to the storage apparatus.

When the host client performs an IO write process on the storage apparatus, the host client sends a SEND message to the storage apparatus. A data payload of the packet is an IO write command. For a reliable connection, the storage apparatus may send an acknowledgment packet of the SEND message to the host client, indicating that the IO write command is received. Then, the storage apparatus (as a requester) sends an RDMA READ request message to the host client (as a responder), and the host client sends an RDMA READ response message to the storage apparatus. A data payload of the packet is IO data. After performing persistent storage on the IO data, that is, after storing the IO data in a storage medium such as a hard disk drive (HDD) or a solid-state drive (SSD), the storage apparatus sends the SEND message to the host client. The packet includes an IO response, indicating that the IO write process is completed. The host client sends the acknowledgment packet of the SEND message to the storage apparatus, indicating that the IO response is received.

When the host client performs an IO read process on the storage apparatus, the host client sends a SEND message to the storage apparatus. A data payload of the packet is an IO read command. For a reliable connection, the storage apparatus may send an acknowledgment packet of the SEND message to the host client, indicating that the IO read command is received. After the storage apparatus obtains IO data, that is, after obtaining IO data from a storage medium such as an HDD or an SSD, the storage apparatus (as a requester) sends an RDMA WRITE message to the host client (as a responder). A data payload of the packet is the IO data. The host client sends an acknowledgment packet of the RDMA WRITE message to the storage apparatus. The storage apparatus sends the SEND message to the host client. The packet includes an IO response, indicating that the IO read process is completed. The host client sends the acknowledgment packet of the SEND message to the storage apparatus, indicating that the IO response is received.

It can be seen that, in a complete IO write process, a command message (for example, a command request and a command response) is transferred by using a SEND operation, and a data message is transferred by using an RDMA READ operation, and in a complete IO read process, a command message is transferred by using a SEND operation, and a data message is transferred by using an RDMA WRITE operation.

Figure 12:
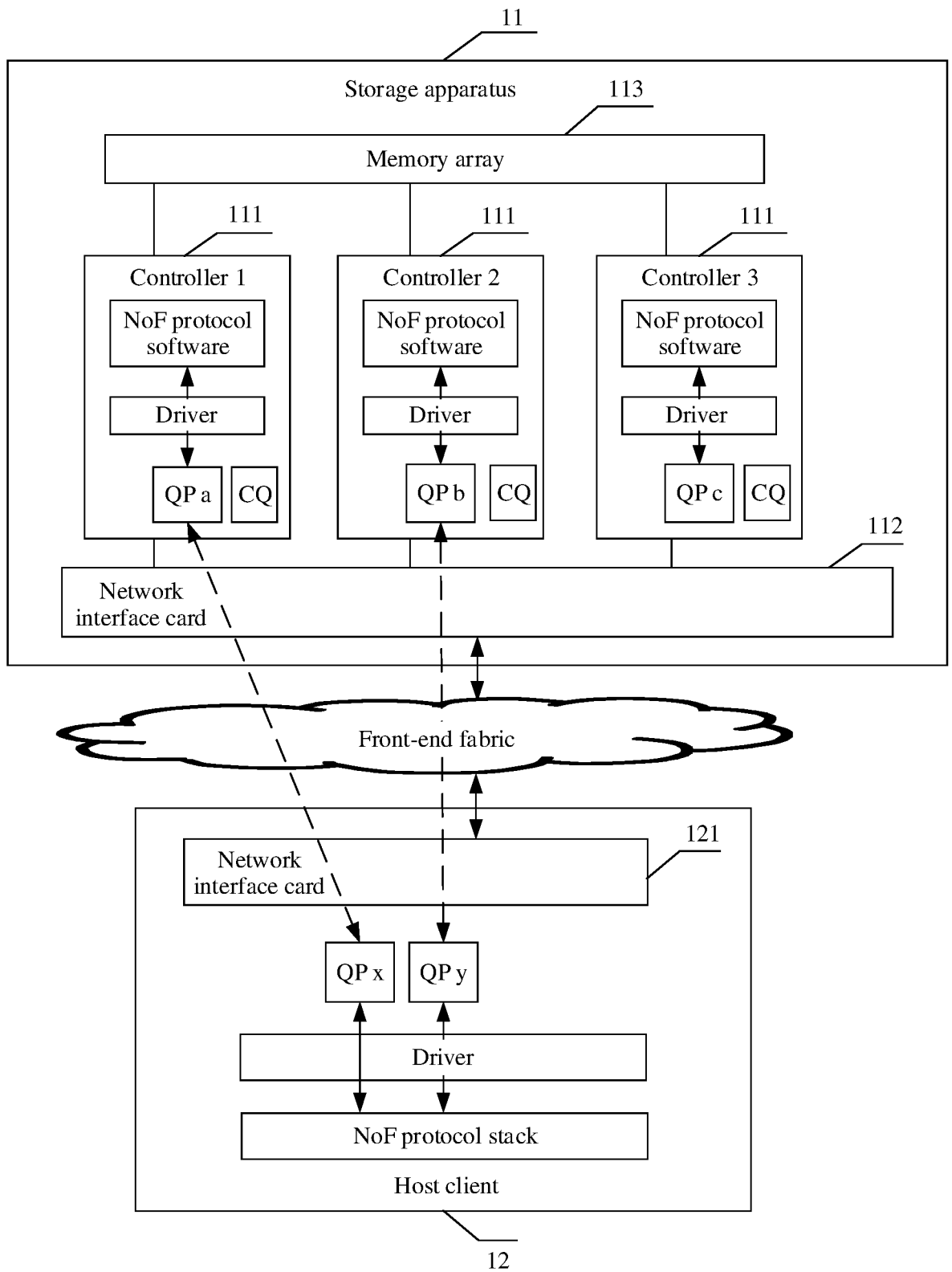
FIG. 12 is an example schematic diagram of an architecture of another storage system according to an embodiment of this application.

Based on a storage system shown in FIG. 1, FIG. 12 shows an architecture in which a front-end fabric is implemented between a storage apparatus 11 and a host client 12 by using RDMA.

NoF protocol software (which may also be referred to as an NoF protocol stack) and a driver (driver) are implemented in each controller 111 of the storage apparatus 11. The NoF protocol software and the driver are also implemented in the host client 12. The NoF protocol software and the driver run in a processor. The NoF protocol software is used as an application program, and the driver provides an interface for the NoF protocol software to control a network interface card.

Each controller 111 of the storage apparatus 11 is used as a node and corresponds to at least one QP, and a plurality of controllers 111 share a network interface card (for example, an RNIC) 112. The host client 12 includes a network interface card (for example, an RNIC) 121. One QP may be used to establish a reliable connection to a QP of one controller 111 in the storage apparatus 11 by using the network interface card 121 as required, or a plurality of QPs may be used to establish reliable connections to QPs of a plurality of controllers 111 in the storage apparatus 11, respectively.

The controller 111 stores data from the host client in a memory array 113, or reads data from the memory array 113 and sends the data to the host client by using the network interface card 112.

When the host client establishes a connection to the storage apparatus by using an NoF network, the NIC of the storage apparatus selects, according to a hash policy, one of the controllers to establish a QP connection to the host client. The host client is unaware of which controller in the storage apparatus provides a service. When a controller is faulty, the host client disconnects a QP connection between the host client and the controller because the host client does not receive a response from the storage apparatus. In this case, the storage apparatus cannot provide a storage service for the host client, reliability of the storage system is affected, and a user may be aware of the fault.

In this embodiment of this application, in a scenario where the storage apparatus may serve the host client by using one of the plurality of controllers, after a controller is faulty, the NIC distributes a packet sent to the faulty controller to a controller that works properly, and the controller that works properly maintains a QP connection status and responds, so that the host client is unaware of the fault. Therefore, the QP connection is not disconnected.

Figure 13:
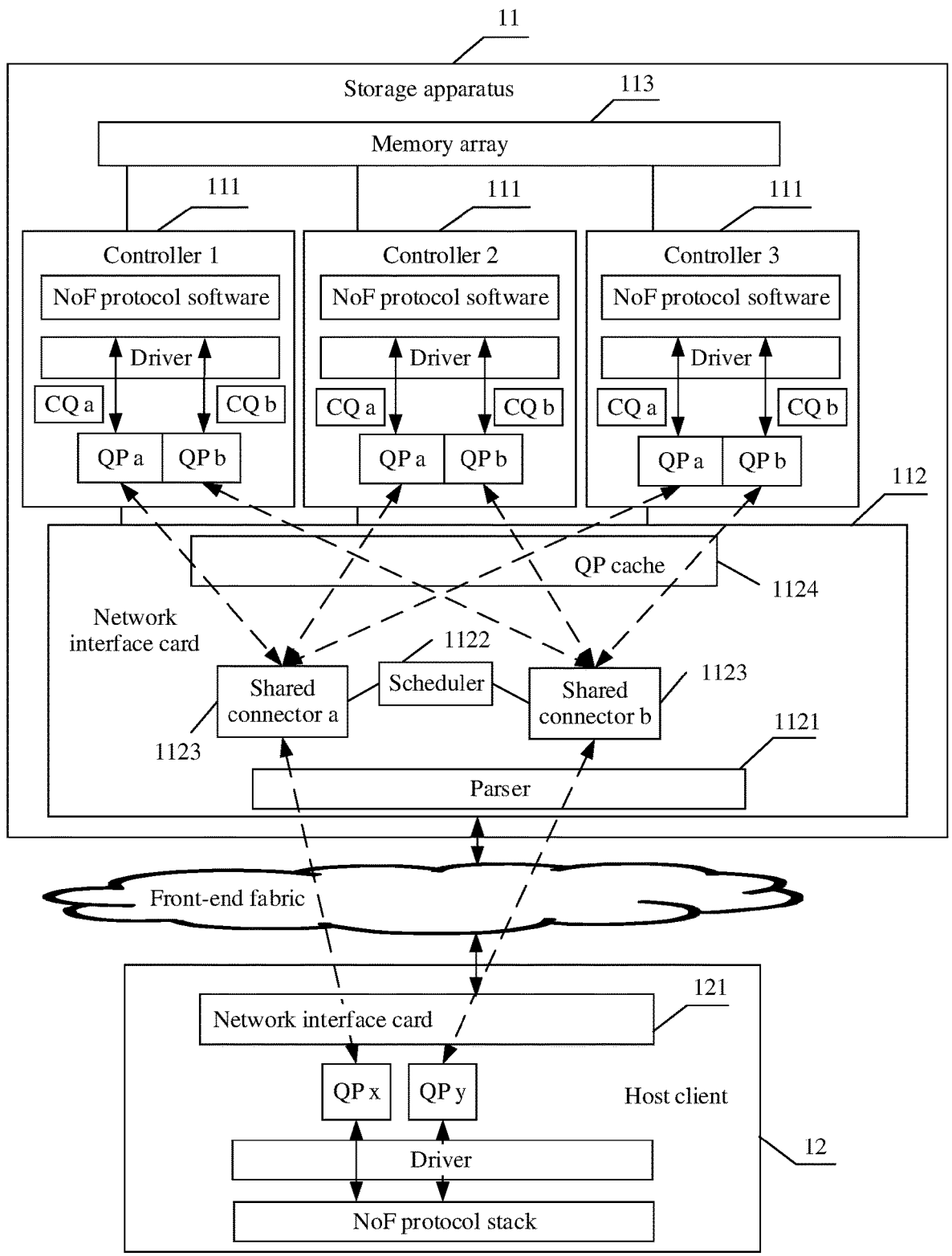
FIG. 13 is an example schematic diagram of an architecture of still another storage system according to an embodiment of this application.

Therefore, as shown in FIG. 13, an embodiment of this application provides another network interface card, another storage apparatus, and another storage system.

The storage apparatus 11 includes a plurality of controllers 111, at least one network interface card (for example, an RNIC) 112, and a memory array 113. The network interface card 112 may support a plurality of host clients, for example, support two or more host interfaces (for example, a PCIe interface). The network interface card 112 may support a PCIe standard, and may subsequently support another interface standard.

The network interface card 112 includes a parser 1121, a scheduler 1122, at least one shared connector 1123, and a QP cache 1124. The parser 1121, the scheduler 1122, and the at least one shared connector 1123 may be an application-specific integrated circuit (ASIC) chip module, may be firmware burnt to a programmable logic device (PLD), or may be a software module running on a processor, a microprocessor, or an embedded processor. This is not limited in this application.

At least one QP (which may also be referred to as an SQ/RQ pair, and a name is not limited) and a CQ associated with the at least one QP are established on each controller 111. The shared connector 1123 is separately connected to the plurality of controllers 111, and each controller 111 in the plurality of controllers and the shared connector 1123 correspond to one QP. The network interface card 112 implements an operation on a QP by caching WQEs (a WQE of an SQ and a WQE of an RQ) of QPs in the plurality of controllers 111 to the QP cache 1124 in the network interface card 112.

The host client 12 may initiate a request to establish at least one QP connection to the at least one shared connector 1123 of the storage apparatus 11, and the QP connection may be a reliable connection or an unreliable connection. To be specific, the storage apparatus 11 establishes at least one QP connection to (at least one QP of) the host client 12 by using the at least one shared connector 1123 separately, and each QP connection corresponds to one shared connector 1123 and one QP of each controller 111. The foregoing one shared connector 1123 and one QP of each controller 111 may be collectively referred to as one QP group. That is, one QP connection corresponds to one QP group, and corresponds to one shared connector 1123 and one QP of each controller 111 in the QP group. A quantity of controllers corresponding to one QP connection can dynamically increase or decrease as the controllers are powered on or off.

The shared connector 1123 is visible to the host client 12, and each QP in the controllers 111 is invisible to the host client 12. To be specific, the network interface card 112 of the storage apparatus 11 communicates with a network interface card 121 of the host client 12 by using the shared connector 1123, and establishes a QP connection to one QP of the host client 12.

A queue context in an RDMA QP in a standard protocol may be carried on the QP, and a connection context may be carried on the shared connector 1123. All QPs in one QP group use a same connection context and a set of PSNs increasing in an order-preserving manner.

When the storage apparatus 11 receives a first RDMA packet from the host client 12, the parser 1121 is configured to distribute the received first RDMA packet to one of the at least one shared connector 1123; and the shared connector 1123 is configured to: establish a QP connection to a peer network device (for example, a host client), and determine, based on the first RDMA packet, a first QP corresponding to a first controller, to implement communication with the first controller, thereby notifying a corresponding consumer of the first RDMA packet. The plurality of controllers 111 include the first controller.

Specifically, regardless of a command message or a data message, a same message may be segmented into a plurality of packets, and information that can be used for distribution is usually present only in the first packet of the message. The shared connector 1123 distributes, according to a load balancing principle, the first packet of an IO command request to a controller 111 that works properly for storage, and stores a correspondence between the first packet and the controller 111, so that different IO command requests and corresponding data messages from one host client 12 can be distributed to different controllers 111 for parallel processing, thereby improving processing performance. If a subsequent packet of the message is subsequently received, the shared connector 1123 may correspond the subsequent packet to the first packet by using an order-preserving feature of RDMA transmission, and distribute the subsequent packet to a corresponding controller 111 based on the corresponding first packet and a correspondence between the first packet and the controller 111, to maintain consistency of packets of a same message in distribution.

For different messages, if the command message is received, the shared connector 1123 distributes, according to the load balancing principle, the command message to the controller 111 that works properly for storage, and stores a correspondence between the command message and the controller 111, so that a plurality of command messages from one host client 12 can be distributed to different controllers 111 for parallel processing, thereby improving processing performance. After processing an IO read/write request message, the controller initiates an IO data transmission operation. That is, the controller posts a WQE of a corresponding RDMA write operation or RDMA read operation to a corresponding QP. After receiving an acknowledgment packet of the RDMA write operation or a response message of the RDMA read operation, the first shared connector distributes, based on a PSN of the first RDMA packet, the acknowledgment packet of the RDMA write operation or the response message of the RDMA read operation to a first QP of a first controller that initiates the operation, to maintain consistency between the command message and the data message in distribution.

When the storage apparatus 11 sends a first RDMA message to the host client 12, the scheduler 1122 is configured to select, from a plurality of QPs of a plurality of in-position controllers 111, a second QP with a message to be sent; and the shared connector 1123 is configured to send the first RDMA message in storage space corresponding to the second QP to the host client 12.

When a controller has a to-be-transmitted message, one or more WQEs are added to an SQ of a QP of the controller. The WQE points to storage space of the to-be-transmitted message. The QP generates a doorbell signal, and the scheduler obtains the doorbell signal. The doorbell signal is used to indicate that there is a message (a data message or a command message) to be sent in the storage space to which the WQE in the SQ of the QP of the corresponding controller points.

The scheduler 1122 aggregates doorbell signals from all QPs, and does not directly trigger sending of an RDMA message. Instead, the scheduler 1122 selects a doorbell signal from the doorbell signals according to a preset rule to respond. A corresponding QP is the second QP, and a controller in which the second QP is located works properly.

A specific preset rule is not limited in this application. In a possible implementation, the scheduler may select, by using round robin (RR) scheduling, the second QP from a plurality of QPs (located in different controllers) corresponding to a second shared connector. The preset rule may further include another manner, for example, weighted round robin (WRR) scheduling or dynamic weighted round robin (DWRR) scheduling. Regardless of which preset rule is used, a QP of a controller that is not in position and an idle QP may be skipped during scheduling.

After determining that there is a controller 111 to send a message, the scheduler 1122 selects, according to a scheduling algorithm, a corresponding shared connector to send the message, and the shared connector 1123 sends the message to a corresponding host client 12 by using a corresponding QP connection, thereby implementing fair sending. In addition, for messages that are from different controllers 111 and that are of a same QP connection, before the messages are sent to the host client 12, it is ensured that PSNs increase in an order-preserving manner, so that the host client 12 considers that it is communicating with a QP of the storage apparatus 11.

Before sending a message, the shared connector 1123 segments the message into RDMA packets. However, a granularity of scheduling between QPs of different controllers in a same QP group is based on a WQE. That is, after a QP is scheduled, messages stored in the storage space to which the WQE points need to be continuously sent, and cannot be interrupted by another QP in the same QP group. The scheduling between different QP groups is independent and does not affect each other.

When sending messages of a plurality of QPs in this QP group, the shared connector 1123 uses a same set of PSNs. That is, PSNs carried in RDMA packets of different QPs in this QP group are obtained by increasing a same counter, so that the network interface card of the host client considers that these RDMA packets are from one QP of the storage apparatus.

In conclusion, a plurality of controllers 111 may work concurrently to provide a storage service for a same QP connection. When a controller 111 is faulty, if one controller 111 works properly, subsequent messages may be redirected and distributed to the controller 111 that works properly for processing, to ensure that the host client 12 accesses the memory array 113 in the storage apparatus 11, improve reliability, and implement an active-active (AA) function of the controllers in the storage apparatus 11. In addition, different IO command requests received by using a same QP connection may be distributed to controllers in which different QPs are located for parallel processing, so that storage access performance of a single QP connection may be improved.

The shared connector 1123 may manage NVME information (or referred to as NoF information). The NVME information refers to information exchanged between the storage apparatus and the network interface card of the host client. That is, the NVME information is stored in the network interface card instead of the controllers. Therefore, when a controller is faulty, the NVME information is not lost. The shared connector 1123 may provide a service for the host client by switching the controller. A new controller maintains communication with the host client based on the NVME information, and the QP connection is not disconnected, so that the host client is unaware of a fault of the controller.

Figure 14:
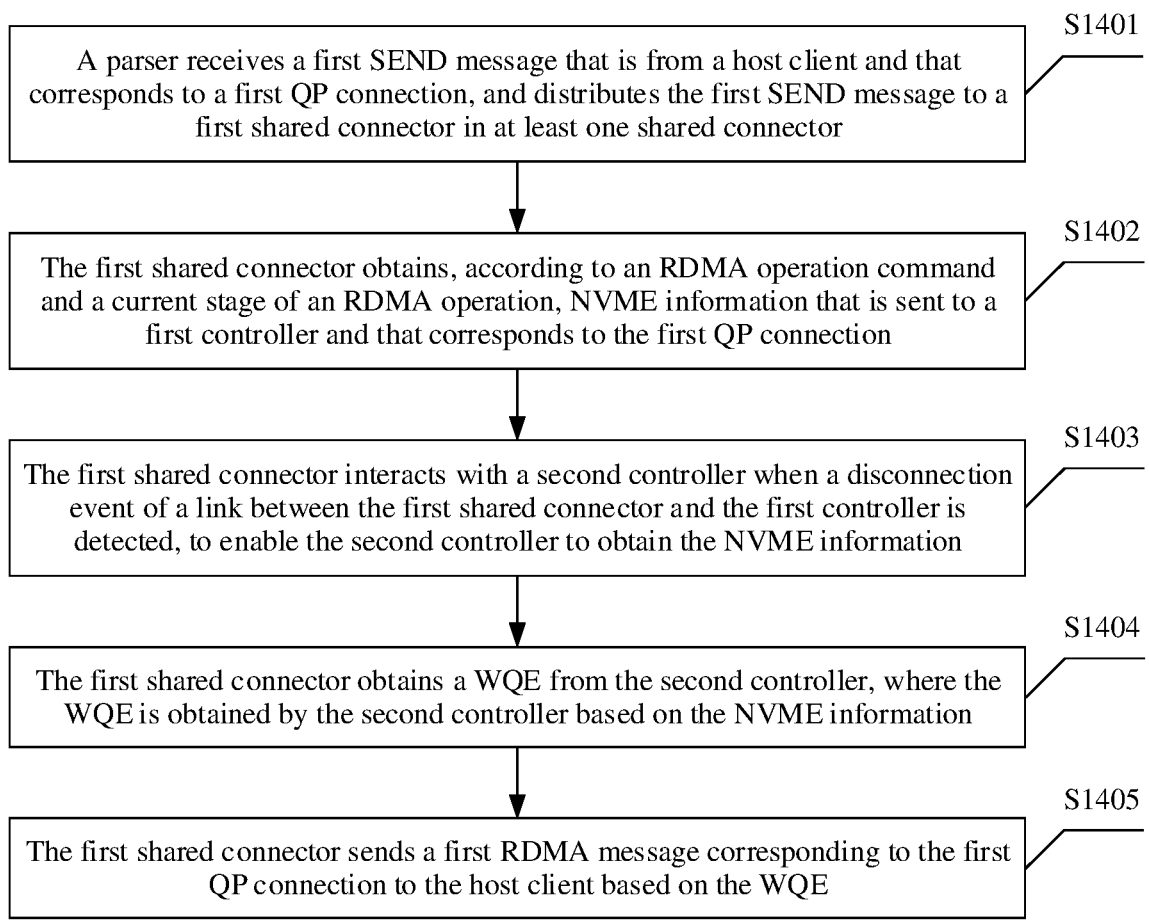
FIG. 14 is an example schematic flowchart 1 of a message sending and receiving method according to an embodiment of this application.

Specifically, a network interface card of a storage apparatus may perform a message sending and receiving method as shown in FIG. 14. The method includes the following steps.

S1401: A parser receives a first SEND message that is from a host client and that corresponds to a first QP connection, and distributes the first SEND message to a first shared connector in at least one shared connector.

The host client discovers the storage apparatus in a front-end fabric, and establishes at least one QP connection to the first shared connector in the at least one shared connector of the storage apparatus by using at least one QP. In this way, the host client may transmit data to the storage apparatus by using the at least one QP connection.

The host client sends the first SEND message corresponding to the first QP connection (one of the at least one QP connection) to the storage apparatus, and the parser may find a corresponding first shared connector based on the first QP connection. Specifically, the first SEND message includes a queue pair number (QPN), and the QPN is a unique identifier of a QP connection. The parser may determine, based on the QPN in the first SEND message, a corresponding first QP connection and a first shared connector establishing the first QP connection, and distribute the first SEND message to the first shared connector.

The first SEND message includes an RDMA operation command (or referred to as an NoF operation command), and the RDMA operation command may include an IO read command, an IO write command, or an IO write command with immediate data (or referred to as an immediate data IO write command). The first shared connector may initiate an RDMA operation according to the NoF operation command to access an internal memory of the host client. For the IO write command with the immediate data, the immediate data is located in an additional header field of the last packet of a SEND message, or in other words, the immediate data is located after NoF command data in the SEND message.

The IO read command includes a memory address of the host client, address information of the storage apparatus, and a size of data. The IO read command indicates that an RDMA operation type is an RDMA write operation. An internal memory address of the host client indicates an internal memory address in which the RDMA write operation stores data to the host client after the RDMA write operation reads the data from the storage apparatus. The address information of the storage apparatus indicates an address at which an RDMA read operation reads data from the storage apparatus. The size of the data indicates a size of data to be read by the RDMA read operation.

The IO write command includes a memory address of the host client, address information of the storage apparatus, and a size of data. The IO write command indicates that an RDMA operation type is an RDMA read operation. An internal memory address of the host client indicates that data is stored from the internal memory address of the host client to the storage apparatus in the RDMA read operation. The address information of the storage apparatus indicates an address at which an RDMA write operation is stored to the storage apparatus. The size of the data indicates a size of data to be stored in the RDMA write operation.

The IO write command with the immediate data includes address information of the storage apparatus and a size of data. The IO write command with the immediate data indicates that an RDMA operation type is an RDMA write operation with immediate data. The address information of the storage apparatus indicates an address at which the RDMA write operation is stored to the storage apparatus.

The size of the data indicates a size of data to be stored in the RDMA write operation. Data is sent together with an IO command, where the address information of the storage apparatus indicates an address at which an IO write operation is stored to the storage apparatus, and the size of the data indicates a size of data to be stored in the IO write operation.

S1402: The first shared connector obtains, according to the RDMA operation command and a current stage of the RDMA operation (which is an NoF IO operation herein), NVME information that is sent to a first controller and that corresponds to the first QP connection.

The first shared connector maintains different NVME information for different QP connections. That is, each QP connection corresponds to one piece of NVME information. In other words, each IO connection corresponds to one piece of NoF information, and an IO connection is carried by using one QP. Because one QP connection corresponds to one QP group, that is, corresponds to a plurality of controllers, the first shared connector maintains the NVME information corresponding to the first QP connection, to manage data sending and receiving of the plurality of controllers of the first QP connection.

The NVME information includes an RDMA operation type (or referred to as an NoF IO operation type), an NVMe IO status (or referred to as an NoF IO status), address information of the storage apparatus, and a size of data, and optionally, further includes an internal memory address of the host client.

The RDMA operation type in the NVME information may come from an RDMA operation command, and the RDMA operation type is selected according to an NoF operation command. For example, when the RDMA operation command is an IO read command, the RDMA operation type is an RDMA write operation; when the RDMA operation command is an IO write command, the RDMA operation type is an RDMA read operation; or when the RDMA operation command is an IO write command with immediate data, the RDMA operation type is an immediate data SEND operation.

The NVMe IO status is not only related to the RDMA operation command, but also related to the current stage of the RDMA operation.

For example, when the RDMA operation command is an IO read command, if the storage apparatus does not send an RDMA write message in an RDMA read operation process, the NVMe IO status is that the IO read command is received but the RDMA write message is not sent; or if an RDMA write message is sent but a SEND message including an IO response is not sent, the NVMe IO status is that the IO read command is received but the IO response is not sent.

When the RDMA operation command is an IO write command, if the storage apparatus does not send an RDMA read request message in an RDMA write operation process, the NVMe IO status is that the IO write command is received but the RDMA read request message is not sent. When the NoF operation command is an IO write command, if the storage apparatus does not send an RDMA read request message in an IO write operation process, the NoF IO status is that the IO write command is received but the RDMA read request message is not sent.

When the RDMA operation command is an IO write command including immediate data, if reception of a SEND message is completed, the NVMe IO status is that write data receiving is completed and an IO response is to be sent; or if the immediate data is not received, the NVMe IO status is that the IO write command including the immediate data is received but the immediate data is not received.

The address information of the storage apparatus in the NVME information comes from the address information of the storage apparatus in the RDMA operation command.

The size of the data in the NVME information comes from the size of the data in the RDMA operation command.

The internal memory address of the host client in the NVME information comes from the internal memory address of the host client in the RDMA operation command.

Assuming that the network interface card selects, according to a specific algorithm (for example, a hash algorithm), the first controller to process the RDMA operation in this case, the first shared connector determines that the NVME information may be sent to the first controller.

S1403: The first shared connector interacts with a second controller when a disconnection event of a link between the first shared connector and the first controller is detected, to enable the second controller to obtain the NVME information.

When the first controller is faulty, for example, irrecoverable advanced error reporting (AER) occurs in PCIe of the first controller, or a data receiving process of the first controller is faulty, the link between the first shared connector and the first controller is disconnected, and the disconnection event occurs.

The first shared connector may clear all WQEs posted by the first controller, to avoid reading and writing data by using the first controller again.

The first shared connector may reselect, according to a specific algorithm (for example, the hash algorithm), a second controller that works properly, and interact with the second controller, to enable the second controller to obtain the NVME information.

In a possible implementation, the first shared connector may send the NVME information to the second controller, to enable the second controller to obtain the NVME information.

In another possible implementation, the first shared connector may send a notification message (for example, an asynchronous event) to the second controller, where the notification message is used to notify the second controller to obtain the NVME information. After receiving the notification message, the second controller may obtain the NVME information from the network interface card.

It should be noted that, before the first controller is faulty, the first shared connector may further interact with the first controller to enable the first controller to obtain the NVME information. For a specific manner, refer to related description of interaction between the first shared connector and the second controller to enable the second controller to obtain the NVME information.

S1404: The first shared connector obtains a WQE from the second controller, where the WQE is obtained by the second controller based on the NVME information.

After the second controller receives the NVME information, when sending a message, the second controller adds one or more WQEs to an SQ of a QP of the second controller, and generates a doorbell signal. The WQE points to storage space in the storage apparatus for data related to an RDMA operation.

The WQE includes an RDMA operation type (obtained by using the RDMA operation type in the NVME information, or indirectly obtained by using an NoF IO command type and the NoF IO status), an initial address of storage space pointing to to-be-transmitted IO data (obtained by using the address information of the storage apparatus in the NVME information), and a size of the to-be-transmitted IO data (obtained by using the size of the data in the NVME information). Optionally, for the RDMA write operation and the RDMA read operation, the WQE further includes an internal memory address of the host client (obtained by using the internal memory address of the host client in the NVME information).

S1405. The first shared connector sends a first RDMA message corresponding to the first QP connection to the host client based on the WQE.

A scheduler aggregates doorbell signals from all QPs, and selects one doorbell signal from the doorbell signals according to a preset rule to respond. The scheduler selects a corresponding first shared connector according to a scheduling algorithm to obtain the WQE.

Each QP connection (or referred to as the IO connection) corresponds to one piece of NVME information, and the WQE is obtained based on the NVME information. Therefore, the QP connection corresponds to the WQE, and the first RDMA packet sent based on the WQE also corresponds to the first QP connection. The correspondence is specifically reflected as follows: When the first shared connector sends RDMA messages of a plurality of QPs (located in different controllers) in this QP group, a same set of PSNs is used, and PSNs carried in RDMA messages from different controllers are obtained by increasing a same counter, so that a network interface card of the host client considers that these RDMA messages are from a first QP of the storage apparatus. In this way, even if a controller is faulty and the controller is switched to provide a storage service, the host client is unaware of the switchover.

It should be noted that, if the first controller is faulty during a period when the first shared connector sends an RDMA message corresponding to the first QP connection based on a WQE posted by the first controller, when the first shared connector sends the first RDMA message corresponding to the first QP connection based on a WQE posted by the second controller, the first RDMA packet uses a PSN of an RDMA message that is not successfully sent previously, and RDMA packets that are subsequently sent increase in an order-preserving manner based on the PSN.

The first RDMA message may also be different based on the RDMA operation command and different occurrence times of the disconnection event.

In a possible implementation, the RDMA operation command is an IO read command, and the disconnection event occurs before the first shared connector sends the NVME information to the first controller. Alternatively, the disconnection event occurs after the first shared connector sends the NVME information to the first controller and before the first shared connector enables the first controller to send an RDMA write message by using the first shared connector. In this case, the first RDMA message is the RDMA write message. For details, refer to description in FIG. 17.

In another possible implementation, the RDMA operation command is an IO read command, and the disconnection event occurs during a period when the first controller sends the first packet of an RDMA write message by using the first shared connector. In this case, the first RDMA message is the RDMA write message. In other words, the second controller resends the RDMA write message by using the first shared connector. For details, refer to description in FIG. 20.

In another possible implementation, the RDMA operation command is an IO read command, and the disconnection event occurs during a period when the first controller sends a middle packet or the last packet of an RDMA write message by using the first shared connector. In this case, the first RDMA message is a second SEND message including an IO response, and the IO response indicates that a read operation is completed. In addition, before the first shared connector sends the first RDMA message corresponding to the first QP connection to the host client based on the WQE, the first shared connector may further send a fake last packet of the RDMA write message to the host client. After receiving the fake last packet, the host client ends a current RDMA write operation. For details, refer to description in FIG. 23.

The fake last packet of the RDMA write message is fake. That is, a BTH operation code of the RDMA packet of the RDMA write message is padded with "RDMA WRITE Last". A payload of the fake last packet is arbitrarily padded, and a PSN of the fake last packet is a PSN of a to-be-sent RDMA packet of the RDMA write message when the disconnection event occurs.

In another possible implementation, the RDMA operation command is an IO read command, and after the first controller sends the RDMA write message by using the first shared connector, the disconnection event occurs before a negative acknowledgment message of the RDMA write message is received, or the disconnection event occurs before a retransmission packet of the RDMA write message is sent because a negative acknowledgment message of the RDMA write message is received. In this case, the first RDMA message is a second SEND message including an IO response, and the IO response indicates that a read operation is completed. In addition, before sending the first RDMA message corresponding to the first QP connection to the host client based on the WQE, the first shared connector may further send a fake retransmission packet of the RDMA write message to the host client, where a PSN of the fake retransmission packet is a PSN of the last RDMA packet of the RDMA write message that has been sent before the disconnection event occurs, or a PSN of an initial retransmission packet of the RDMA write message. For details, refer to description in FIG. 26A and FIG. 26B.

In another possible implementation, the RDMA operation command is an IO read command, and the disconnection event occurs during a period when the first controller sends a SEND message including an IO response by using the first shared connector, where the IO response indicates that a read operation is completed. In this case, the first RDMA message is the SEND message including the IO response. For details, refer to description in FIG. 29.

In another possible implementation, the RDMA operation command is an IO write command, and the disconnection event occurs before the first shared connector sends the NVME information to the first controller or before the first controller completes sending an RDMA read request message by using the first shared connector. In this case, the first RDMA message is the RDMA read request message. For details, refer to description in FIG. 32.

After receiving the RDMA read request message, the host client may send an RDMA read response message to the storage apparatus, where the RDMA read response message includes IO data. The RDMA read response message is used to write the IO data from the internal memory address of the host client to the storage space of the storage apparatus. When the IO data is relatively long, there may be a plurality of RDMA read response messages. That is, the RDMA read response message may be split into a plurality of RDMA packets.

In another possible implementation, the RDMA operation command is an IO write command, and the disconnection event occurs during a period when the first controller receives an RDMA read response message by using the first shared connector. In this case, the first RDMA message is an RDMA read request message. In addition, before sending a first RDMA message corresponding to the first QP connection to the host client based on the WQE, the first shared connector may further send a positive acknowledgment message corresponding to the RDMA read response message to the host client, or discard a packet of the RDMA read response message received from the host client. For details, refer to description in FIG. 35.

In another possible implementation, the RDMA operation command is an IO write command including immediate data, and the disconnection event occurs during a period when the first controller receives the immediate data by using the first shared connector. In this case, the first RDMA message is a second SEND message including an IO response, and the IO response indicates a failure of receiving the immediate data. Before sending a first RDMA message corresponding to the first QP connection to the host client based on the WQE, the first shared connector may further send a positive acknowledgment message of the first SEND message to the host client. For details, refer to description in FIG. 38.

According to the network interface card and the message sending and receiving method provided in this embodiment of this application, after the RDMA operation command of the host client is received by using the first QP connection, the NVME information that is sent to the first controller and that corresponds to the first QP connection is obtained according to the RDMA operation command and the current stage of the RDMA operation. When the disconnection event of the link between the first shared connector and the first controller is detected, the first shared connector interacts with the second controller to enable the second controller to obtain the NVME information. In this way, the second controller may continue to send the first RDMA message corresponding to the first QP connection to the host client based on the NVME information, to ensure that the first QP connection is not disconnected when the first controller is faulty, thereby improving reliability of the storage apparatus.

Figure 15:
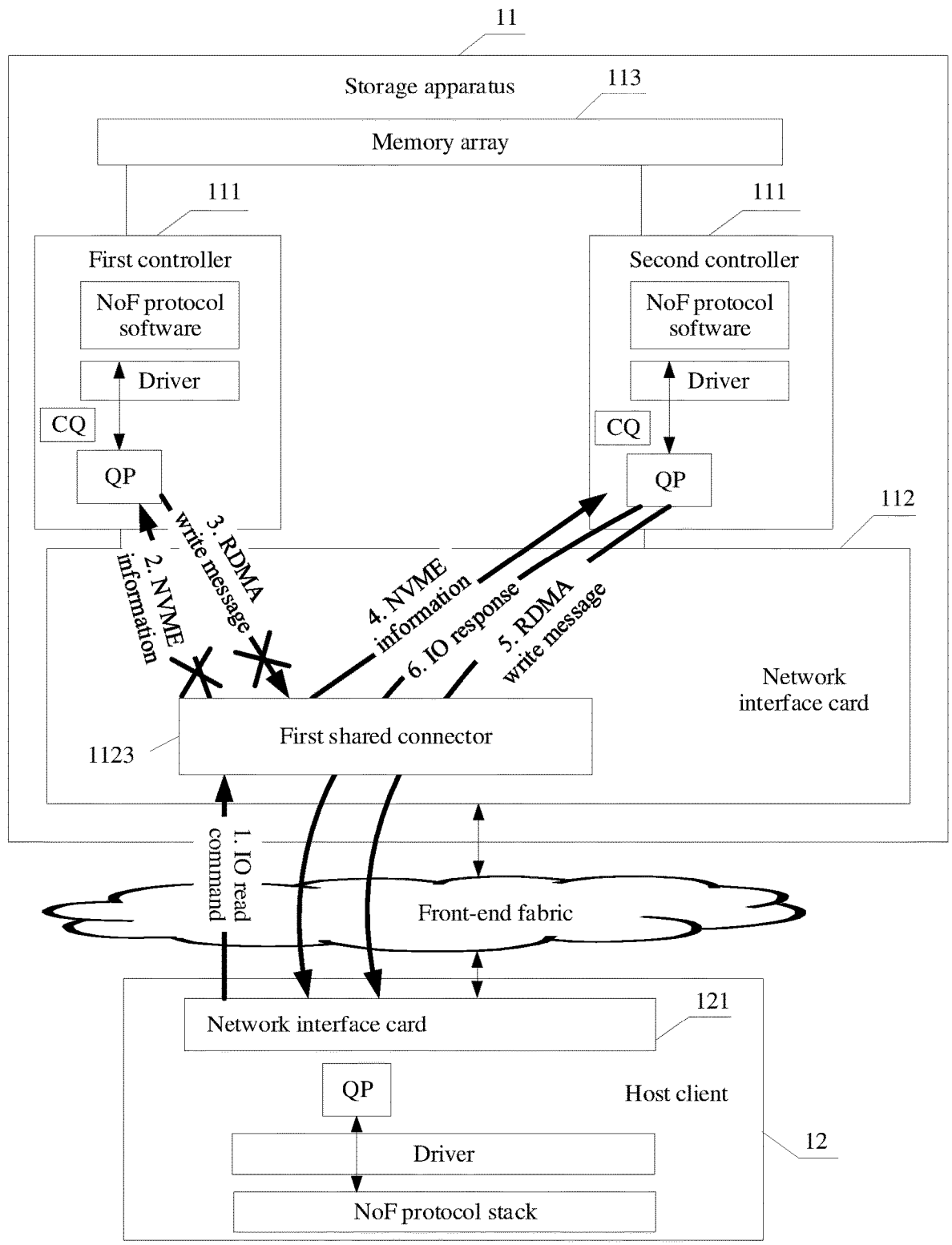
FIG. 15 is an example schematic diagram 1 of a system structure of an RDMA operation procedure affected due to occurrence of a disconnection event according to an embodiment of this application.
Figure 16:
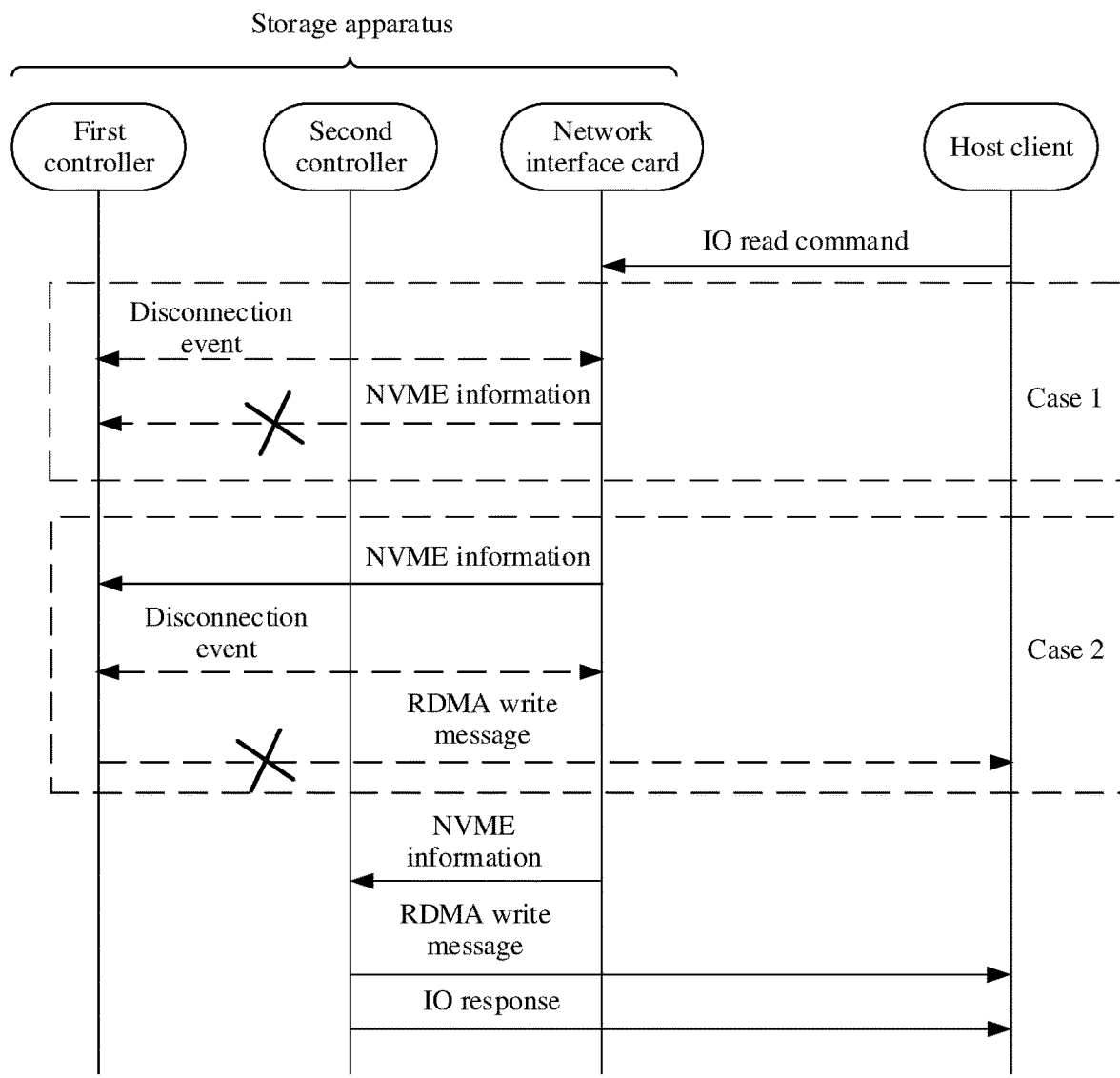
FIG. 16 is an example schematic flowchart 1 of an RDMA operation procedure affected due to occurrence of a disconnection event according to an embodiment of this application.

As shown in FIG. 15 and FIG. 16, in a scenario in which a host client sends an IO read command to a storage apparatus to trigger the storage apparatus to perform an RDMA write operation, a network interface card of the storage apparatus receives the IO read command, and a first controller is faulty before a first shared connector sends NVME information to the first controller, or a first controller is faulty after a first shared connector sends NVME information to the first controller and before the first shared connector enables the first controller to send an RDMA write message by using the first shared connector. Therefore, a disconnection event of a link between the network interface card and the first controller occurs, and the IO read command (namely, an RDMA operation type in the NVME information) cannot reach the first controller, or the first controller cannot send the RDMA write message. In this case, the network interface card of the storage apparatus sends the NVME information to a second controller, so that the second controller can send the RDMA write message and an IO response.

Figure 17:
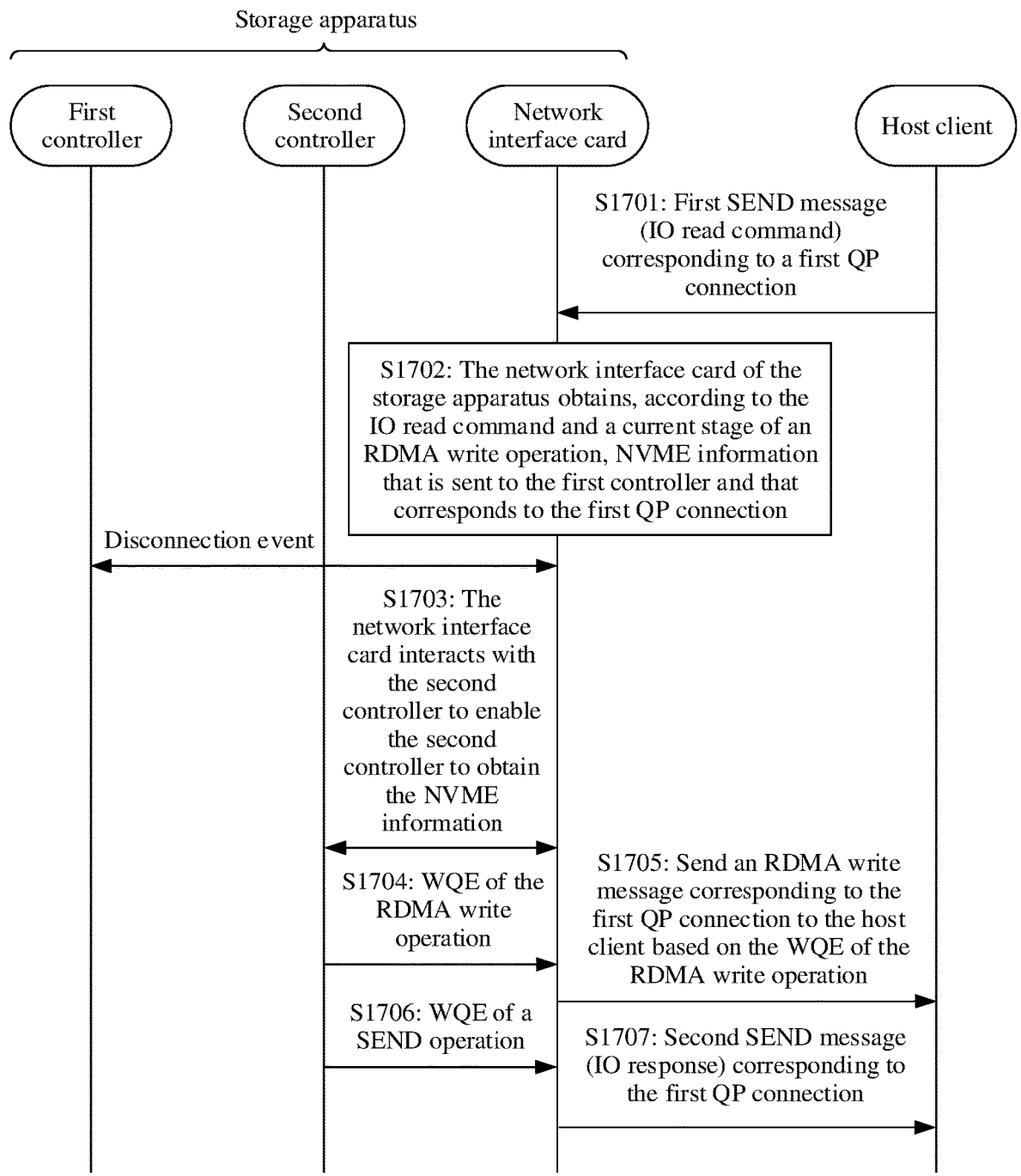
FIG. 17 is an example schematic flowchart 2 of a message sending and receiving method according to an embodiment of this application.

Specifically, as shown in FIG. 17, the message sending and receiving method provided in this embodiment of this application includes the following steps.

S1701: The host client sends a first SEND message corresponding to a first QP connection to a storage apparatus.

The first SEND message includes the IO read command.
For other content, refer to step S1401.

S1702: The network interface card of the storage apparatus obtains, according to the IO read command and a current stage of the RDMA write operation, the NVME information that is sent to the first controller and that corresponds to the first QP connection.

The network interface card of the storage apparatus receives the IO read command and triggers the storage apparatus to perform the RDMA write operation. Therefore, the RDMA operation type in the NVME information is the RDMA write operation, and an NVMe IO status in the NVME information is that the IO read command is received but the RDMA write message is not sent.

For other content, refer to step S1402.

S1703: The first controller of the storage apparatus is faulty before the first shared connector sends the NVME information to the first controller, or the first controller of the storage apparatus is faulty after the first shared connector sends the NVME information to the first controller and before the first shared connector enables the first controller to send the RDMA write message by using the first shared connector, the network interface card of the storage apparatus detects the disconnection event of the link between the network interface card the first controller, and the network interface card interacts with the second controller to enable the second controller to obtain the NVME information.

For this step, refer to step S1403.

S1704: The second controller of the storage apparatus posts a WQE of the RDMA write operation based on the NVME information, so that the network interface card of the storage apparatus obtains the WQE from the second controller.

Because the NVMe IO status in the NVME information is that the IO read command is received but the RDMA write message is not sent, the second controller knows, based on procedures of the RDMA write operation, that the RDMA write message is to be sent next, and therefore, posts the WQE of the RDMA write operation.

For other content of this step, refer to step S1404.

S1705: The network interface card of the storage apparatus sends the RDMA write message corresponding to the first QP connection to the host client based on the WQE of the RDMA write operation.

In this case, the RDMA write message is the first RDMA message described above.

The RDMA write message includes IO data, and the RDMA write message is used to write the IO data from storage space of the storage apparatus (or referred to as the IO data obtained from storage space of the storage apparatus) to an internal memory address of the host client. When the IO data is relatively long, there may be a plurality of RDMA write messages. That is, the RDMA write message may be split into a plurality of RDMA packets. After receiving the RDMA write message, the host client may send an acknowledgment packet of the RDMA write message to the storage apparatus.

For other content, refer to step S1405.

S1706: The second controller of the storage apparatus posts a WQE of a SEND operation after sending the IO data.

The WQE includes an RDMA operation type of the SEND operation.

S1707: The network interface card of the storage apparatus sends a second SEND message corresponding to the first QP connection to the host client based on the WQE of the SEND operation.

The SEND message includes the IO response, and the IO response indicates that the RDMA write operation triggered by the host client is completed.

The message sending and receiving method provided in this embodiment of this application may be applied to a scenario in which the host client sends the IO read command to the storage apparatus, to trigger the storage apparatus to perform the RDMA write operation. When the first controller of the storage apparatus is faulty during a process of performing a corresponding RDMA write operation, the network interface card of the storage apparatus sends the NVME information to the second controller, so that the second controller can send the RDMA write message and the IO response. The network interface card of the storage apparatus can smoothly switch a current RDMA operation to the second controller that works properly, so that the host client can be unaware of a fault of the controller, thereby ensuring that the RDMA write operation can be properly completed.

Figure 18:
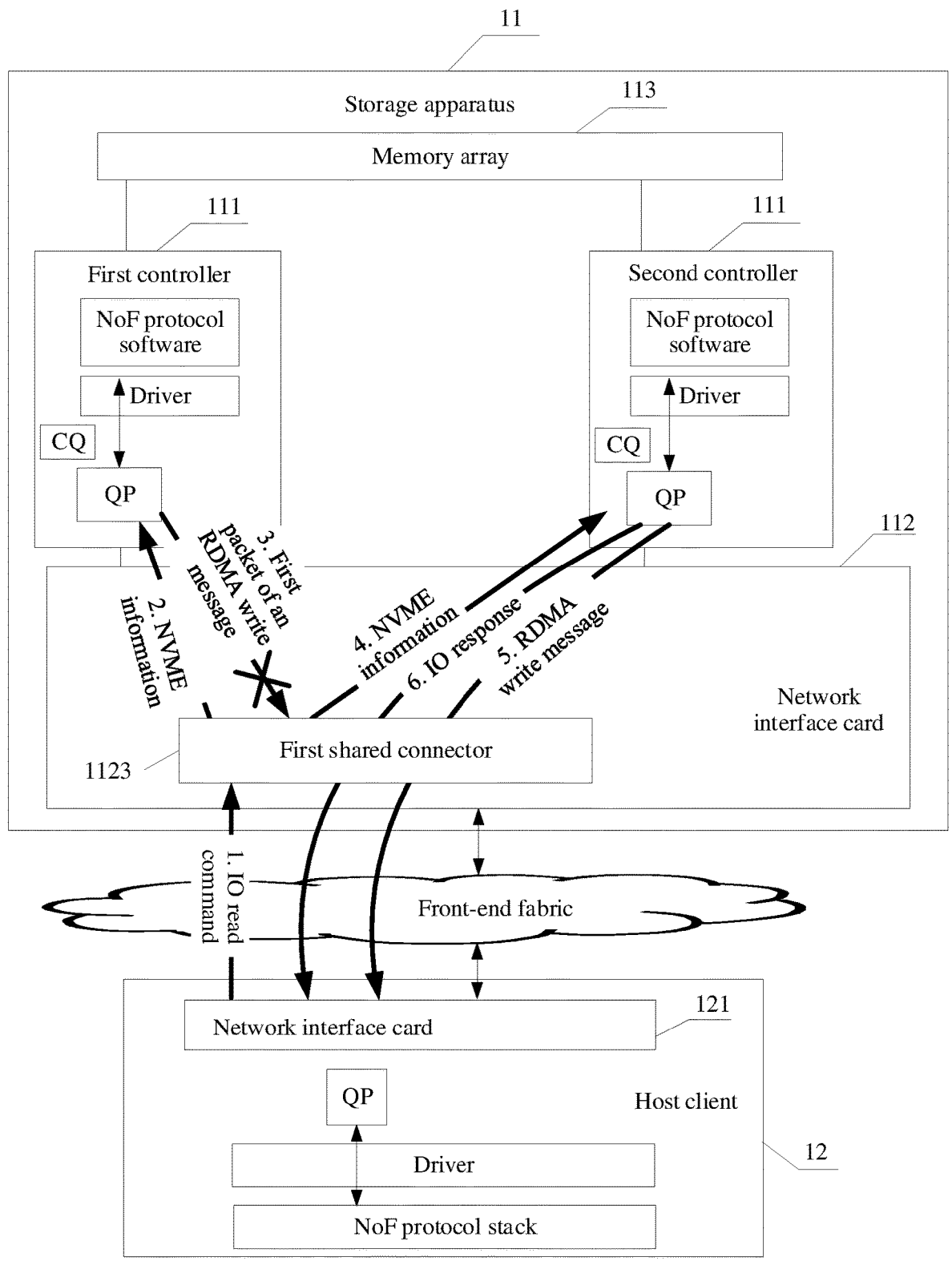
FIG. 18 is an example schematic diagram 2 of a system structure of an RDMA operation procedure affected due to occurrence of a disconnection event according to an embodiment of this application.
Figure 19:
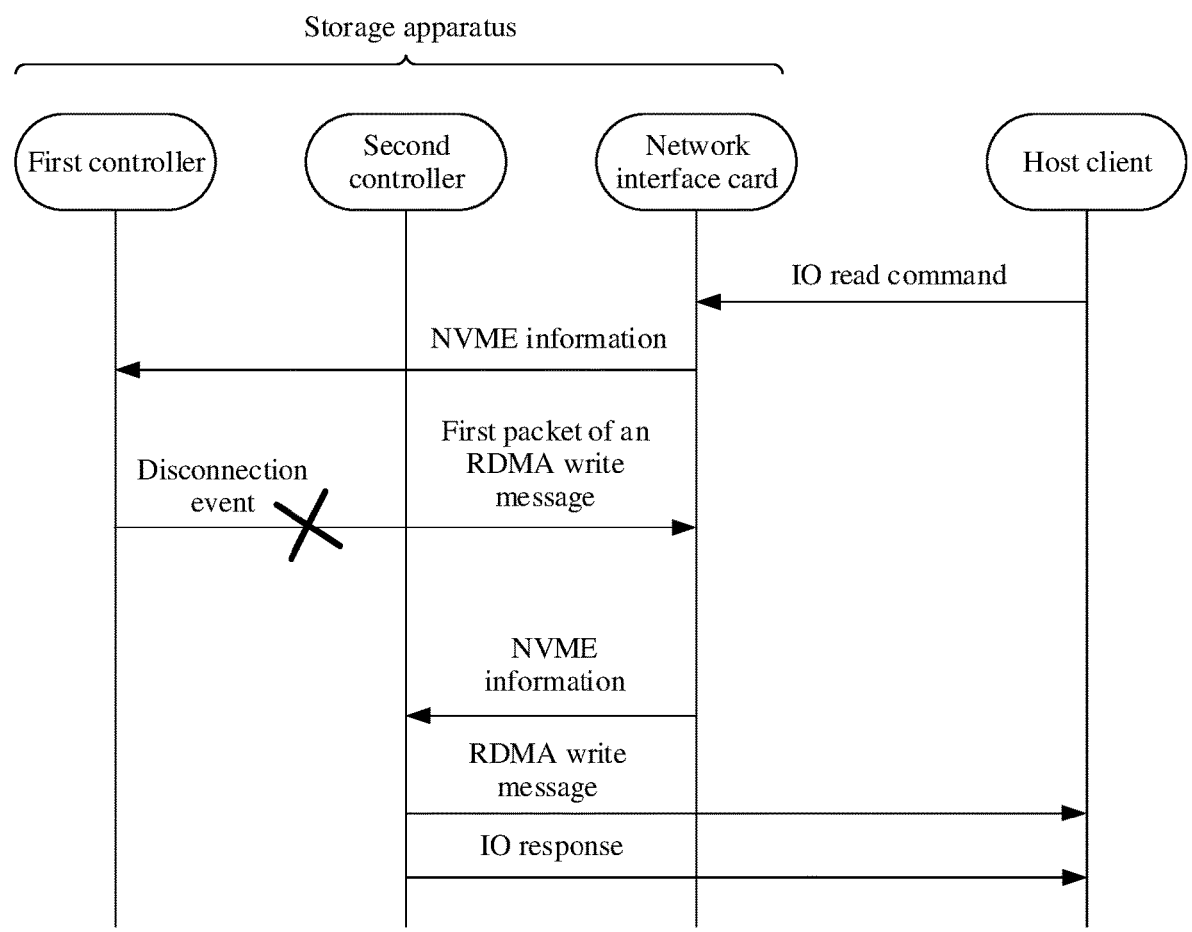
FIG. 19 is an example schematic flowchart 2 of an RDMA operation procedure affected due to occurrence of a disconnection event according to an embodiment of this application.

As shown in FIG. 18 and FIG. 19, in a scenario in which a host client sends an IO read command to a storage apparatus to trigger the storage apparatus to perform an RDMA write operation, a network interface card of the storage apparatus receives the IO read command, and a first controller is faulty during a period when the first controller sends the first packet of an RDMA write message by using a first shared connector. Therefore, a disconnection event of a link between the network interface card and the first controller occurs, and the first controller cannot continue to send the RDMA write message. In this case, the network interface card of the storage apparatus sends NVME information to a second controller, so that the second controller can resend the RDMA write message and an IO response.

Figure 20:
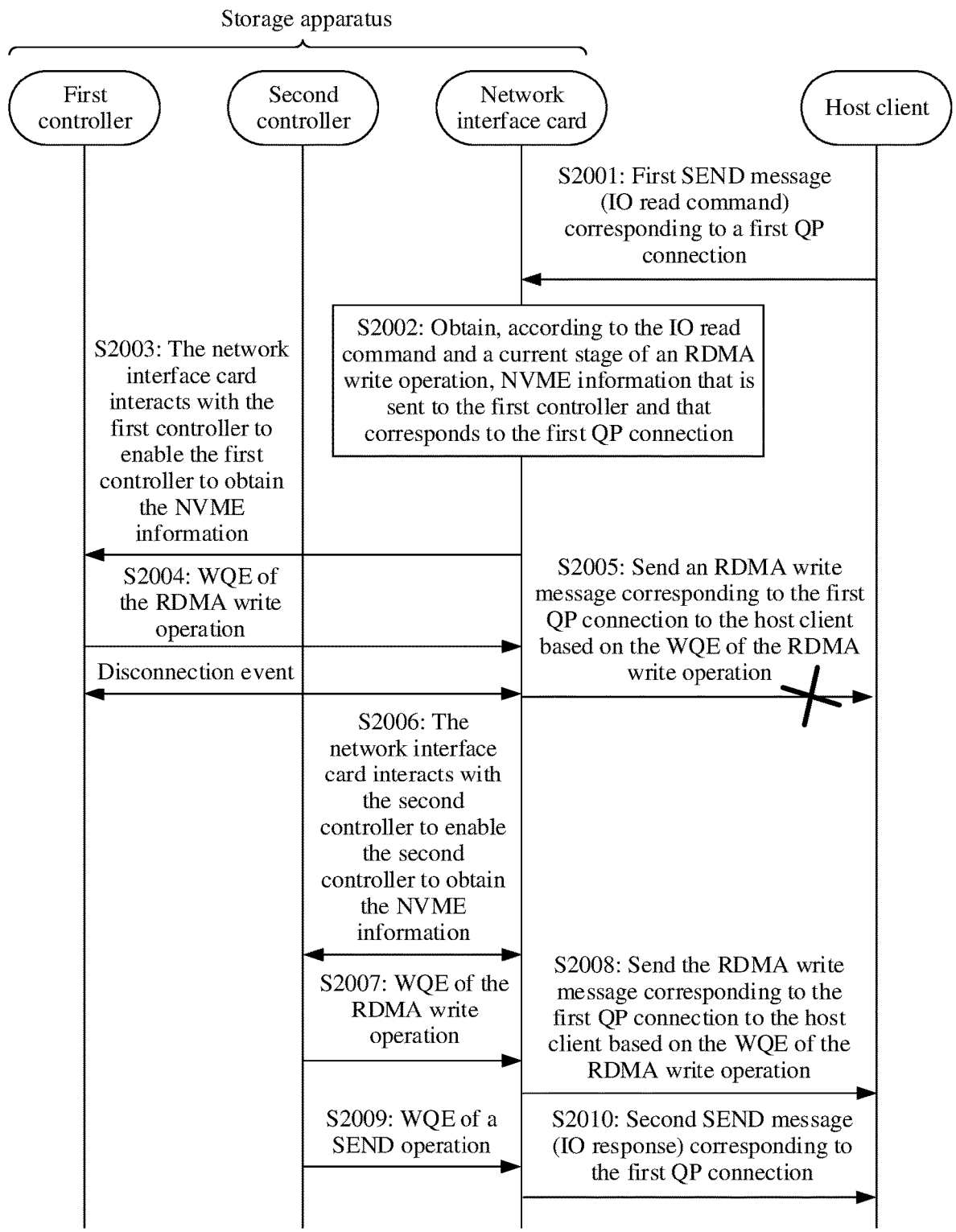
FIG. 20 is an example schematic flowchart 3 of a message sending and receiving method according to an embodiment of this application.

Specifically, as shown in FIG. 20, the message sending and receiving method provided in this embodiment of this application includes the following steps.

S2001: The host client sends a first SEND message corresponding to a first QP connection to the storage apparatus.

For this step, refer to step S1701.

S2002: The network interface card of the storage apparatus obtains, according to the IO read command and a current stage of the RDMA write operation, the NVME information that is sent to the first controller and that corresponds to the first QP connection.

For this step, refer to step S1702.

S2003: The network interface card interacts with the first controller to enable the first controller to obtain the NVME information.

For this step, refer to step S1403.

S2004: The first controller posts a WQE of the RDMA write operation based on the NVME information, so that the network interface card of the storage apparatus obtains the WQE from the first controller.

For this step, refer to step S1404.

S2005: The network interface card of the storage apparatus sends the RDMA write message corresponding to the first QP connection to the host client based on the WQE of the RDMA write operation.

The RDMA write message includes IO data, and the RDMA write message is used to write the IO data from storage space of the storage apparatus (or referred to as the IO data obtained from storage space of the storage apparatus) to an internal memory address of the host client. When the IO data is relatively long, there may be a plurality of RDMA write messages. That is, the RDMA write message may be split into a plurality of RDMA packets. After receiving the RDMA write message, the host client may send an acknowledgment packet of the RDMA write message to the storage apparatus.

S2006: The first controller of the storage apparatus is faulty when sending the first packet of the RDMA write message, the network interface card of the storage apparatus detects the disconnection event of the link between the network interface card and the first controller, and the network interface card interacts with the second controller to enable the second controller to obtain the NVME information.

For this step, refer to step S1403.

S2007: The second controller of the storage apparatus posts the WQE of the RDMA write operation based on the NVME information, so that the network interface card of the storage apparatus obtains the WQE from the second controller.

For this step, refer to step S1704.

S2008: The network interface card of the storage apparatus sends the RDMA write message corresponding to the first QP connection to the host client based on the WQE of the RDMA write operation.

In this case, the RDMA write message is the first RDMA message described above.

When the first shared connector sends the first RDMA message corresponding to the first QP connection based on the WQE posted by the second controller, the first RDMA packet uses a PSN of an RDMA message that is not successfully sent previously, and an RDMA packet that is subsequently sent increases in an order-preserving manner based on the PSN.

For other content, refer to step S1405.

S2009: The second controller of the storage apparatus posts a WQE of a SEND operation after sending the IO data.

For this step, refer to step S1706.

S2010: The network interface card of the storage apparatus sends a second SEND message corresponding to the first QP connection to the host client based on the WQE of the SEND operation.

For this step, refer to step S1707.

The message sending and receiving method provided in this embodiment of this application may be applied to a scenario in which the host client sends the IO read command to the storage apparatus, to trigger the storage apparatus to perform the RDMA write operation. When the first controller of the storage apparatus is faulty during a process of performing a corresponding RDMA write operation to send the first packet of the RDMA write message, the network interface card of the storage apparatus sends the NVME information to the second controller, so that the second controller can resend the RDMA write message and the IO response. The network interface card of the storage apparatus can smoothly switch a current RDMA operation to the second controller that works properly, so that the host client can be unaware of a fault of the controller, thereby ensuring that the RDMA write operation can be properly completed.

Figure 21:
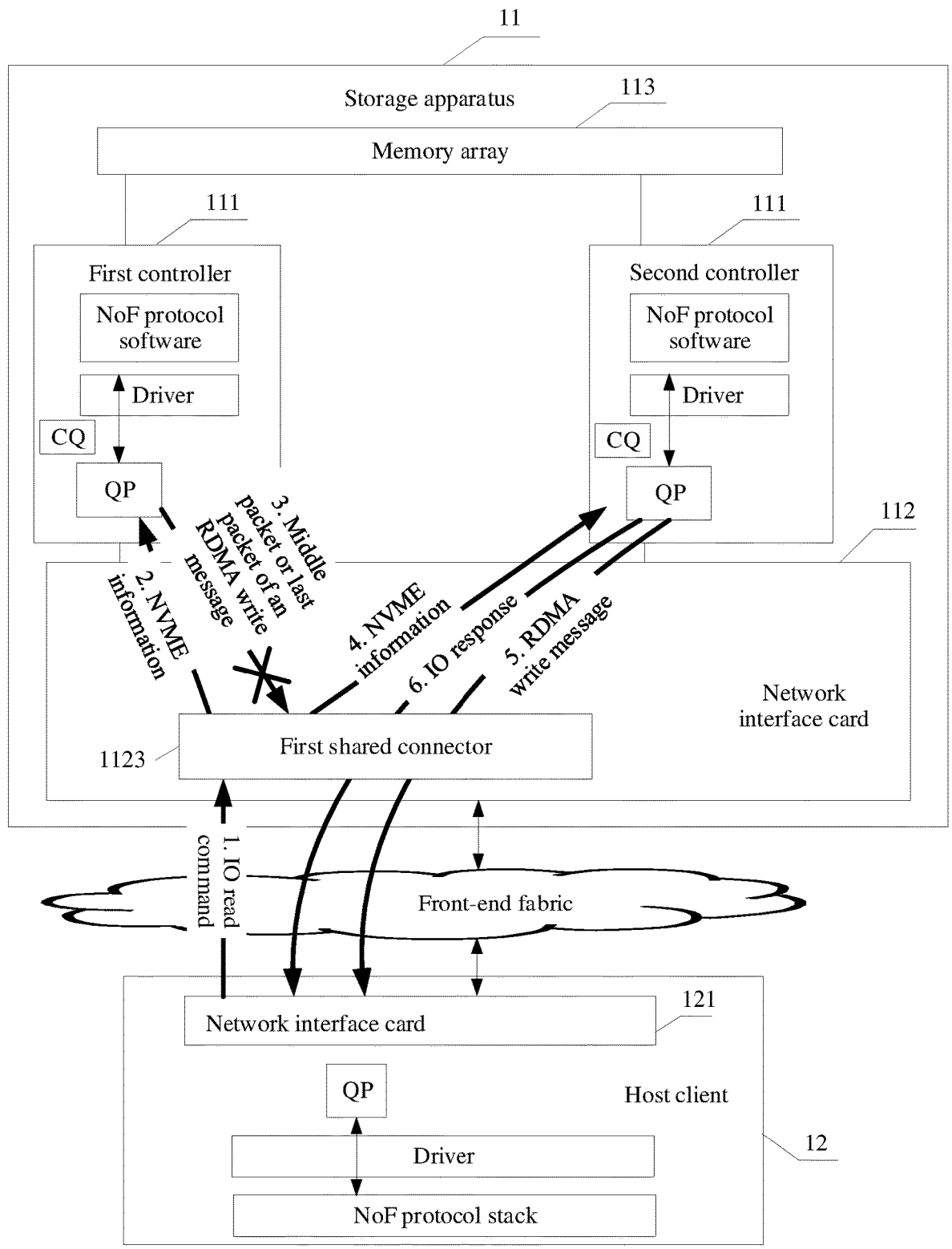
FIG. 21 is an example schematic diagram 3 of a system structure of an RDMA operation procedure affected due to occurrence of a disconnection event according to an embodiment of this application.
Figure 22:
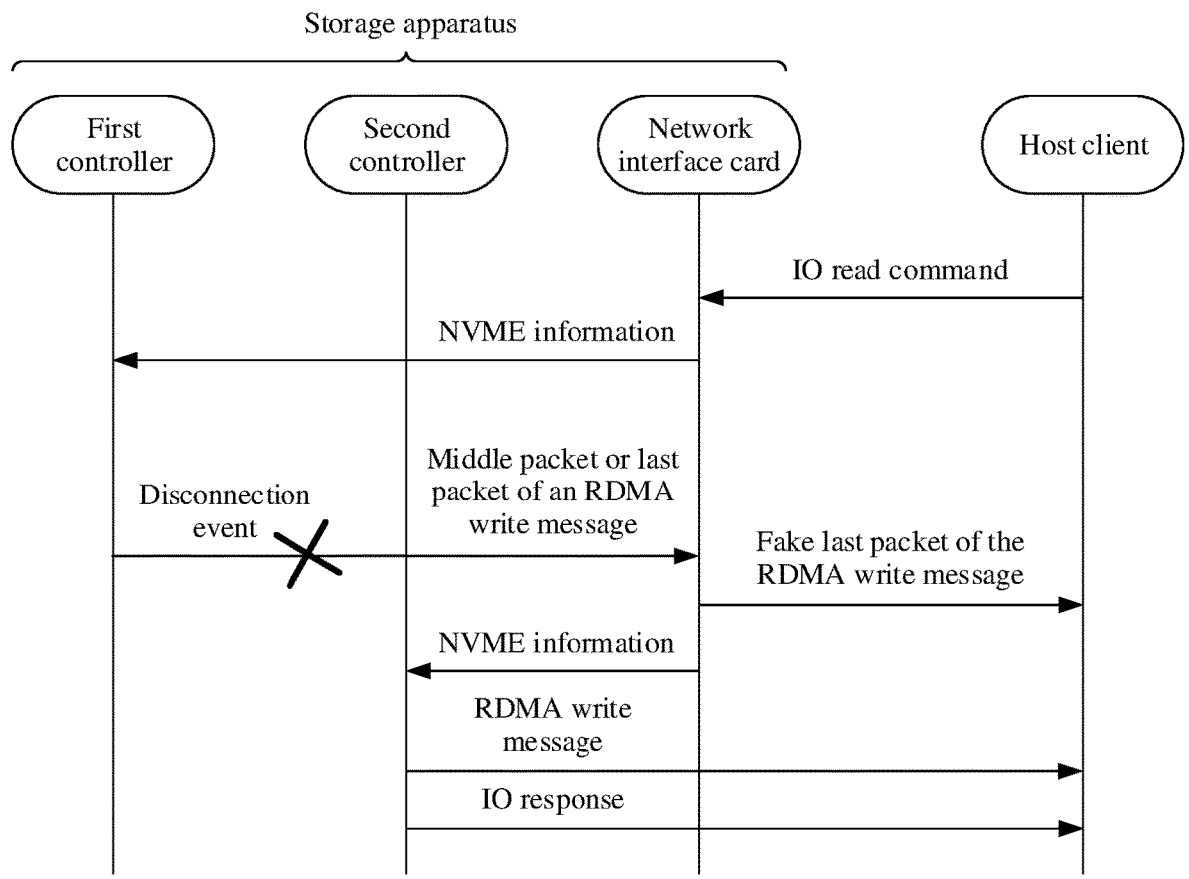
FIG. 22 is an example schematic flowchart 3 of an RDMA operation procedure affected due to occurrence of a disconnection event according to an embodiment of this application.

As shown in FIG. 21 and FIG. 22, in a scenario in which a host client sends an IO read command to a storage apparatus to trigger the storage apparatus to perform an RDMA write operation, a network interface card of the storage apparatus receives the IO read command, and a first controller is faulty during a period when the first controller sends a middle packet or the last packet of an RDMA write message by using a first shared connector. Therefore, a disconnection event of a link between the network interface card and the first controller occurs, and the first controller cannot continue to send the RDMA write message. In this case, the network interface card sends a fake last packet of the RDMA write message to the host client to end a current RDMA write operation, and sends NVME information to a second controller, so that the second controller can resend the RDMA write message and an IO response.

Figure 23:
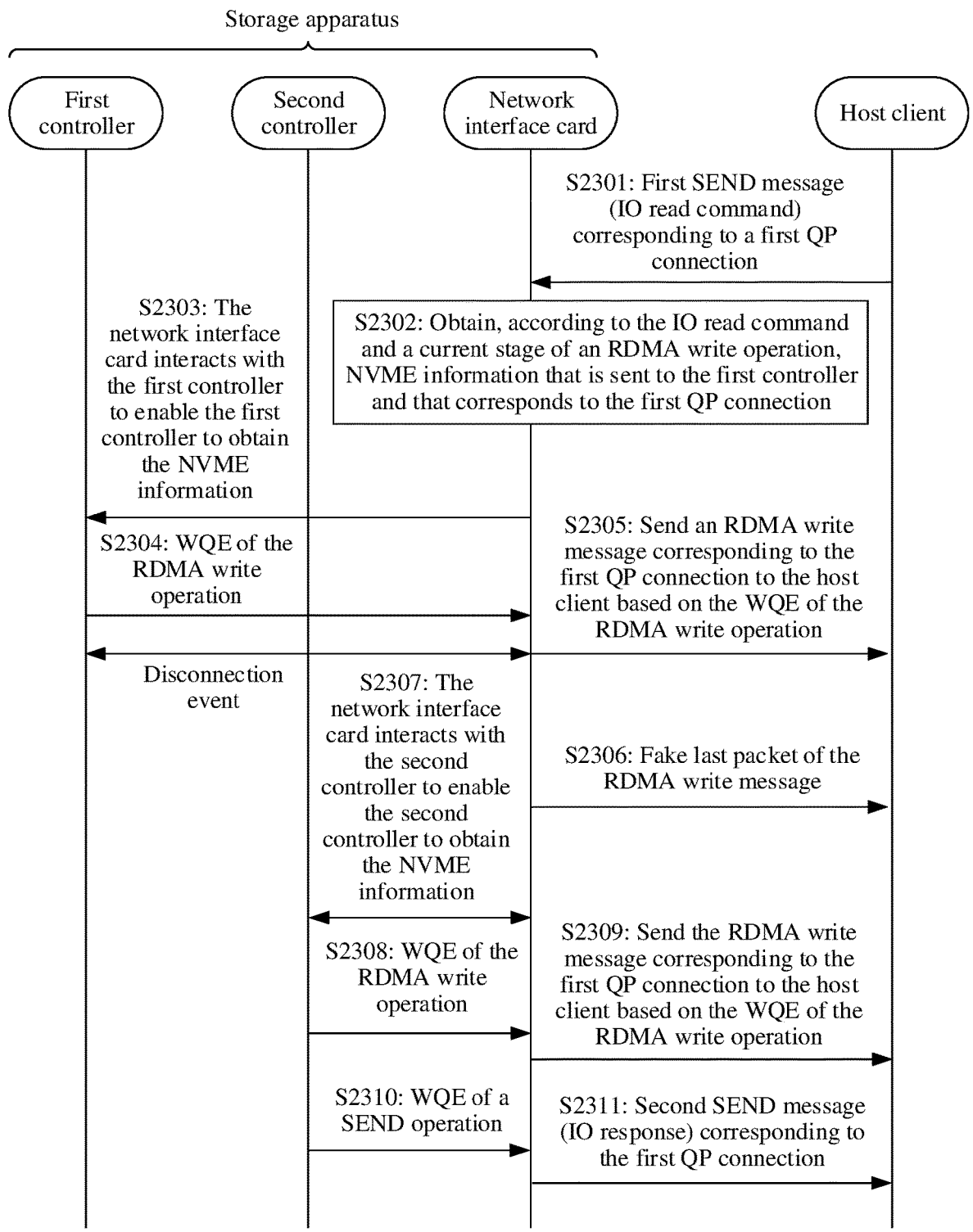
FIG. 23 is an example schematic flowchart 4 of a message sending and receiving method according to an embodiment of this application.

Specifically, as shown in FIG. 23, the message sending and receiving method provided in this embodiment of this application includes the following steps.

S2301: The host client sends a first SEND message corresponding to a first QP connection to the storage apparatus.

For this step, refer to step S1701.

S2302: The network interface card of the storage apparatus obtains, according to the IO read command and a current stage of the RDMA write operation, the NVME information that is sent to the first controller and that corresponds to the first QP connection.

For this step, refer to step S1702.

S2303: The network interface card interacts with the first controller to enable the first controller to obtain the NVME information.

For this step, refer to step S1403.

S2304: The first controller posts a WQE of the RDMA write operation based on the NVME information, so that the network interface card of the storage apparatus obtains the WQE from the first controller.

For this step, refer to step S1404.

S2305: The network interface card of the storage apparatus sends the RDMA write message corresponding to the first QP connection to the host client based on the WQE of the RDMA write operation.

In this case, the RDMA write message is the first RDMA message described above.

For other content, refer to step S1405.

S2306: The first controller of the storage apparatus is faulty when sending a middle packet or the last packet of the RDMA write message, and the network interface card of the storage apparatus detects the disconnection event of the link between the network interface card and the first controller, and sends the fake last packet of the RDMA write message to the host client.

For the fake last packet of the RDMA write message, refer to related description in step S1405.

S2307: The network interface card interacts with the second controller to enable the second controller to obtain the NVME information.

For this step, refer to step S1403.

S2308: The second controller of the storage apparatus posts the WQE of the RDMA write operation based on the NVME information, so that the network interface card of the storage apparatus obtains the WQE from the second controller.

For this step, refer to step S1704.

S2309: The network interface card of the storage apparatus sends the RDMA write message corresponding to the first QP connection to the host client based on the WQE of the RDMA write operation.

For this step, refer to step S1705.

S2310: The second controller of the storage apparatus posts a WQE of a SEND operation after sending IO data.

For this step, refer to step S1706.

S2311: The network interface card of the storage apparatus sends a second SEND message corresponding to the first QP connection to the host client based on the WQE of the SEND operation.

For this step, refer to step S1707.

The message sending and receiving method provided in this embodiment of this application may be applied to a scenario in which the host client sends the IO read command to the storage apparatus, to trigger the storage apparatus to perform the RDMA write operation. When the first controller of the storage apparatus is faulty during a process of performing a corresponding RDMA write operation to send the middle packet or the last packet of the RDMA write message, the network interface card of the storage apparatus sends the fake last packet of the RDMA write message to the host client to end a current RDMA write operation, and sends the NVME information to the second controller, so that the second controller can resend the RDMA write message and the IO response. The network interface card of the storage apparatus can smoothly switch a current RDMA operation to the second controller that works properly, so that the host client can be unaware of a fault of the controller, thereby ensuring that the RDMA write operation can be properly completed.

Figure 24:
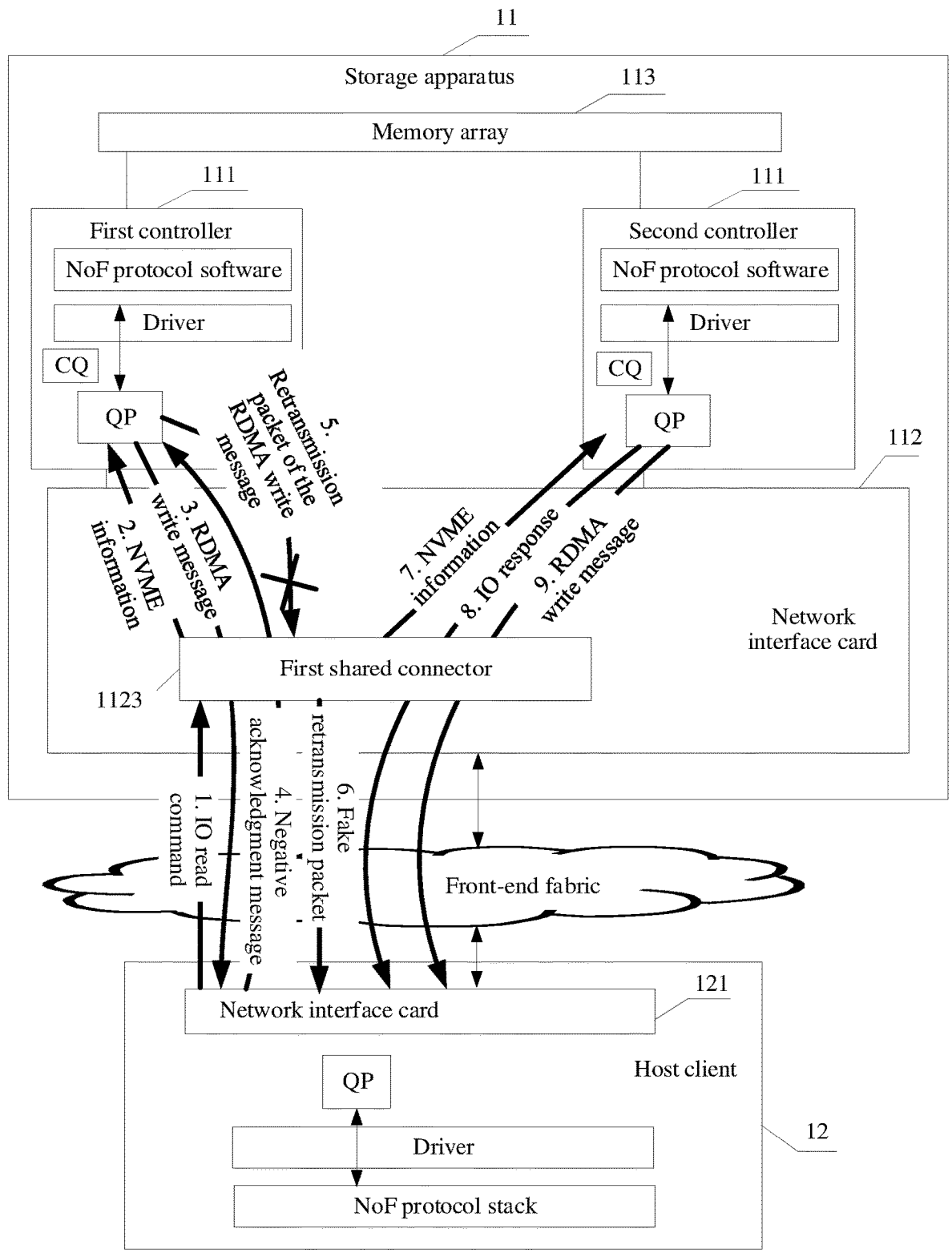
FIG. 24 is an example schematic diagram 4 of a system structure of an RDMA operation procedure affected due to occurrence of a disconnection event according to an embodiment of this application.
Figure 25:
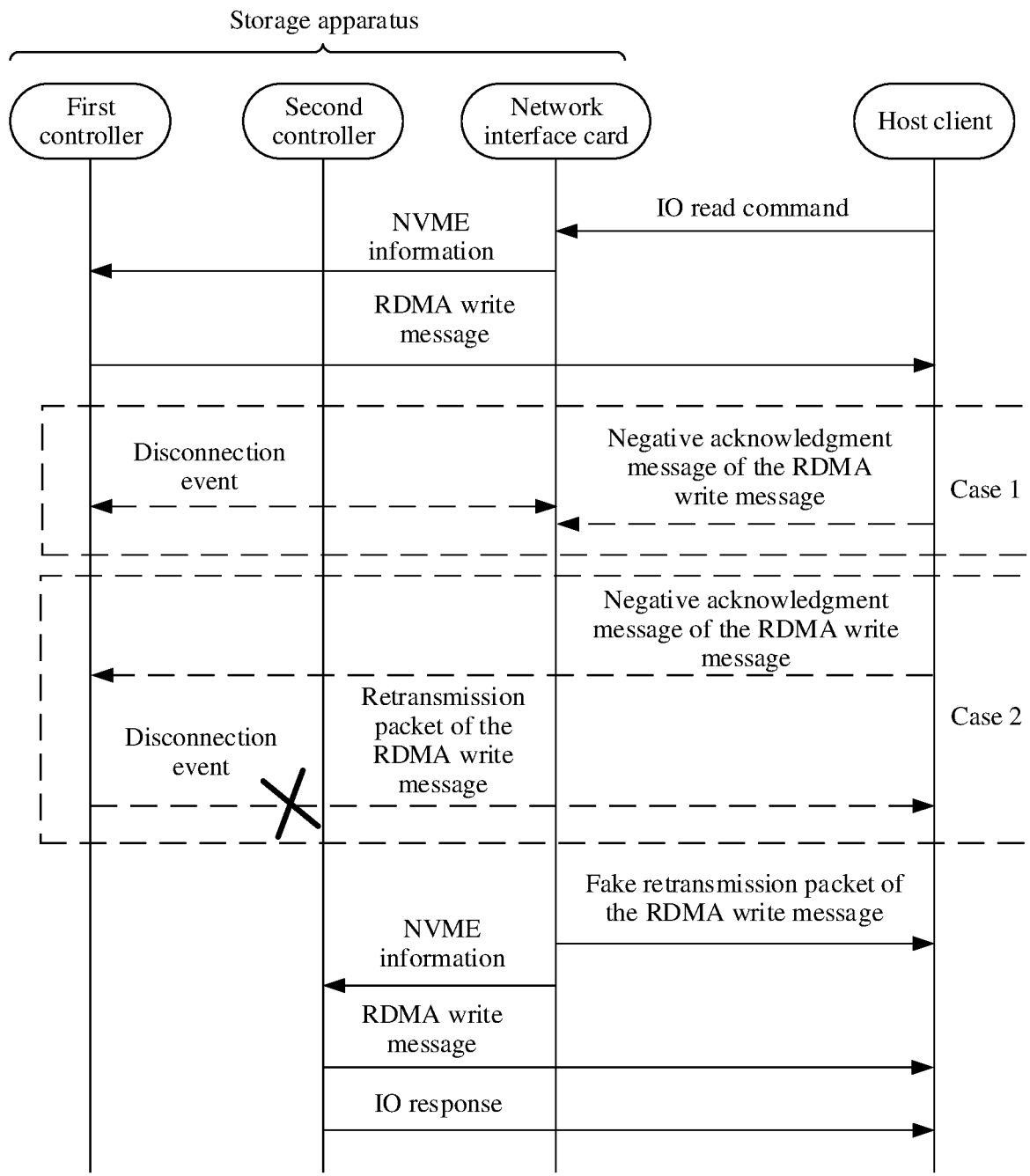
FIG. 25 is an example schematic flowchart 4 of an RDMA operation procedure affected due to occurrence of a disconnection event according to an embodiment of this application.

As shown in FIG. 24 and FIG. 25, in a scenario in which a host client sends an IO read command to a storage apparatus to trigger the storage apparatus to perform an RDMA write operation, a network interface card of the storage apparatus receives the IO read command, and after a first controller sends an RDMA write message by using a first shared connector, the first controller is faulty before a negative acknowledgment message of the RDMA write message is received or before a retransmission packet of the RDMA write message is sent because a negative acknowledgment message of the RDMA write message is received. Therefore, a disconnection event of a link between the network interface card and the first controller occurs, and the first controller cannot send the retransmission packet of the RDMA write message. In this case, the network interface card sends a fake retransmission packet of the RDMA write message to the host client, and sends NVME information to a second controller, so that the second controller can resend the RDMA write message and the IO response.

Figure 26A:
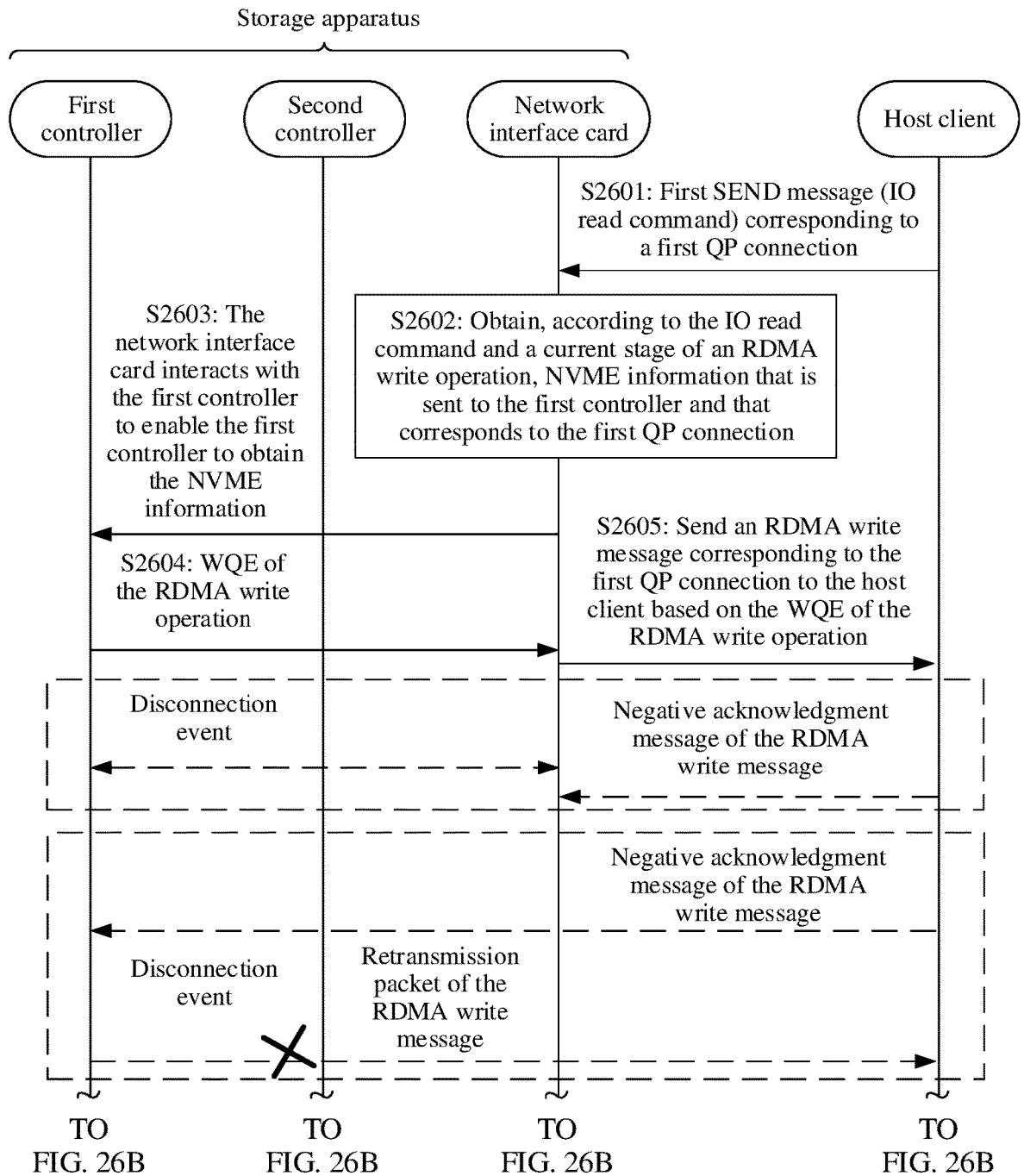
FIG. 26A and FIG. 26B are example schematic flowcharts 5 of a message sending and receiving method according to an embodiment of this application.
Figure 26B:
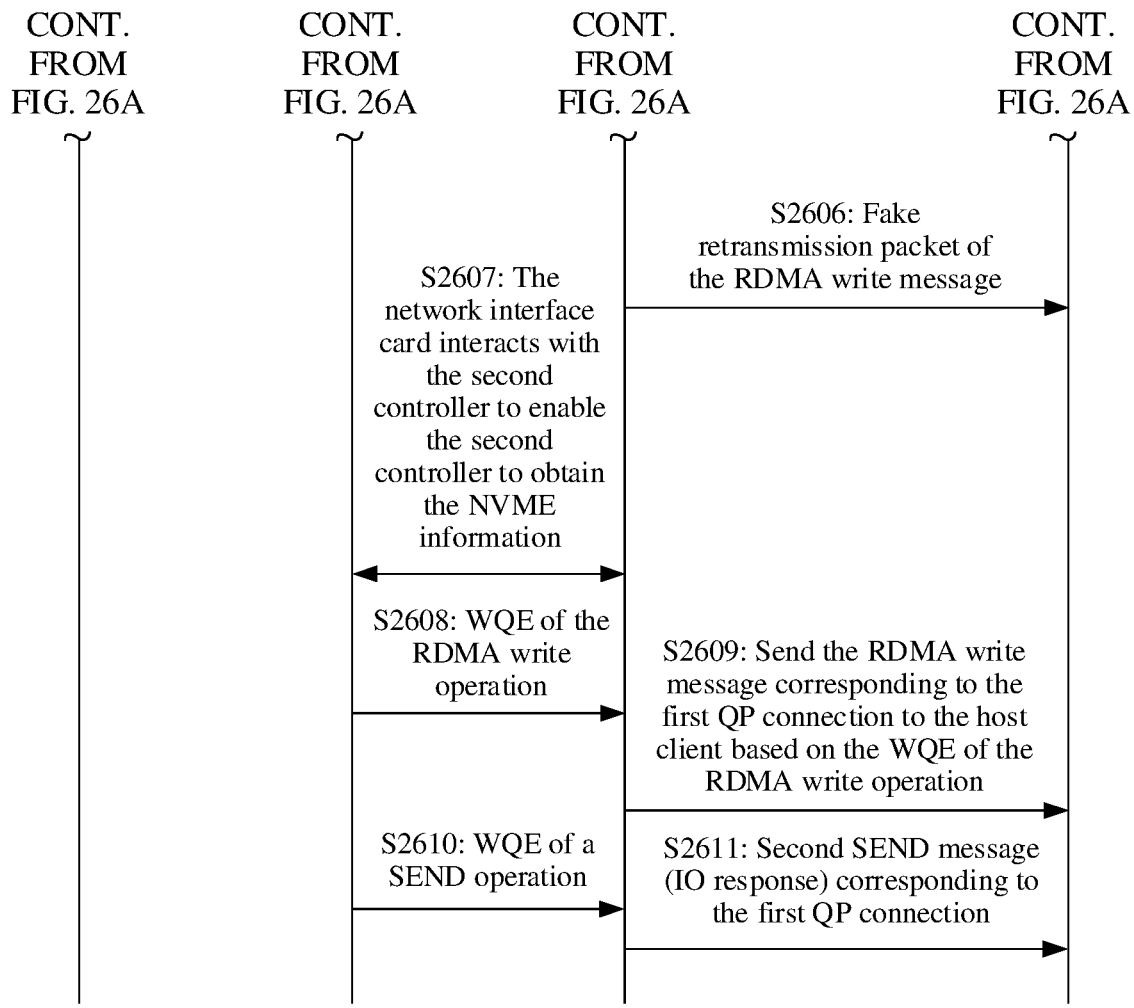

Specifically, as shown in FIG. 26A and FIG. 26B, the message sending and receiving method provided in this embodiment of this application includes the following steps.

S2601: The host client sends a first SEND message corresponding to a first QP connection to the storage apparatus.

For this step, refer to step S1701.

S2602: The network interface card of the storage apparatus obtains, according to the IO read command and a current stage of the RDMA write operation, the NVME information that is sent to the first controller and that corresponds to the first QP connection.

For this step, refer to step S1702.

S2603: The network interface card interacts with the first controller to enable the first controller to obtain the NVME information.

For this step, refer to step S1403.

S2604: The first controller posts a WQE of the RDMA write operation based on the NVME information, so that the network interface card of the storage apparatus obtains the WQE from the first controller.

For this step, refer to step S1404.

S2605: The network interface card of the storage apparatus sends the RDMA write message corresponding to the first QP connection to the host client based on the WQE of the RDMA write operation.

For this step, refer to step S2005.

S2606: The first controller of the storage apparatus is faulty before the negative acknowledgment message of the RDMA write message is received or before the retransmission packet of the RDMA write message is sent because the negative acknowledgment message of the RDMA write message is received, and the network interface card of the storage apparatus detects the disconnection event of the link between the storage apparatus and the first controller and sends the fake retransmission packet of the RDMA write message to the host client.

For the fake retransmission packet of the RDMA write message, refer to related description in step S1405.

S2607: The network interface card interacts with the second controller to enable the second controller to obtain the NVME information.

For this step, refer to step S1403.

S2608: The second controller of the storage apparatus posts the WQE of the RDMA write operation based on the NVME information, so that the network interface card of the storage apparatus obtains the WQE from the second controller.

For this step, refer to step S1704.

S2609: The network interface card of the storage apparatus sends the RDMA write message corresponding to the first QP connection to the host client based on the WQE of the RDMA write operation.

For this step, refer to step S1705.

S2610: The second controller of the storage apparatus posts a WQE of a SEND operation after sending IO data.

For this step, refer to step S1706.

S2611: The network interface card of the storage apparatus sends a second SEND message corresponding to the first QP connection to the host client based on the WQE of the SEND operation.

For this step, refer to step S1707.

The message sending and receiving method provided in this embodiment of this application may be applied to a scenario in which the host client sends the IO read command to the storage apparatus, to trigger the storage apparatus to perform the RDMA write operation. After the first controller of the storage apparatus performs a corresponding RDMA write operation to send the RDMA write message, the first controller is faulty before the negative acknowledgment message of the RDMA write message is received or before the retransmission packet of the RDMA write message is sent because the negative acknowledgment message of the RDMA write message is received. The network interface card of the storage apparatus sends the fake retransmission packet of the RDMA write message to the host client, and sends the NVME information to the second controller, so that the second controller can resend the RDMA write message and the IO response. The network interface card of the storage apparatus can smoothly switch a current RDMA operation to the second controller that works properly, so that the host client can be unaware of a fault of the controller, thereby ensuring that the RDMA write operation can be properly completed.

Figure 27:
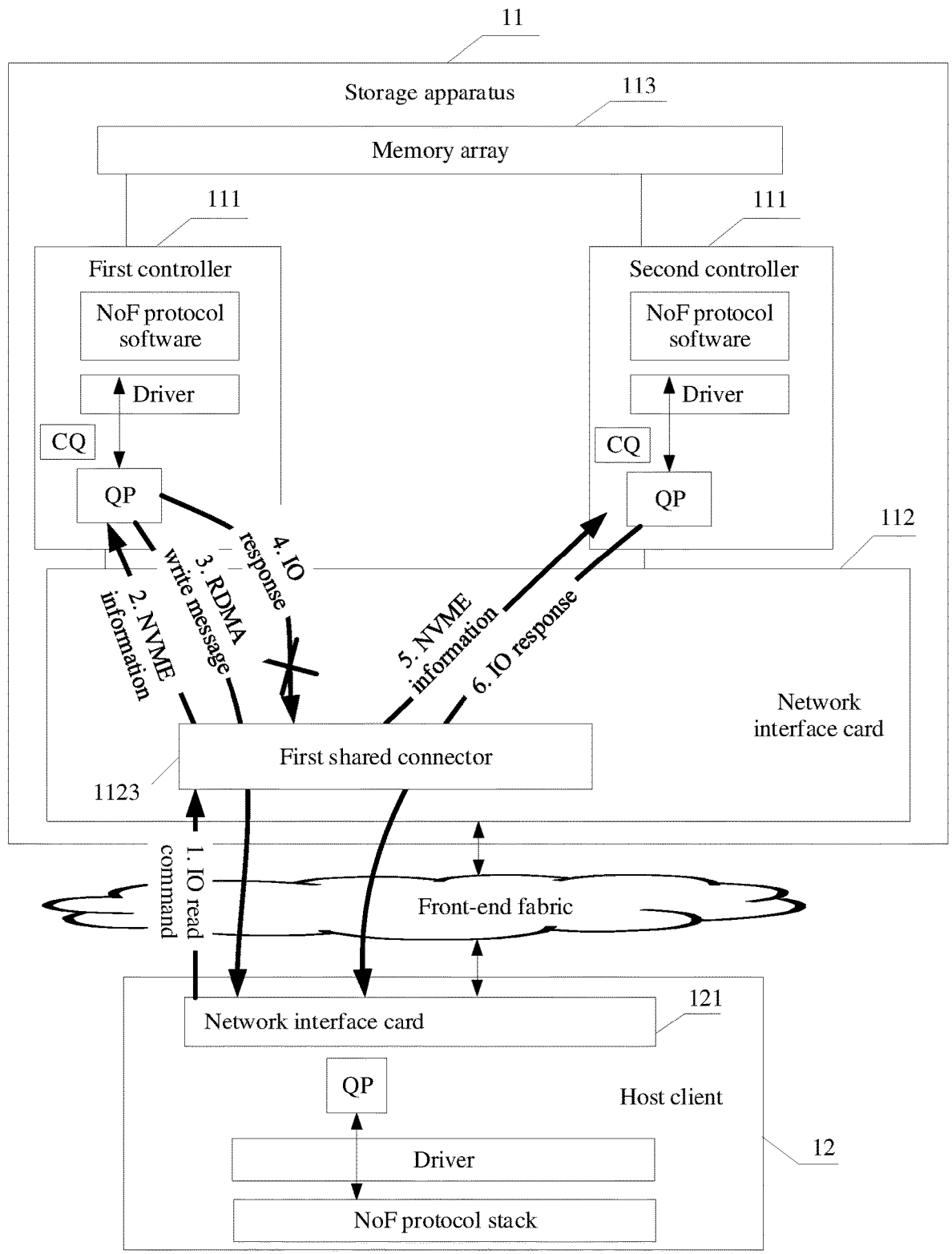
FIG. 27 is an example schematic diagram 5 of a system structure of an RDMA operation procedure affected due to occurrence of a disconnection event according to an embodiment of this application.
Figure 28:
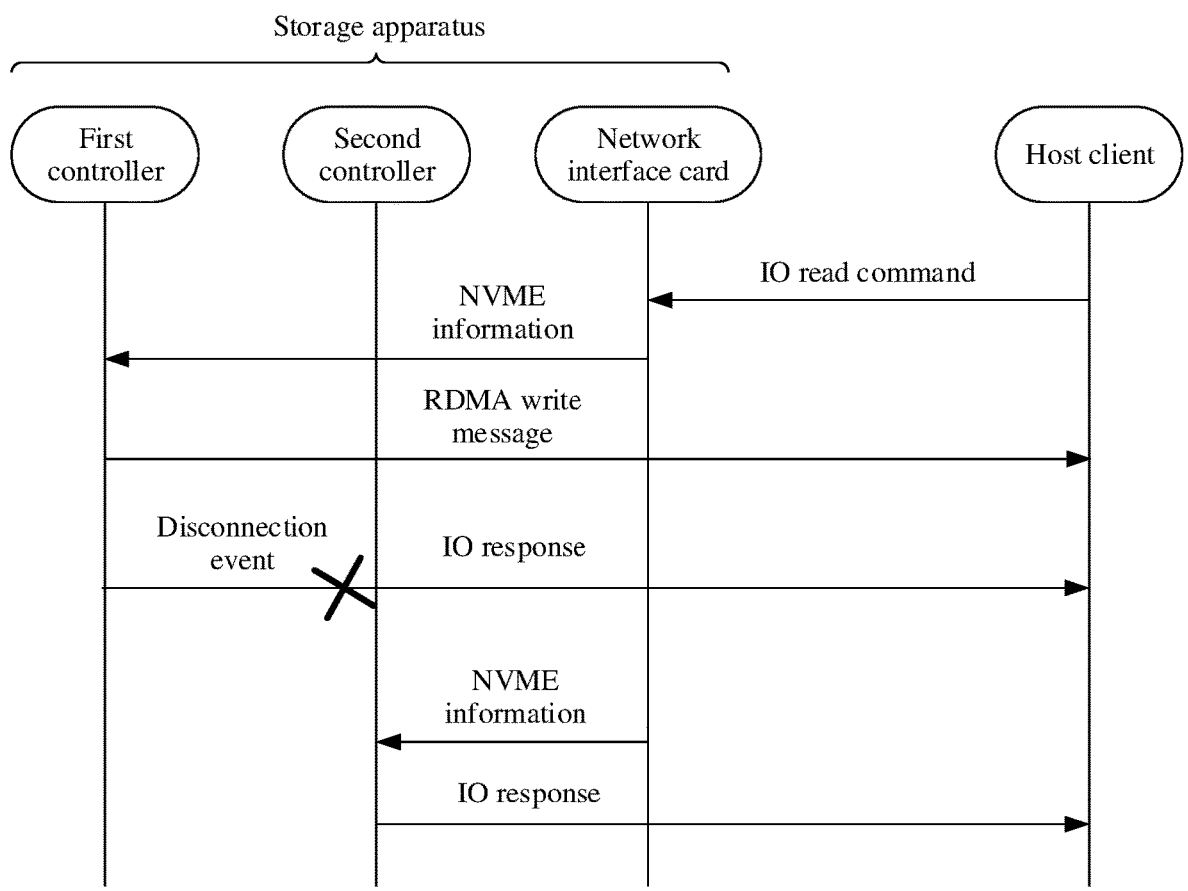
FIG. 28 is an example schematic flowchart 5 of an RDMA operation procedure affected due to occurrence of a disconnection event according to an embodiment of this application.

As shown in FIG. 27 and FIG. 28, in a scenario in which a host client sends an IO read command to a storage apparatus to trigger the storage apparatus to perform an RDMA write operation, a network interface card of the storage apparatus receives the IO read command, and a first controller is faulty after the first controller completes sending an RDMA write message by using a first shared connector and during a period when the first controller sends a second SEND message including an IO response by using the first shared connector. Therefore, a disconnection event of a link between the network interface card and the first controller occurs, and the first controller cannot send the second SEND message including the IO response. In this case, the network interface card sends NVME information to the second controller, so that the second controller can resend the second SEND message including the IO response.

Figure 29:
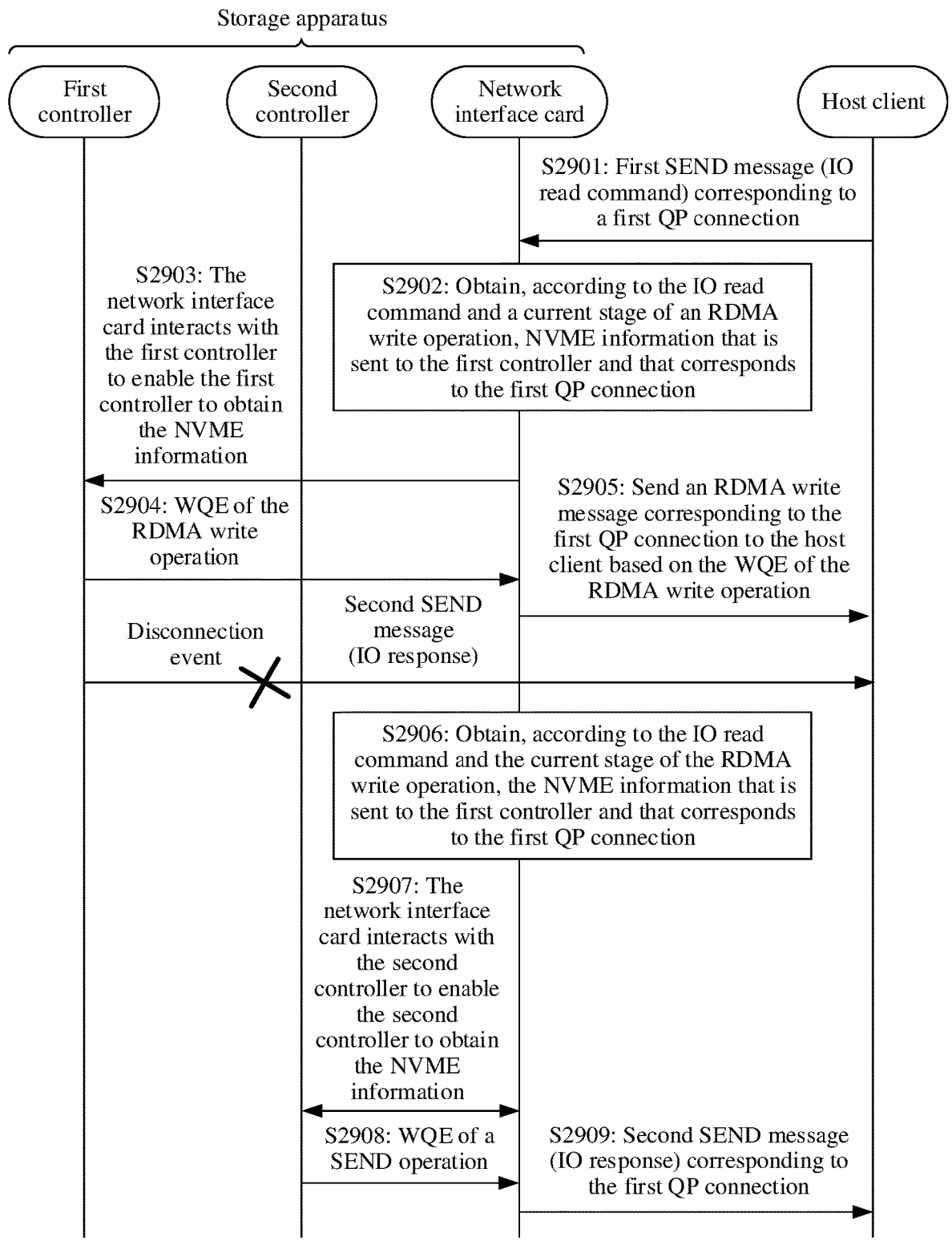
FIG. 29 is an example schematic flowchart 6 of a message sending and receiving method according to an embodiment of this application.

Specifically, as shown in FIG. 29, the message sending and receiving method provided in this embodiment of this application includes the following steps.

S2901: The host client sends a first SEND message corresponding to a first QP connection to the storage apparatus.

For this step, refer to step S1701.

S2902: The network interface card of the storage apparatus obtains, according to the IO read command and a current stage of the RDMA write operation, the NVME information that is sent to the first controller and that corresponds to the first QP connection.

For this step, refer to step S1702.

S2903: The network interface card interacts with the first controller to enable the first controller to obtain the NVME information.

For this step, refer to step S1403.

S2904: The first controller posts a WQE of the RDMA write operation based on the NVME information, so that the network interface card of the storage apparatus obtains the WQE from the first controller.

For this step, refer to step S1404.

S2905: The network interface card of the storage apparatus sends the RDMA write message corresponding to the first QP connection to the host client based on the WQE of the RDMA write operation.

For this step, refer to step S2005.

S2906: The network interface card of the storage apparatus obtains, according to the IO read command and the current stage of the RDMA write operation, the NVME information that is sent to the first controller and that corresponds to the first QP connection.

After sending the RDMA write message, the network interface card of the storage apparatus updates an NVMe IO status (NoF IO status) in the NVME information to be that the IO read command is received but the IO response is not sent, and other content in the NVME information remains unchanged.

For other content, refer to step S1402.

S2907: The first controller of the storage apparatus is faulty during a period when the first controller sends the second SEND message including the IO response by using the first shared connector, the network interface card of the storage apparatus detects the disconnection event of the link between the network interface card and the first controller, and the network interface card interacts with the second controller to enable the second controller to obtain the NVME information.

For this step, refer to step S1403.

S2908: The second controller of the storage apparatus posts a WQE of a SEND operation based on the NVME information.

Because the NVMe IO status in the NVME information is that the IO read command is received but the IO response is not sent, the second controller knows, based on procedures of the RDMA write operation, that the SEND message including the IO response is to be sent next, and therefore, posts the WQE of the SEND operation.

For this step, refer to step S1706.

S2909: The network interface card of the storage apparatus sends a second SEND message corresponding to the first QP connection to the host client based on the WQE of the SEND operation.

The second SEND message includes the IO response. In this case, the second SEND message is the first RDMA message described above.

For this step, refer to step S1707.

The message sending and receiving method provided in this embodiment of this application may be applied to a scenario in which the host client sends the IO read command to the storage apparatus, to trigger the storage apparatus to perform the RDMA write operation. After the first controller of the storage apparatus performs a corresponding RDMA write operation to send the RDMA write message, the first controller is faulty during a period when the first controller sends the second SEND message including the IO response by using the first shared connector. The network interface card of the storage apparatus sends the NVME information to the second controller, so that the second controller can resend the second SEND message including the IO response. The network interface card of the storage apparatus can smoothly switch a current RDMA operation to the second controller that works properly, so that the host client can be unaware of a fault of the controller, thereby ensuring that the RDMA write operation can be properly completed.

Figure 30:
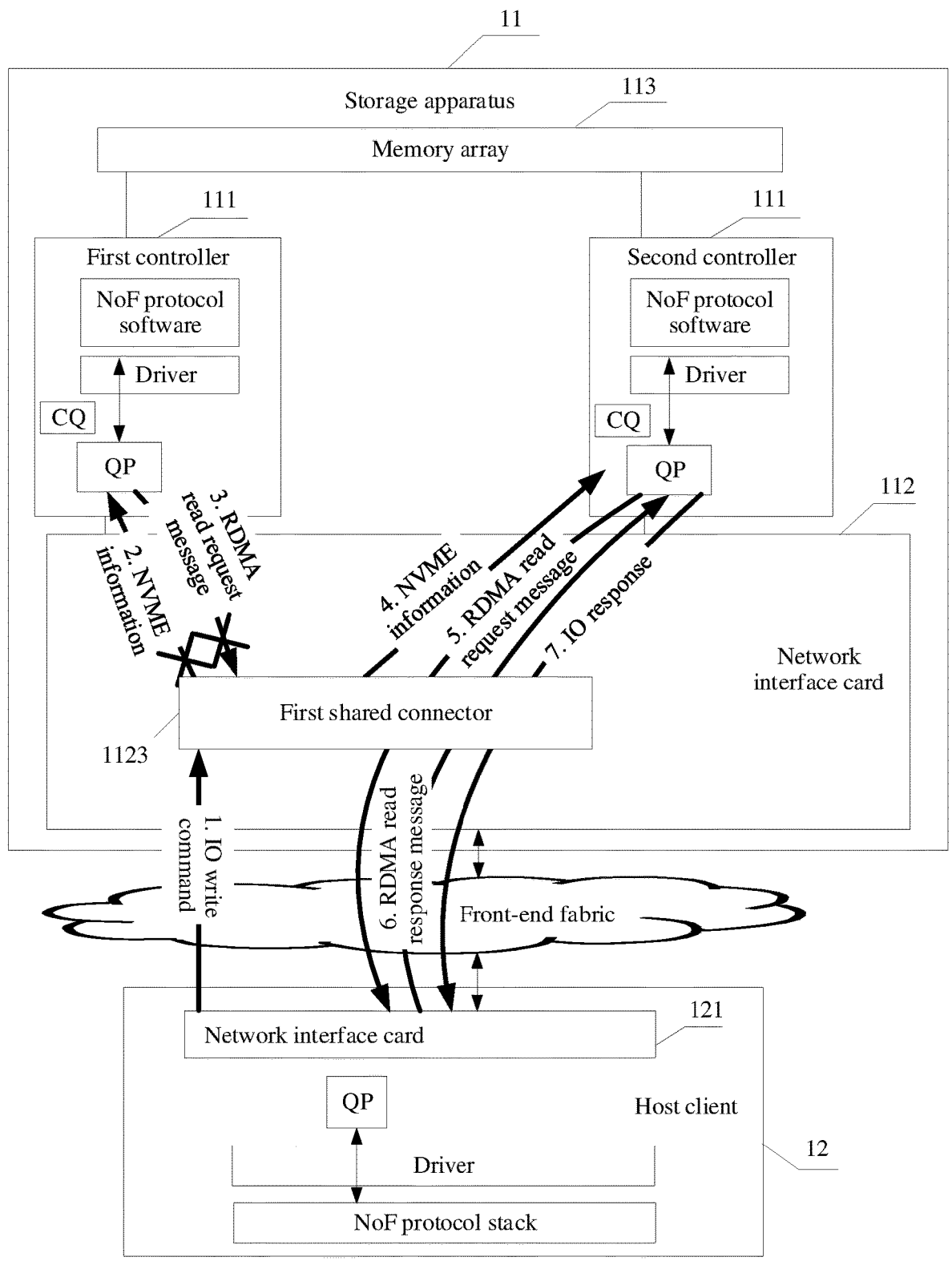
FIG. 30 is an example schematic diagram 6 of a system structure of an RDMA operation procedure affected due to occurrence of a disconnection event according to an embodiment of this application.
Figure 31:
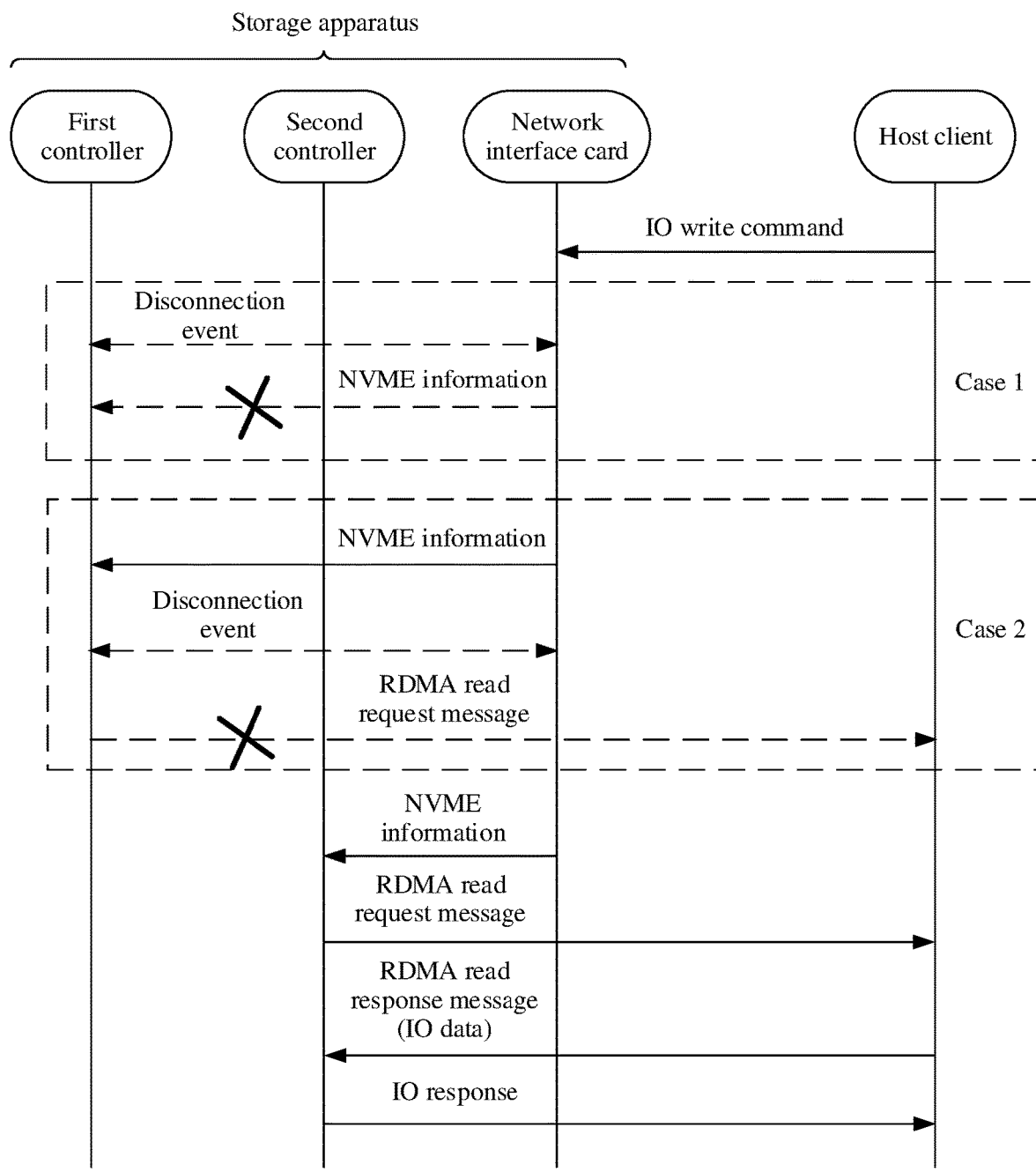
FIG. 31 is an example schematic flowchart 6 of an RDMA operation procedure affected due to occurrence of a disconnection event according to an embodiment of this application.

As shown in FIG. 30 and FIG. 31, in a scenario in which a host client sends an IO write command to a storage apparatus to trigger the storage apparatus to perform an RDMA read operation, a network interface card of the storage apparatus receives the IO write command, and a first controller is faulty before a first shared connector sends NVME information to the first controller, or a first controller is faulty before the first controller completes sending an RDMA read request message by using a first shared connector. Therefore, a disconnection event of a link between the network interface card and the first controller occurs, and the IO write command (namely, an RDMA operation type in the NVME information) cannot reach the first controller, or the first controller cannot send the RDMA read request message. In this case, the network interface card of the storage apparatus sends the NVME information to a second controller, so that the second controller can send the RDMA read request message, receive an RDMA read response message, and send an IO response.

Figure 32:
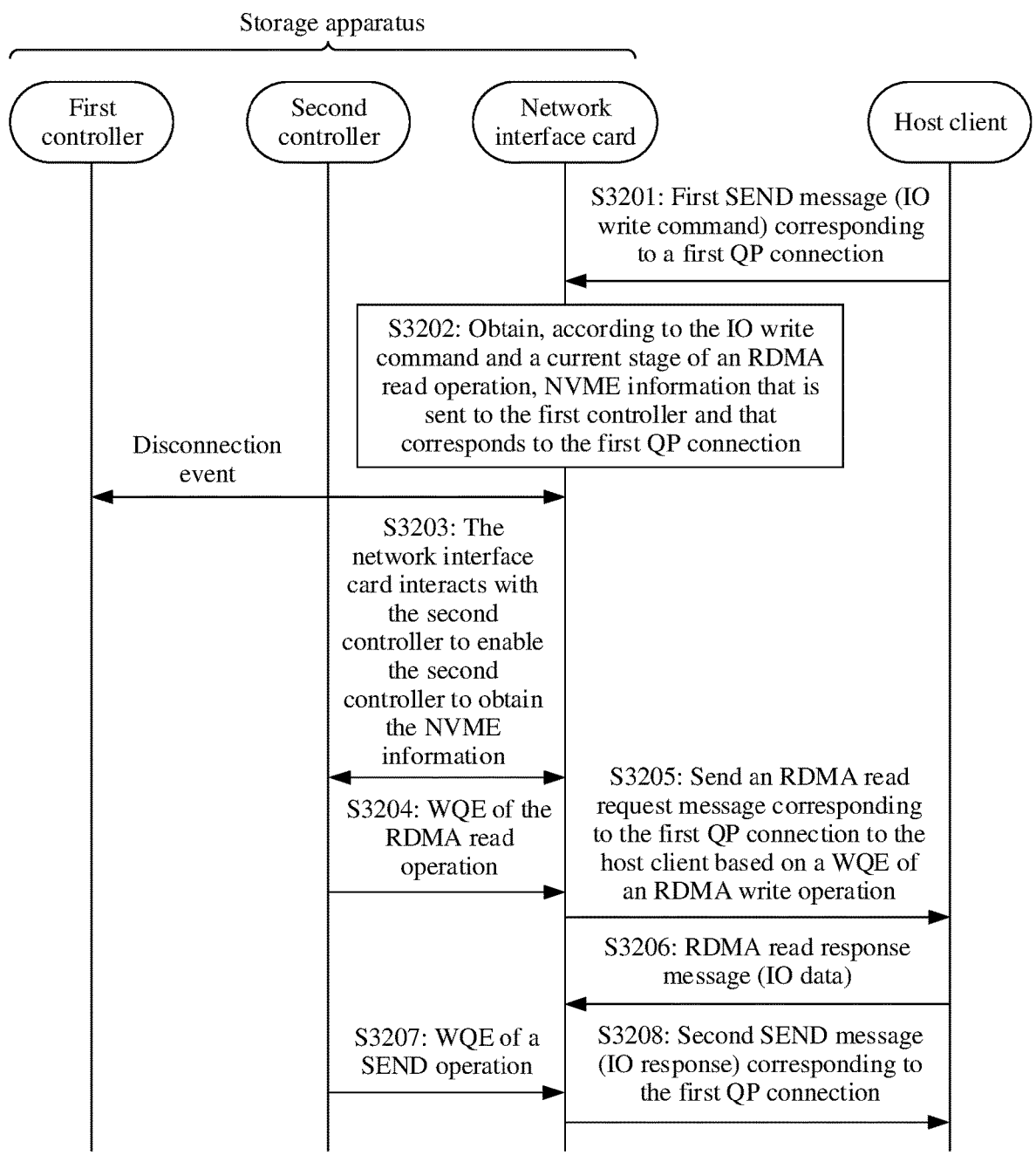
FIG. 32 is an example schematic flowchart 7 of a message sending and receiving method according to an embodiment of this application.

Specifically, as shown in FIG. 32, the message sending and receiving method provided in this embodiment of this application includes the following steps.

S3201: The host client sends a first SEND message corresponding to a first QP connection to the storage apparatus.

The first SEND message includes the IO write command.

For other content, refer to step S1401.

S3202: The network interface card of the storage apparatus obtains, according to the IO write command and a current stage of the RDMA read operation, the NVME information that is sent to the first controller and that corresponds to the first QP connection.

The network interface card of the storage apparatus receives the IO write command and triggers the storage apparatus to perform the RDMA read operation, and based on procedures of the RDMA read operation, the RDMA read request message is to be sent first. Therefore, the RDMA operation type in the NVME information is the RDMA read operation, and an NVMe IO status in the NVME information is that the IO write command is received but the RDMA read request message is not sent.

For other content, refer to step S1402.

S3203: The first controller of the storage apparatus is faulty before the first shared connector sends the NVME information to the first controller, or the first controller of the storage apparatus is faulty after the first shared connector sends the NVME information to the first controller and before the first controller completes sending the RDMA read request message by using the first shared connector, the network interface card of the storage apparatus detects the disconnection event of the link between the network interface card the first controller, and the network interface card interacts with the second controller to enable the second controller to obtain the NVME information.

For this step, refer to step S1403.

S3204: The second controller of the storage apparatus posts a WQE of the RDMA read operation based on the NVME information, so that the network interface card of the storage apparatus obtains the WQE from the second controller.

Because the NVMe IO status in the NVME information is that the IO write command is received but the RDMA read request message is not sent, the second controller knows, based on procedures of the RDMA read operation, that the RDMA read request message is to be sent next, and therefore, posts the WQE of the RDMA read operation.

For other content of this step, refer to step S1404.

S3205: The network interface card of the storage apparatus sends the RDMA read request message corresponding to the first QP connection to the host client based on the WQE of the RDMA read operation.

In this case, the RDMA read request message is the first RDMA message described above.

For other content, refer to step S1405.

S3206. The host client sends the RDMA read response message to the storage apparatus.

The RDMA read response message includes IO data. The RDMA read response message is used to write the IO data from an internal memory address of the host client to storage space of the storage apparatus. When the IO data is relatively long, there may be a plurality of RDMA read response messages. That is, the RDMA read response message may be split into a plurality of RDMA packets.

For other content, refer to step S1405.

S3207: The second controller of the storage apparatus posts a WQE of a SEND operation after receiving the IO data.

The WQE includes an RDMA operation type of the SEND operation.

S3208: The network interface card of the storage apparatus sends a second SEND message corresponding to the first QP connection to the host client based on the WQE of the SEND operation.

The SEND message includes the IO response, and the IO response indicates that the RDMA read operation triggered by the host client is completed.

The message sending and receiving method provided in this embodiment of this application may be applied to a scenario in which the host client sends the IO write command to the storage apparatus, to trigger the storage apparatus to perform the RDMA read operation. Before the first shared connector sends the NVME information to the first controller or before the first controller completes sending the RDMA read request message by using the first shared connector, the first controller is faulty, and the disconnection event of the link between the network interface card and the first controller occurs. In this case, the network interface card of the storage apparatus sends the NVME information to the second controller, so that the second controller can send the RDMA read request message, receive the RDMA read response message, and send the IO response. The network interface card of the storage apparatus can smoothly switch a current RDMA operation to the second controller that works properly, so that the host client can be unaware of a fault of the controller, thereby ensuring that the RDMA read operation can be properly completed.

Figure 33:
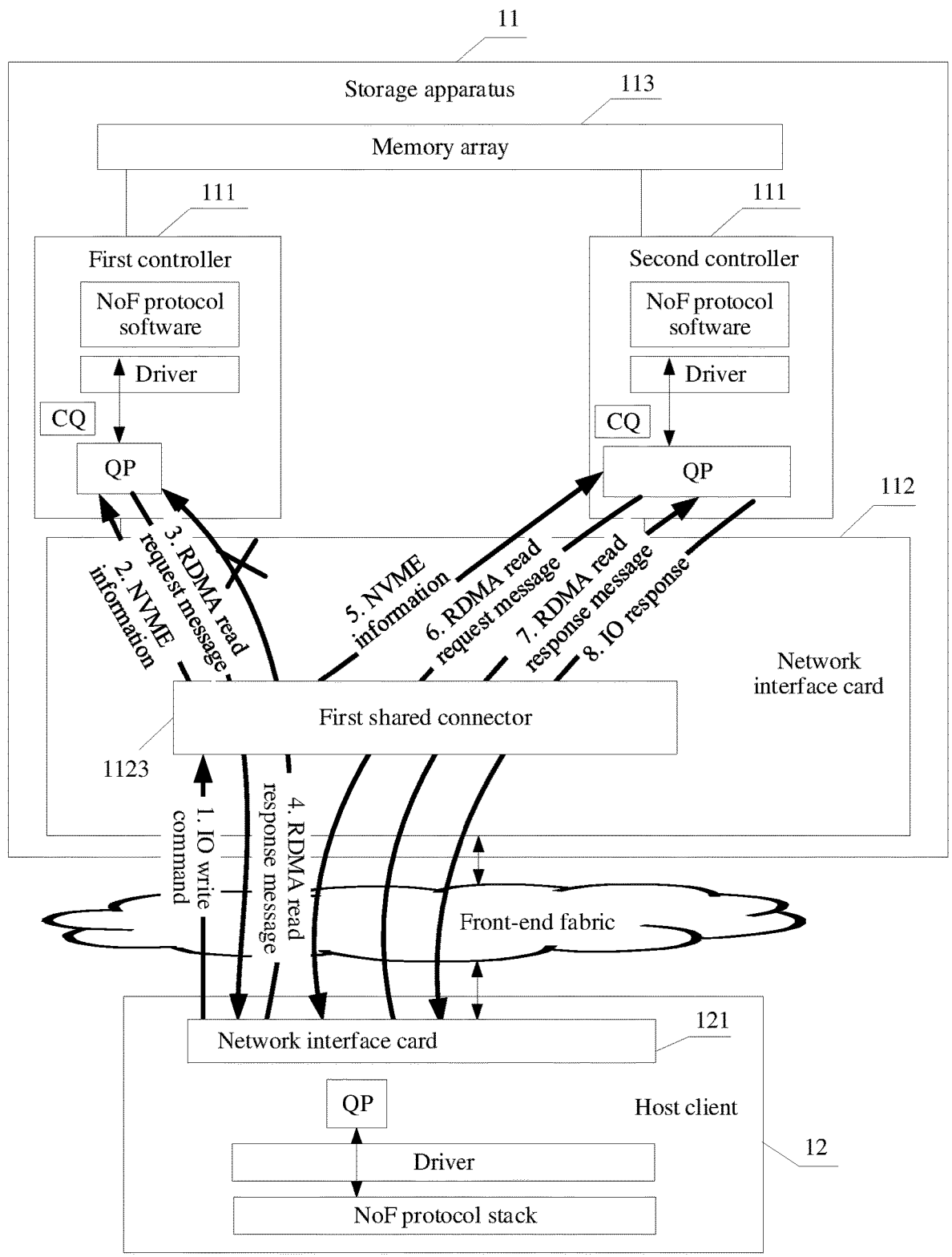
FIG. 33 is an example schematic diagram 7 of a system structure of an RDMA operation procedure affected due to occurrence of a disconnection event according to an embodiment of this application.
Figure 34:
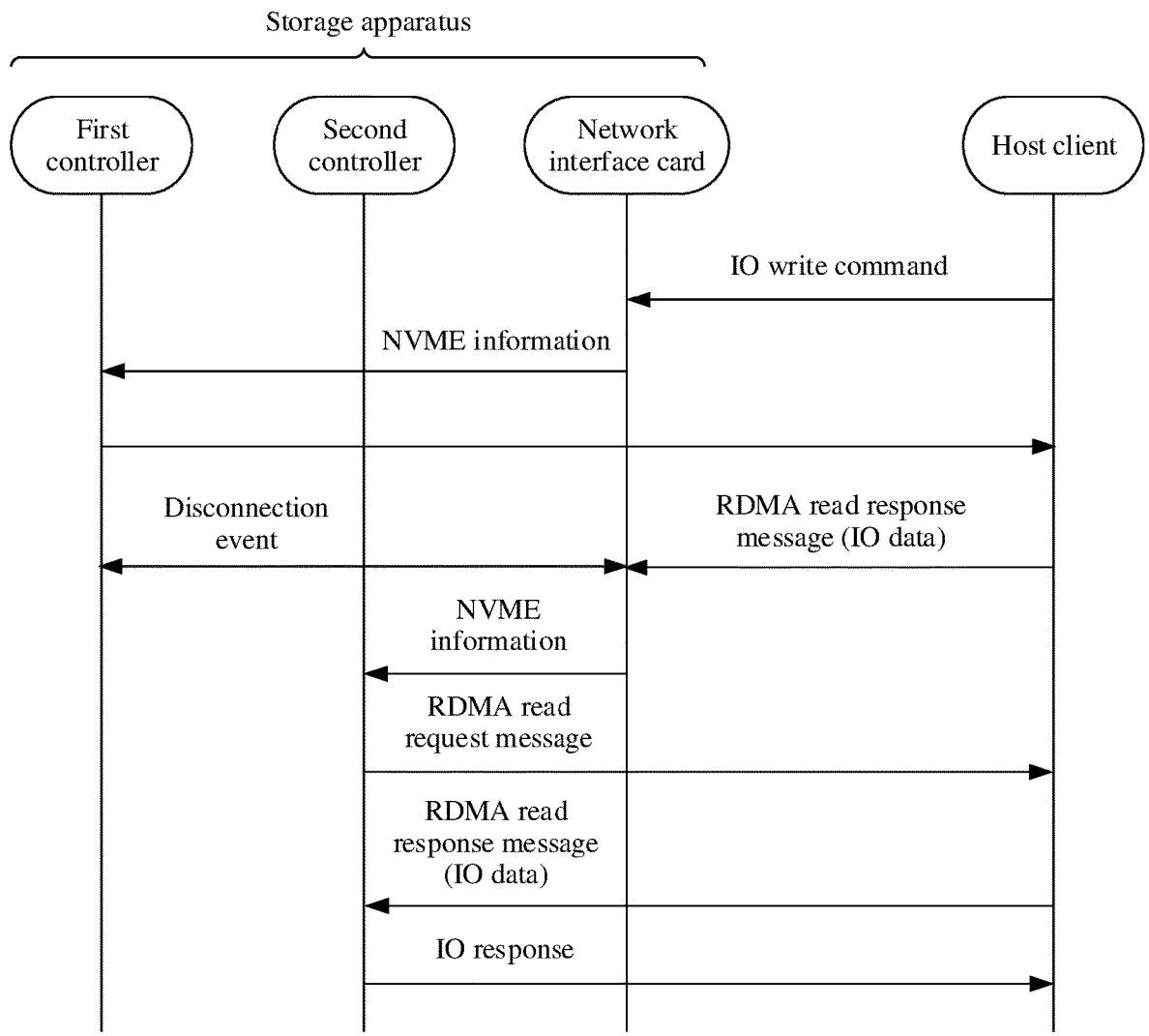
FIG. 34 is an example schematic flowchart 7 of an RDMA operation procedure affected due to occurrence of a disconnection event according to an embodiment of this application.

As shown in FIG. 33 and FIG. 34, in a scenario in which a host client sends an IO write command to a storage apparatus to trigger the storage apparatus to perform an RDMA read operation, a network interface card of the storage apparatus receives the IO write command, and a first controller is faulty during a period when the first controller receives an RDMA read response message by using a first shared connector. Therefore, a disconnection event of a link between the network interface card and the first controller occurs, and IO data in the RDMA read response message cannot be stored to storage space of the storage apparatus. In this case, the network interface card of the storage apparatus sends a positive acknowledgment message corresponding to the RDMA read response message to the host client or discards a packet of the RDMA read response message, and sends NVME information to the second controller, so that the second controller can resend an RDMA read request message, receive the RDMA read response message, and send an IO response.

Figure 35:
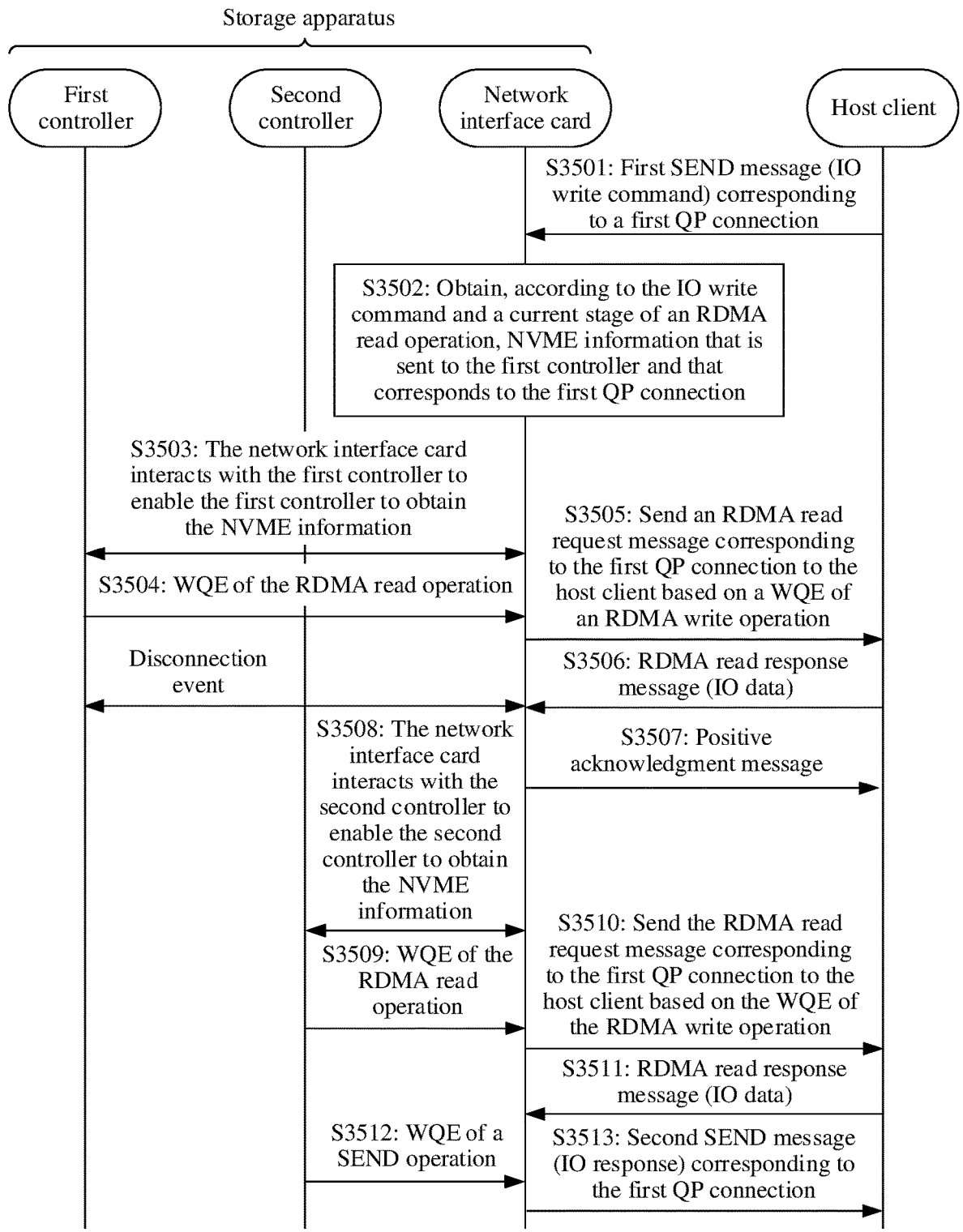
FIG. 35 is an example schematic flowchart 8 of a message sending and receiving method according to an embodiment of this application.

Specifically, as shown in FIG. 35, the message sending and receiving method provided in this embodiment of this application includes the following steps.

S3501: The host client sends a first SEND message corresponding to a first QP connection to the storage apparatus.

For this step, refer to step S3201.

S3502: The network interface card of the storage apparatus obtains, according to the IO write command and a current stage of the RDMA read operation, the NVME information that is sent to the first controller and that corresponds to the first QP connection.

For this step, refer to step S3202.

S3503: The network interface card interacts with the first controller to enable the first controller to obtain the NVME information.

For this step, refer to step S1403.

S3504: The first controller posts a WQE of the RDMA read operation based on the NVME information, so that the network interface card of the storage apparatus obtains the WQE from the first controller.

For this step, refer to step S3204.

S3505: The network interface card of the storage apparatus sends the RDMA read request message corresponding to the first QP connection to the host client based on the WQE of the RDMA read operation.

For this step, refer to step S3205.

S3506. The host client sends the RDMA read response message to the storage apparatus.

For this step, refer to step S1405.

S3507: The first controller of the storage apparatus is faulty during a period when the first controller receives the RDMA read response message by using the first shared connector, the network interface card of the storage apparatus detects the disconnection event of the link between the network interface card and the first controller, and the network interface card sends the positive acknowledgment message corresponding to the RDMA read response message to the host client, or discards the packet of the RDMA read response message.

For this step, refer to step S1405.

S3508: The network interface card interacts with the second controller to enable the second controller to obtain the NVME information.

For this step, refer to step S1403.

S3509: The second controller of the storage apparatus posts the WQE of the RDMA read operation based on the NVME information, so that the network interface card of the storage apparatus obtains the WQE from the second controller.

For this step, refer to step S3204.

S3510: The network interface card of the storage apparatus sends the RDMA read request message corresponding to the first QP connection to the host client based on the WQE of the RDMA read operation.

For this step, refer to step S3205.

S3511: The host client sends the RDMA read response message to the storage apparatus.

For this step, refer to step S3206, and details are not described herein again.

S3512: The second controller of the storage apparatus posts a WQE of a SEND operation after receiving the IO data.

For this step, refer to step S3207.

S3513: The network interface card of the storage apparatus sends a second SEND message corresponding to the first QP connection to the host client based on the WQE of the SEND operation.

For this step, refer to step S3208.

The message sending and receiving method provided in this embodiment of this application may be applied to a scenario in which the host client sends the IO write command to the storage apparatus, to trigger the storage apparatus to perform the RDMA read operation. During a period when the first controller receives the RDMA read response message by using the first shared connector, the first controller is faulty, and the disconnection event of the link between the network interface card and the first controller occurs. In this case, the network interface card of the storage apparatus sends the positive acknowledgment message corresponding to the RDMA read response message to the host client or discards the packet of the RDMA read response message, and sends the NVME information to the second controller, so that the second controller can resend the RDMA read request message, receive the RDMA read response message, and send the IO response. The network interface card of the storage apparatus can smoothly switch a current RDMA operation to the second controller that works properly, so that the host client can be unaware of a fault of the controller, thereby ensuring that the RDMA read operation can be properly completed.

Figure 36:
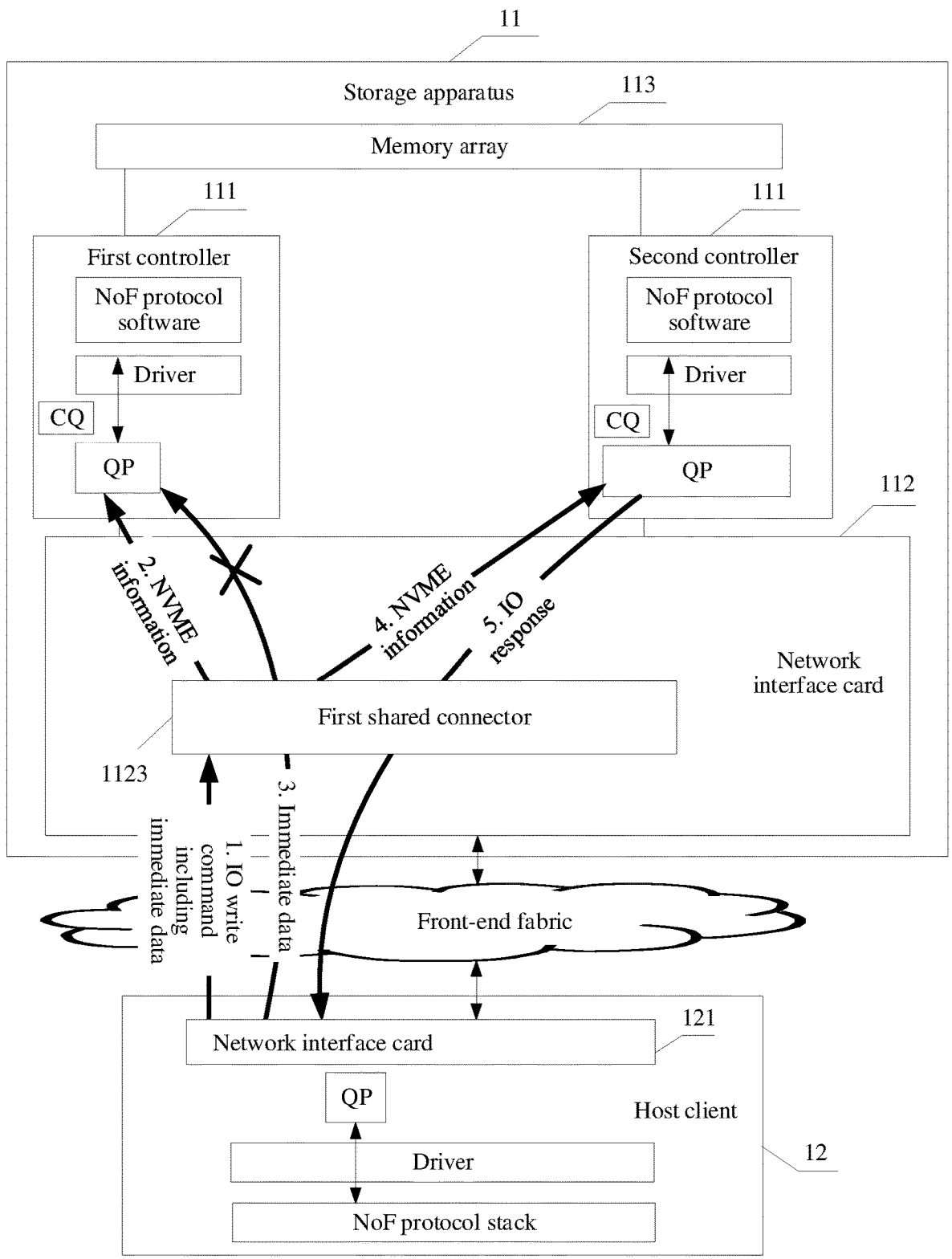
FIG. 36 is an example schematic diagram 8 of a system structure of an RDMA operation procedure affected due to occurrence of a disconnection event according to an embodiment of this application.
Figure 37:
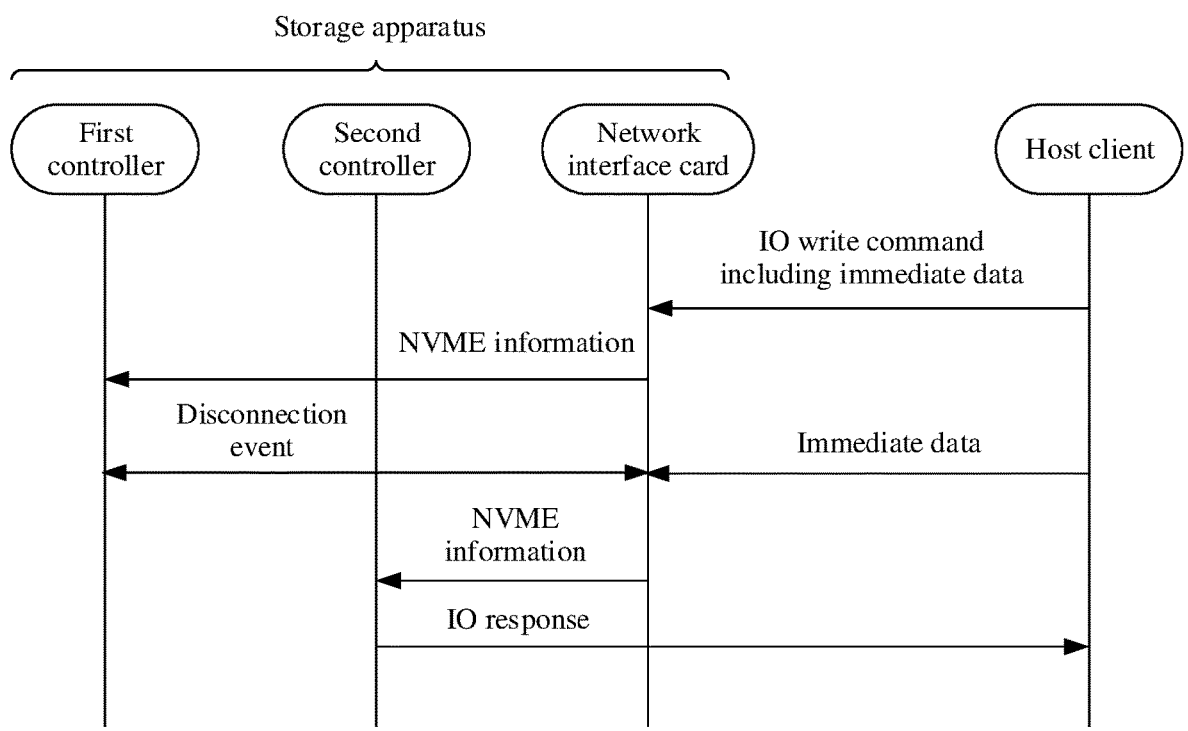
FIG. 37 is an example schematic flowchart 8 of an RDMA operation procedure affected due to occurrence of a disconnection event according to an embodiment of this application.

As shown in FIG. 36 and FIG. 37, in a scenario in which a host client sends an IO write command including immediate data to a storage apparatus to trigger the storage apparatus to store the immediate data, a network interface card of the storage apparatus receives the IO write command including the immediate data, and a first controller is faulty during a period when the first controller receives the immediate data by using a first shared connector. Therefore, a disconnection event of a link between the network interface card and the first controller occurs, and the immediate data cannot be stored to storage space of the storage apparatus. In this case, the network interface card of the storage apparatus sends a positive acknowledgment message of a first SEND message to the host client, and sends NVME information to a second controller, so that the second controller may send a second SEND message including an IO response, where the IO response indicates a failure of receiving the immediate data. In this way, the host client resends the IO write command including the immediate data and the immediate data.

Figure 38:
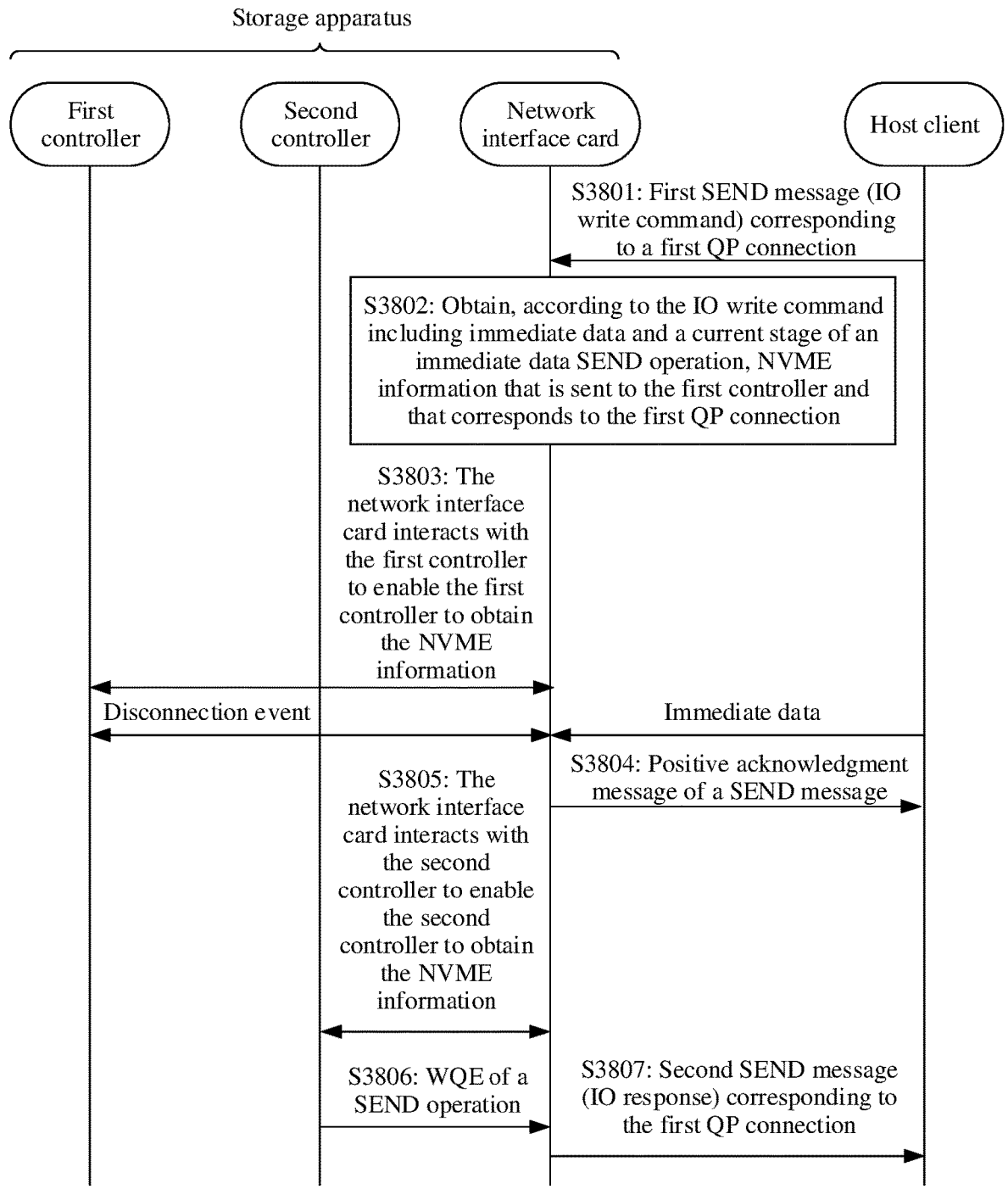
FIG. 38 is an example schematic flowchart 9 of a message sending and receiving method according to an embodiment of this application.

Specifically, as shown in FIG. 38, the message sending and receiving method provided in this embodiment of this application includes the following steps.

S3801: The host client sends the first SEND message corresponding to a first QP connection to the storage apparatus.

The first SEND message includes the IO write command including the immediate data and the immediate data. The immediate data is located in an additional header field of the last packet of the SEND message, or in other words, the immediate data is located after NoF command data in the SEND message.

For other content, refer to step S1401.

S3802: The network interface card of the storage apparatus obtains, according to the IO write command including the immediate data and a current stage of an immediate data SEND operation (or referred to as a SEND operation triggered by the IO write command), the NVME information that is sent to the first controller and that corresponds to the first QP connection.

The network interface card of the storage apparatus receives the IO write command including the immediate data, and based on procedures of the immediate data SEND operation, the storage apparatus is to receive the immediate data from the host client next. Therefore, an RDMA operation type in the NVME information is the immediate data SEND operation. The immediate data is split into one or more SEND messages based on a size of the immediate data and a value of PMTU for sending. The immediate data follows the NoF command data in the SEND message. An NVMe IO status in the NVME information is that the IO write command including the immediate data is received but the immediate data is not received (or referred to as being received).

For other content of this step, refer to step S1402.

S3803: The network interface card interacts with the first controller to enable the first controller to obtain the NVME information.

For this step, refer to step S1403.

S3804: The first controller is faulty during a period when the first controller of the storage apparatus receives the immediate data by using the first shared connector, the network interface card of the storage apparatus detects the disconnection event of the link between the network interface card and the first controller, and the network interface card sends the positive acknowledgment message corresponding to the SEND message to the host client.

The network interface card receives the immediate data based on a size of data in the IO write command including the immediate data, and directly discards the immediate data after receiving the immediate data.

For other content of this step, refer to step S1405.

S3805: The network interface card interacts with the second controller to enable the second controller to obtain the NVME information.

For this step, refer to step S1403.

S3806: The second controller of the storage apparatus posts a WQE of the SEND operation based on the NVME information, so that the network interface card of the storage apparatus obtains the WQE from the second controller.

The NVMe IO status in the NVME information is that the IO write command including the immediate data is received but the immediate data is not received (or referred to as being received). Therefore, the second controller knows, based on procedures of the immediate data SEND operation or the NVMe IO status, that the second SEND message including the IO response is to be sent next, where the IO response indicates a failure of receiving the immediate data. In this way, the host client resends the IO write command including the immediate data and the immediate data, and therefore, the WQE of the SEND operation is posted.

For other content of this step, refer to step S1404.

S3807: The network interface card of the storage apparatus sends the second SEND message corresponding to the first QP connection to the host client based on the WQE of the SEND operation.

The second SEND message includes the IO response, and the IO response indicates a failure of receiving the immediate data. In this case, the second SEND message is the first RDMA message described above.

For this step, refer to step S3205.

The message sending and receiving method provided in this embodiment of this application may be applied to a scenario in which the host client sends the IO write command including the immediate data to the storage apparatus, to trigger the storage apparatus to perform an RDMA read operation. During a period when the first controller receives the immediate data by using the first shared connector, the first controller is faulty, and the disconnection event of the link between the network interface card and the first controller occurs. In this case, the network interface card of the storage apparatus sends the positive acknowledgment message of the first SEND message to the host client, and sends the NVME information to the second controller, so that the second controller may send the second SEND message including the IO response, where the IO response indicates the failure of receiving the immediate data. In this way, the host client resends the IO write command including the immediate data and the immediate data. The network interface card of the storage apparatus can smoothly switch a current RDMA operation to the second controller that works properly, so that the host client can be unaware of a fault of the controller, thereby ensuring that the immediate data SEND operation can be properly completed.

An embodiment of this application further provides a computer-readable storage medium. The computer-readable storage medium stores instructions. The instructions are run on a network interface card, so that the network interface card performs the method corresponding to the network interface card in FIG. 14, FIG. 16, FIG. 17, FIG. 19, FIG. 20, FIG. 22, FIG. 23, FIG. 25, FIG. 26A and FIG. 26B, FIG. 28, FIG. 29, FIG. 31, FIG. 32, FIG. 34, FIG. 35, FIG. 37, and FIG. 38.

An embodiment of this application further provides a computer program product including instructions. The instructions are run on a network interface card, so that the network interface card performs the method corresponding to the network interface card in FIG. 14, FIG. 16, FIG. 17, FIG. 19, FIG. 20, FIG. 22, FIG. 23, FIG. 25, FIG. 26A and FIG. 26B, FIG. 28, FIG. 29, FIG. 31, FIG. 32, FIG. 34, FIG. 35, FIG. 37, and FIG. 38.

It should be understood that in the embodiments of this application, sequence numbers of the foregoing processes do not mean execution sequences. The execution sequences of the processes should be determined according to functions and internal logic of the processes, and should not be construed as any limitation on the implementation processes of the embodiments of this application.

Persons of ordinary skill in the art may be aware that, in combination with the examples described in the embodiments disclosed in this specification, units and algorithm steps may be implemented by using electronic hardware or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of this application.

Persons skilled in the art can clearly understand that for convenience and brevity of description, reference may be made to the corresponding processes in the foregoing method embodiments for specific working processes of the system, apparatus, and units described above.

In several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be omitted or not performed. In addition, the displayed or discussed mutual couplings or direct couplings or communication connections may be implemented through some interfaces. The indirect couplings or communication connections between the devices or units may be implemented in electrical, mechanical, or other forms.

The units described as separate components may be or may not be physically separated, and the components displayed as units may be or may not be physical units, that is, may be located in one place or distributed on a plurality of network units. Some or all of the units may be selected based on actual requirements to achieve the objectives of the solutions of embodiments.

In addition, functional units in the embodiments of this application may be integrated into one processing unit, each of the units may exist alone physically, or two or more units are integrated into one unit.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) manner or a wireless (such as infrared, wireless, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but the protection scope of this application is not limited thereto. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A network interface card, comprising:
a processor; and
a memory configured to store computer readable instructions that, when executed by the processor, cause the network interface card to:
receive a first send (SEND) message from a host client and corresponding to a first queue pair (QP) connection, and distribute the first SEND message to a first shared connector, wherein the first SEND message includes a remote direct memory access (RDMA) operation command, and the first shared connector is configured to initiate an RDMA operation according to the RDMA operation command to access an internal memory of the host client;
obtain, according to the RDMA operation command and a current stage of the RDMA operation, non-volatile memory express (NVME) information sent to a first controller and corresponding to the first QP connection;
enable a second controller to obtain the NVME information by interacting with the second controller when a disconnection event of a link between the first shared connector and the first controller is detected;
obtain a work queue element (WQE) from the second controller, wherein the WQE is obtained by the second controller based on the NVME information; and
send a first RDMA message corresponding to the first QP connection to the host client based on the WQE.

2. The network interface card according to claim 1, wherein
the RDMA operation command is an input/output (IO) read command,
the disconnection event occurs before the first shared connector sends the NVME information to the first controller or before the first controller sends an RDMA write message by using the first shared connector, and
the first RDMA message is the RDMA write message.

3. The network interface card according to claim 1, wherein
the RDMA operation command is an input/output (IO) read command,
the disconnection event occurs during a period when the first controller sends the first packet of an RDMA write message by using the first shared connector, and
the first RDMA message is the RDMA write message.

4. The network interface card according to claim 1, wherein
the RDMA operation command is an input/output (IO) read command,
the disconnection event occurs during a period when the first controller sends a middle packet or a last packet of an RDMA write message by using the first shared connector,
the first RDMA message is a second SEND message comprising an IO response,
the IO response indicates a read operation is completed, and before sending the first RDMA message corresponding to the first QP connection to the host client based on the WQE, the network interface card is further caused to:
send a fake last packet of the RDMA write message to the host client, wherein a payload of the fake last packet is arbitrarily padded, and a packet sequence number (PSN) of the fake last packet is a to-be-sent RDMA packet of the RDMA write message when the disconnection event occurs.

5. The network interface card according to claim 1, wherein
the RDMA operation command is an input/output (IO) read command,
after the first controller sends an RDMA write message by using the first shared connector, the disconnection event occurs before a negative acknowledgment message of the RDMA write message is received or before a retransmission packet of the RDMA write message is sent because the negative acknowledgment message of the RDMA write message is received,
the first RDMA message is a second SEND message comprising an IO response,
the IO response indicates a read operation is completed, and
before sending the first RDMA message corresponding to the first QP connection to the host client based on the WQE, the network interface card is further caused to:
send a fake retransmission packet of the RDMA write message to the host client, wherein a packet sequence number (PSN) of the fake retransmission packet is the last RDMA packet of the RDMA write message sent before the disconnection event occurs, or a PSN of an initial retransmission packet of the RDMA write message.

6. The network interface card according to claim 1, wherein
the RDMA operation command is an input/output (IO) read command,
the disconnection event occurs during a period when the first controller sends, by using the first shared connector, a second SEND message including an IO response,
the IO response indicates a read operation is completed, and
the first RDMA message is the second SEND message.

7. The network interface card according to claim 1, wherein
the RDMA operation command is an input/output (IO) write command,
the disconnection event occurs before the first shared connector sends the NVME information to the first controller or before the first controller completes sending an RDMA read request message by using the first shared connector, and
the first RDMA message is the RDMA read request message.

8. The network interface card according to claim 1, wherein
the RDMA operation command is an input/output (IO) write command,
the disconnection event occurs during a period when the first controller receives an RDMA read response message by using the first shared connector,
the first RDMA message is an RDMA read request message, and
before sending the first RDMA message corresponding to the first QP connection to the host client based on the WQE, the network interface card is further caused to:
send a positive acknowledgment message corresponding to the RDMA read response message to the host client, or discard a packet of the RDMA read response message received from the host client.

9. The network interface card according to claim 1, wherein
the RDMA operation command is an input/output (IQ) write command including immediate data,
the disconnection event occurs during a period when the first controller receives the immediate data by using the first shared connector,
the first RDMA message is a second SEND message including an TO response,
the IO response indicates a failure of receiving the immediate data, and
before sending the first RDMA message corresponding to the first QP connection to the host client based on the WQE, the network interface card is further caused to:
send a positive acknowledgment message of the first SEND message to the host client.

10. The network interface card according to claim 1, wherein interacting, by the first shared connector, with the second controller comprises:
sending, by the first shared connector, a notification message to the second controller, wherein the notification message notifies the second controller to obtain the NVME information.

11. The network interface card according to claim 1, wherein interacting, by the first shared connector, with the second controller comprises:
sending, by the first shared connector, the NVME information to the second controller.

12. A message sending and receiving method, comprising:
receiving, by a parser, a first send (SEND) message from a host client, wherein the first SEND message corresponds to a first queue (QP) connection;
distributing the first SEND message to a first shared connector, wherein the first SEND message includes a remote direct memory access (RDMA) operation command;
initiating, by the first shared connector, a corresponding RDMA operation according to the RDMA operation command to access an internal memory of the host client;
obtaining, by the first shared connector according to the RDMA operation command and a current stage of the RDMA operation, non-volatile memory express (NVME) information sent to a first controller and corresponding to the first QP connection;
enabling a second controller to obtain the NVME information by interacting with the second controller when a disconnection event of a link between the first shared connector and the first controller is detected;
obtaining a work queue element (WQE), from the second controller, based on the NVME information; and
sending a first RDMA message corresponding to the first QP connection to the host client based on the WQE.

13. The method according to claim 12, wherein
the RDMA operation command is an input/output (IO) read command,
the disconnection event occurs before the first shared connector sends the NVME information to the first controller or before the first controller sends an RDMA write message by using the first shared connector, and
the first RDMA message is the RDMA write message.

14. The method according to claim 12, wherein
the RDMA operation command is an input/output (IO) read command,
the disconnection event occurs during a period when the first controller sends the first packet of an RDMA write message by using the first shared connector, and
the first RDMA message is the RDMA write message.

15. The method according to claim 12, wherein
the RDMA operation command is an input/output (IO) read command,
the disconnection event occurs during a period when the first controller sends a middle packet or the last packet of an RDMA write message by using the first shared connector,
the first RDMA message is a second SEND message including an IO response,
the IO response indicates that a read operation is completed, and
the method further comprises:
  before sending the first RDMA message corresponding to the first QP connection to the host client based on the WQE, sending, by the first shared connector, a fake last packet of the RDMA write message to the host client, wherein a payload of the fake last packet is arbitrarily padded, and a packet sequence number (PSN) of the fake last packet is a to-be-sent RDMA packet of the RDMA write message when the disconnection event occurs.

16. The method according to claim 12, wherein
the RDMA operation command is an input/output (IO) read command,
after the first controller sends an RDMA write message by using the first shared connector, the disconnection event occurs before a negative acknowledgment message of the RDMA write message is received or before a retransmission packet of the RDMA write message is sent because the negative acknowledgment message of the RDMA write message is received,
the first RDMA message is a second SEND message comprising an IO response,
the IO response indicates that a read operation is completed, and
the method further comprises:
  before the sending a first RDMA message corresponding to the first QP connection to the host client based on the WQE, sending, by the first shared connector, a fake retransmission packet of the RDMA write message to the host client, wherein a packet sequence number (PSN) of the fake retransmission packet is the last RDMA packet of the RDMA write message sent before the disconnection event occurs, or a PSN of an initial retransmission packet of the RDMA write message.

17. The method according to claim 12, wherein
the RDMA operation command is an input/output (IO) read command,
the disconnection event occurs during a period when the first controller sends, by using the first shared connector, a second SEND message including an IO response,
the IO response indicates a read operation is completed, and
the first RDMA message is the second SEND message.

18. The method according to claim 12, wherein
the RDMA operation command is an input/output (IO) write command,
the disconnection event occurs before the first shared connector sends the NVME information to the first controller or before the first controller completes sending an RDMA read request message by using the first shared connector, and
the first RDMA message is the RDMA read request message.

19. The method according to claim 12, wherein interacting with the second controller comprises:
sending, by the first shared connector, a notification message to the second controller, wherein the notification message is used to notify the second controller to obtain the NVME information.

20. The method according to claim 12, wherein interacting with the second controller comprises:
sending, by the first shared connector, the NVME information to the second controller.

* * * * *